United States Patent
Yamamoto et al.

(10) Patent No.: US 9,893,527 B2
(45) Date of Patent: Feb. 13, 2018

(54) POWER STORAGE SYSTEM AND POWER STORAGE METHOD

(71) Applicant: Fujikura Ltd., Tokyo (JP)

(72) Inventors: Kazuhiro Yamamoto, Sakura (JP); Kenichi Okada, Sakura (JP); Ryoji Yanagimoto, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/507,067

(22) PCT Filed: Dec. 16, 2015

(86) PCT No.: PCT/JP2015/085181
§ 371 (c)(1),
(2) Date: Feb. 27, 2017

(87) PCT Pub. No.: WO2016/098802
PCT Pub. Date: Jun. 23, 2016

(65) Prior Publication Data
US 2017/0279275 A1  Sep. 28, 2017

(30) Foreign Application Priority Data

Dec. 18, 2014 (JP) .................. 2014-256361
Oct. 14, 2015 (JP) .................. 2015-202668

(51) Int. Cl.
*H02J 7/00* (2006.01)
*H02J 3/32* (2006.01)
(Continued)

(52) U.S. Cl.
CPC ............ *H02J 3/32* (2013.01); *H02J 3/383* (2013.01); *H02J 7/0022* (2013.01);
(Continued)

(58) Field of Classification Search
CPC .................................................. H02J 7/35
(Continued)

(56) References Cited

U.S. PATENT DOCUMENTS 6,590,370 B1 * 7/2003 Leach ............... H01M 16/006
320/101
6,949,843 B2 * 9/2005 Dubovsky ............ H02J 3/382
307/64

(Continued)

FOREIGN PATENT DOCUMENTS

CN   101156294 A   4/2008
JP   58-183043 U   12/1983
(Continued)

OTHER PUBLICATIONS

Office Action dated Mar. 14, 2017, issued in counterpart Japanese Application No. 2015-202668, with English translation (6 pages).
(Continued)

*Primary Examiner* — Yalkew Fantu
(74) *Attorney, Agent, or Firm* — Westerman, Hattori, Daniels & Adrian, LLP

(57) ABSTRACT

A power storage system includes a power generation element that performs environmental power generation, a first storage battery that receives power generated by the power generation element and supplies the power to a load device, a second storage battery that has a capacitance smaller than that of the first storage battery and is connected in series with the first storage battery, a first switcher that is connected in parallel to the second storage battery, short-circuits both terminals of the second storage battery in a closed state, and releases a short-circuited state of the second storage battery in an open state, and a switching unit that controls the opened and closed states of the first switcher.

17 Claims, 19 Drawing Sheets

(51) Int. Cl.
   H02J 3/38       (2006.01)
   H02J 7/34       (2006.01)
   H02J 7/35       (2006.01)

(52) U.S. Cl.
   CPC .......... H02J 7/0024 (2013.01); H02J 7/0054 (2013.01); H02J 7/345 (2013.01); H02J 7/35 (2013.01)

(58) Field of Classification Search
   USPC ........................................................ 320/101
   See application file for complete search history.

(56)        References Cited

U.S. PATENT DOCUMENTS

| | | | |
|---|---|---|---|
| 7,081,693 B2 * | 7/2006 | Hamel | B60C 23/0411 |
| | | | 307/151 |
| 2008/0272653 A1 * | 11/2008 | Inoue | H02J 7/35 |
| | | | 307/47 |
| 2009/0302681 A1 * | 12/2009 | Yamada | H02J 7/35 |
| | | | 307/46 |
| 2013/0127626 A1 * | 5/2013 | Yoo | G01R 31/3689 |
| | | | 340/636.19 |
| 2013/0181655 A1 * | 7/2013 | Yokoyama | H02J 7/35 |
| | | | 320/101 |
| 2013/0241492 A1 | 9/2013 | Senba | |

FOREIGN PATENT DOCUMENTS

| | | |
|---|---|---|
| JP | 4-29531 A | 1/1992 |
| JP | 11-289675 | 10/1999 |
| JP | 2001-209444 A | 8/2001 |
| JP | 2004-104942 A | 4/2004 |
| JP | 2006-158043 A | 6/2006 |
| JP | 2010-22108 A | 1/2010 |
| JP | 2013-78235 A | 4/2013 |
| JP | 2013-198297 A | 9/2013 |
| JP | 2014-18011 A | 1/2014 |
| WO | 2006/116709 A1 | 11/2006 |

OTHER PUBLICATIONS

Office Action dated Aug. 18, 2015, issued in counterpart Japanese application No. 2014-256361 (3 pages).
Notice of Allowance dated Nov. 17, 2015, issued in counterpart Japanese application No. 2014-256361 (3 pages).
International Search Report dated Feb. 16, 2016, issued in counterpart International Application No. PCT/JP2015/085181 (2 pages).
Written Opinion dated Feb. 16, 2016, issued in counterpart International Application No. PCT/JP2015/085181, with English translation (8 pages).
Office Action dated Oct. 16, 2017, issued in counterpart Chinese Application No. 201580045674.6, with English translation. (10 pages).

* cited by examiner

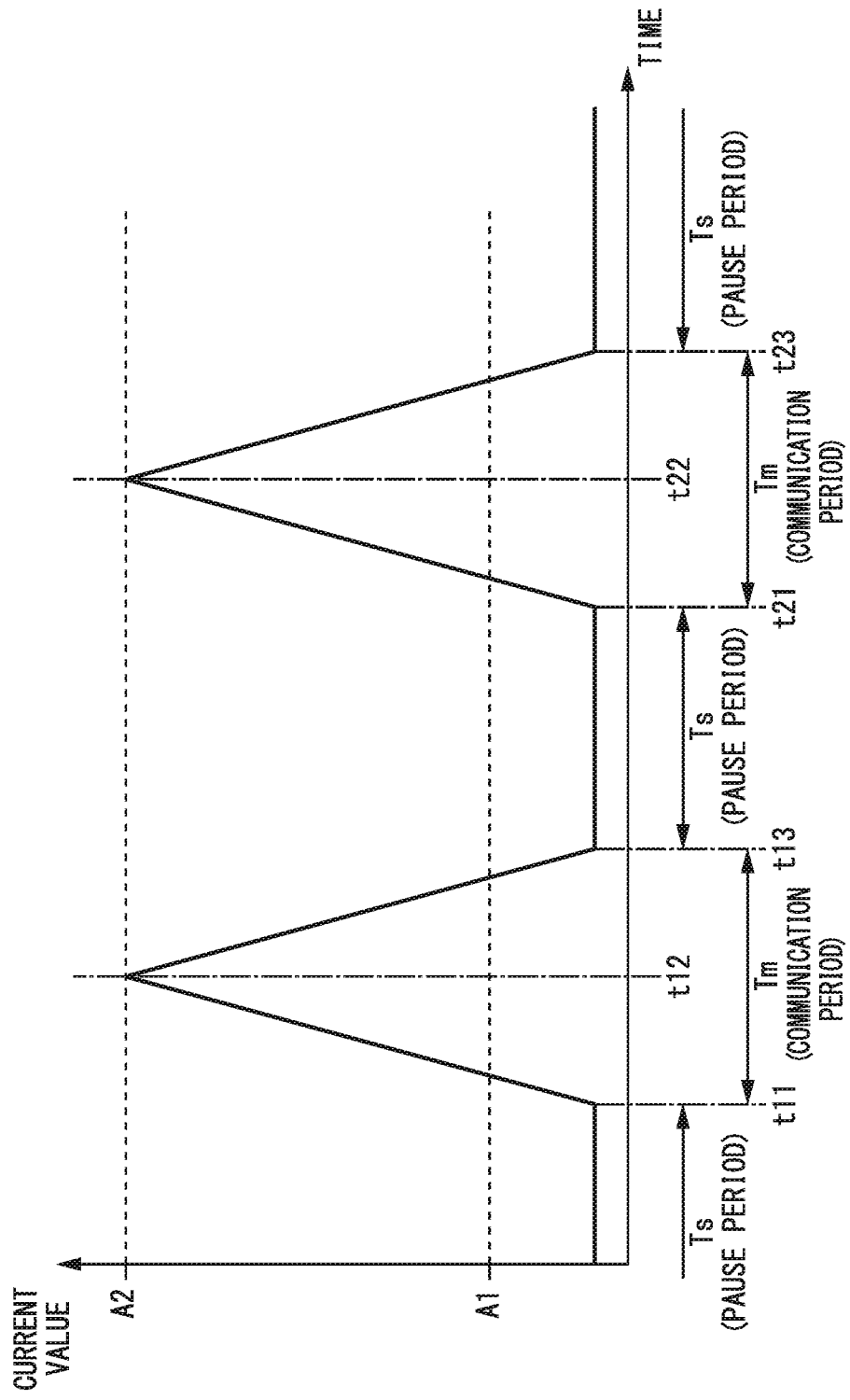

US 9,893,527 B2

POWER STORAGE SYSTEM AND POWER STORAGE METHOD

TECHNICAL FIELD

The present invention relates to a power storage system and a power storage method of storing power generated by a power generation element that performs environmental power generation in a storage battery and supplying the power to a load device.

Priorities are claimed on Japanese Patent Application No. 2014-256361, filed Dec. 18, 2014, and Japanese Patent Application No. 2015-202668, filed Oct. 14, 2015, the contents of which are incorporated herein by references.

BACKGROUND ART

In recent years, energy harvesting devices (environmental power generation elements) such as wireless sensors or remote control switches that operate without wiring or battery replacement by obtaining electrical energy from a surrounding environment due to realization of low power consumption of an electronic circuit or a wireless technology have attracted attention. Therefore, for example, a low-illuminance dye-sensitized solar battery for energy harvesting assumed to be used in indoor light of a fluorescent light, LED illumination, or the like has been developed.

There is a power supply device using a related lithium ion capacitor (see Patent Document 1). The power supply device described in Patent Document 1 is a power supply device including a lithium ion capacitor, and includes a power control unit that operates the lithium ion capacitor in a voltage range from 2.0 V to 3.2 V.

Further, Patent Document 1 describes that an appropriate amount of power generation required for a solar battery is obtained on the basis of a power demand amount, and the amount of power generation of a solar battery is adjusted according to a required generated power amount.

Further, attempts have been made to cause a solar battery to generate power under a low-illuminance environment such as indoor light, accumulate the generated power in a storage battery, and drive a load device with the stored power. In this case, it is desirable to use a lithium ion capacitor as the storage battery since the lithium ion capacitor has a large capacitance and a low leakage current.

Lithium ion capacitors that are commercially available are mainly lithium ion capacitors with 40 F (farads) or more, such as 40 F or 100 F. Further, it is preferable for a lithium ion capacitor to be used at a voltage of 2.0 V or higher from the viewpoint of prevention of deterioration of cells, as described in Patent Document 1. Therefore, a power supply device prevents a voltage of a lithium ion capacitor from becoming a voltage of 2.5 V or lower, for example, in consideration of a margin. Therefore, when a charging voltage of a lithium ion capacitor decreases and is lower than 2.5 V, an operation of a load device is temporarily stopped and supply of power is stopped. Thereafter, in the power supply device, when the power generation element starts power generation, recharging of the lithium ion capacitor is started by the power generation element.

PRIOR ART DOCUMENTS

Patent Documents

[Patent Document 1] Japanese Unexamined Patent Application, First Publication No. 2013-78235

DISCLOSURE OF INVENTION

Problems to be Solved by the Invention

When an operation of a load device returns immediately after a charging voltage of a lithium ion capacitor exceeds 2.5 V when the lithium ion capacitor is recharged, operation start and operation stop of the load device are repeated due to power consumption of the load device. That is, the return of the operation of the load device, a decrease in the charging voltage of the lithium ion capacitor due to power consumption at the time of the return of the operation of the load device, and stop of the operation of the load device due to the decrease in the charging voltage are repeated. Thus, a system cannot be driven.

Further, when the load device is a communication device such as a sensor node that measures information on an environment, it is desirable for an operation of the system to return about ten minutes after a power generation element starts power generation. However, in a power supply device of the related art, since charging is performed in a lithium ion capacitor with a large capacitance such as 40 F, an output voltage to be supplied to the load device cannot be rapidly increased, and a long amount of time is taken to cause the operation of the load device to return.

In order to shorten a time for causing an operation of the system to return, it is conceivable to decrease a hysteresis voltage of a threshold voltage when the charging voltage of the lithium ion capacitor used as a storage battery is determined. However, if the hysteresis voltage of the threshold voltage decreases, the operation of the load device is stopped due to a slight voltage change after the operation of the system is resumed, and the operation becomes unstable.

The present invention has been made in view of the above problems, and provides a power storage system and a power storage method capable of returning an operation of a load device in a short amount of time when a power generation element performs power generation.

Means for Solving the Problems

To solve the above problem, it is necessary to provide a hysteresis width between a voltage at the time of stop of an operation and a voltage at the time of return of the operation. For example, a minimum voltage required to cause an operation of a load device to return is set to, for example, 2.7 V (with a margin of 0.2 V) after recharging of a lithium ion capacitor starts. However, for example, when a voltage value of a capacitor with a capacitance of 40 F is charged from 2.5 V to 2.7 V to cause the operation of the load device to return, a charging current supplied from an environmental power generation element is small. Accordingly, for example, a long charging time such as several hours is required and the load device is stopped for several hours. The inventors have derived the present invention as a result of further intensive research.

According to an aspect of the present invention, there is provided a power storage system including: a power generation element that performs environmental power generation; a first storage battery that receives power generated by the power generation element and supplies the power to a load device; a second storage battery that has a capacitance smaller than that of the first storage battery and is connected in series with the first storage battery; a first switcher that is connected in parallel to the second storage battery, short-circuits both terminals of the second storage battery in a closed state, and releases a short-circuited state of the second storage battery in an open state; and a switching unit that controls the opened and closed states of the first switcher, wherein the switching unit compares a charging voltage of the first storage battery with a predetermined first threshold voltage when both terminals of the second storage battery are short-circuited by the first switcher and charging is performed from the first storage battery to the load device via the first switcher, and performs control so that the first switcher enters an open state when the charging voltage of the first storage battery becomes equal to or lower than the predetermined first threshold voltage, determines the charging voltage of the entire series circuit of the first storage battery and the second storage battery or determines the charging voltage of a single entity of the second storage battery and sums the determined charging voltage and the charging voltage of the first storage battery to obtain the charging voltage of the entire series circuit when the short-circuited state of both terminals of the second storage battery is released by the first switcher and charging is performed from the power generation element to the series circuit, and performs control so that the first switcher enters the closed state when the charging voltage of the entire series circuit becomes equal to or higher than a predetermined second threshold voltage that is higher than the first threshold voltage.

In the power storage system having such a configuration, the second storage battery with a small capacitance is connected in series with the first storage battery, and the first switcher is connected in parallel to the second storage battery. The first switcher short-circuits both terminals of the second storage battery in a closed state and releases the short-circuited state of the second storage battery in an open state. The switching unit controls open and closed states of the first switcher. When both terminals of the second storage battery are short-circuited by the first switcher and power is supplied from the first storage battery to the load device via the first switcher, the switching unit compares the charging voltage of the first storage battery with the first threshold voltage.

When the charging voltage of the first storage battery becomes equal to or lower than the first threshold voltage in a state in which power is supplied from the first storage battery to the load device via the first switcher, the switching unit causes the first switcher to enter an open state to release the short-circuited state of both terminals of the second storage battery. When the short-circuited state of the second storage battery is released and power is supplied from the power generation element to the series circuit of the first storage battery and the second storage battery, the switching unit determines, for example, a charging voltage of the first storage battery and the second storage battery (a charging voltage of the entire series circuit) and causes the first switcher to enter a closed state to short-circuit both terminals of the second storage battery when the charging voltage becomes equal to or higher than a predetermined second threshold voltage.

Further, for example, the switching unit may determine the charging voltage of a single entity of the second storage battery (a charging voltage of a predetermined portion of the series circuit), and cause the first switcher to enter a closed state so that both terminals of the second storage battery are short-circuited when a sum of the charging voltage of the second storage battery and the charging voltage of the first storage battery (the charging voltage of the entire series circuit) becomes equal to or higher than a predetermined second threshold voltage.

Thus, in the power storage system, it is possible to cause the operation of the load device to return in a short amount of time when the power generation element performs power generation.

Further, since the charging voltage of the second storage battery with a small capacitance increases in a short amount of time, the charging voltage can increase to a voltage equal to or higher than the second threshold voltage in a short amount of time. Therefore, the power storage system can cause the operation of the load device to return in a short amount of time.

Further, in a normal state, the second storage battery is short-circuited by the first switcher, and both a positive electrode and a negative electrode thereof have the same potential as a positive electrode of the first storage battery. Therefore, when the first switcher is opened, charging of the second storage battery is started from the potential of the first storage battery at this time. Thus, the power storage system can charge the second storage battery to a voltage equal to or higher than the second threshold voltage in a short amount of time. In other words, since the second storage battery is connected in series with the first storage battery, a charging operation is started from the potential of the first storage battery even when a potential difference at the positive electrode and the negative electrode of the second storage battery is small. Therefore, the power storage system can cause the operation of the load device to return in a short amount of time.

According to a second aspect of the present invention, in the power storage system according to the first aspect, the capacitance of the first storage battery may be set on the basis of a generated power amount of the power generation element, an average value of power consumption of the load device to which power is supplied from the first storage battery, and a time in which the load device is continuously driven with power stored in the first storage battery, and the capacitance of the second storage battery may be set on the basis of the generated power amount of the power generation element, the average value of power consumption of the load device, and a time from stop of the operation of the load device due to a decrease in the charging voltage of the first storage battery to return of the operation of the load device through power generation in the power generation element.

In the power storage system having such a configuration, when the magnitude of the capacitance of the first storage battery that supplies power to the load device is determined, the capacitance of the first storage battery is determined on the basis of the generated power amount of the power generation element, an average value of the power consumption of the load device, and a time in which the load device is continuously driven by the power stored in the first storage battery. Further, in the power storage system, when the capacitance of the second storage battery with a small capacitance is determined, the capacitance of the second storage battery is determined on the basis of the generated power amount of the power generation element, the average value of the power consumption of the load device, and a time to return of the operation of the load device through the power generation in the generated power amount.

Accordingly, in the power storage system, the load device can be continuously driven at a desired time by the power stored in the first storage battery. Further, in the power storage system, when power generation is performed by the power generation element, it is possible to cause the operation of the load device to return at a desired time.

According to a third aspect of the present invention, in the power storage system according to the first or second aspect, the first storage battery may be a type of capacitor having a leakage current lower than that of the second storage battery.

In the power storage system having such a configuration, the first storage battery is a capacitor that holds power for a long amount of time. In order for stored power not to be wastefully consumed, a capacitor with a low leakage current is used as the first storage battery. On the other hand, the second storage battery is a capacitor that is used only in a short amount of time until the load device returns to the operation after supply of power to the second storage battery is started by the power generation element, and the maximum voltage to be charged is a difference voltage between the first threshold voltage and the second threshold voltage and is used only as a low charging voltage. Therefore, in the power storage system, a capacitor in which a leakage current is high can be used as the second storage battery.

Accordingly, the first storage battery can hold the power for a long amount of time without wastefully consuming the stored power.

According to a fourth aspect of the present invention, the power storage system according to the first to third aspects may further include a second switcher that connects or disconnects between the power storage system and the load device, and the switching unit causes the second switcher to enter a connection state when the charging voltage of the first storage battery exceeds a third threshold voltage that is equal to or higher than the first threshold voltage when comparing the charging voltage of the first storage battery with the third threshold voltage, and causes the second switcher to enter an open state when the charging voltage of the first storage battery is equal to or lower than the third threshold voltage.

In the power storage system having such a configuration, the switching unit causes the second switcher to enter the connection state and supplies the power to the load device when the charging voltage of the first storage battery exceeds the third threshold voltage and the required power can be supplied from the first storage battery to the load device. On the other hand, the switching unit causes the second switcher to enter the open state and stop the supply of the power to the load device when the charging voltage of the first storage battery is equal to or lower than the third threshold voltage and the required power cannot be supplied from the first storage battery to the load device.

Accordingly, the power storage system can cause the second switcher to enter the open state and stop supply of the power to the load device when the required power cannot be supplied to the load device, and can cause the second switcher to enter the connection state and supply the power to the load device when the required power can be supplied to the load device.

According to a fifth aspect of the present invention, in the power storage system according to the fourth aspect, the third threshold voltage may be set to the same voltage as the first threshold voltage, and the switching unit may cause the second switcher to enter a closed state when the switching unit causes the first switcher to enter a closed state and short-circuit both terminals of the second storage battery, and cause the second switcher to enter the open state when the switching unit causes the first switcher to enter the open state and release a short-circuited state of both terminals of the second storage battery.

In the power storage system having such a configuration, the switching unit causes the second switcher to enter the connection state and supplies the power to the load device when the switching unit causes the first switcher to enter the closed state and short-circuits both terminals of the second storage battery, that is, when required power can be supplied from the first storage battery to the load device. Further, the switching unit causes the second switcher to enter the open state when the switching unit causes the first switcher to enter the open state and release the short-circuited state of both terminals of the second storage battery, that is, when charging is performed from the power generation element to the series circuit of the first storage battery and the second storage battery.

Accordingly, the power storage system can cause the second switcher to enter the connection state when the power storage system causes the first switcher to enter the closed state, and cause the second switcher to enter the open state when the power storage system causes the first switcher to enter the open state. That is, the power storage system can control the opened and closed state of the first switcher and the opened and closed state of the second switcher at the same timing.

According to a sixth aspect of the present invention, the power storage system according to the first to fifth aspects includes a DC/DC converter that converts an output voltage of the power generation element into a predetermined voltage and supplies the voltage to the first storage battery and the second storage battery, and the DC/DC converter controls the output voltage so that the charging voltage of the first storage battery does not exceed a predetermined upper limit voltage.

In the power storage system having such a configuration, the DC/DC converter is connected to the output side of the power generation element. This DC/DC converter converts the output voltage of the power generation element into a voltage according to the power supply voltage that is supplied to the load device. The DC/DC converter performs, using the converted voltage, supply of power to the first storage battery when the first switcher is in a closed state and performs supply of power to the series circuit of the first storage battery and the storage battery when the first switcher is in an open state. Further, the DC/DC converter performs control so that the output voltage does not exceed a predetermined upper limit voltage, to thereby prevent the first storage battery from being overcharged.

Accordingly, the power storage system can convert the output voltage of the power generation element into a voltage at which the load device can be operated. Further, the DC/DC converter can prevent the first storage battery from being overcharged.

According to a seventh aspect of the present invention, in the power storage system according to the first to sixth aspects, the first storage battery may be a lithium ion capacitor.

In the power storage system having such a configuration, it is necessary for the first storage battery with a large capacitance to hold charge for a long amount of time. Therefore, a lithium ion capacitor with a low leakage current is used as the first storage battery.

Thus, the first storage battery can hold power supplied from the power generation element for a long amount of time so that it is not wastefully consumed. Therefore, the power storage system of the present invention can operate the load device for a long amount of time in a case in which the power generation element stops power generation or a case in which the generated power amount of the power generation element is smaller than the power consumption amount of the load device.

According to an eighth aspect of the present invention, a power storage method is a power storage method in a power storage system including a power generation element that performs environmental power generation, a first storage battery that receives power generated by the power generation element and supplies the power to a load device, a second storage battery that has a capacitance smaller than that of the first storage battery and is connected in series with the first storage battery, a first switcher that is connected in parallel to the second storage battery, short-circuits both terminals of the second storage battery in a closed state, and releases a short-circuited state of the second storage battery in an open state, and a switching unit that controls the opened and closed states of the first switcher, wherein the switching unit compares a charging voltage of the first storage battery with a predetermined first threshold voltage when both terminals of the second storage battery are short-circuited by the first switcher and charging is performed from the first storage battery to the load device via the first switcher, and performs control so that the first switcher enters an open state when the charging voltage of the first storage battery becomes equal to or lower than the predetermined first threshold voltage, determines the charging voltage of the entire series circuit or determines the charging voltage of a single entity of the second storage battery and sums the determined charging voltage and the charging voltage of the first storage battery to obtain the charging voltage of the entire series circuit when the short-circuited state of both terminals of the second storage battery is released by the first switcher and charging is performed from the power generation element to the series circuit of the first storage battery and the second storage battery, and performs control so that the first switcher enters the closed state when the charging voltage of the entire series circuit becomes equal to or higher than a predetermined second threshold voltage that is higher than the first threshold voltage.

Thus, in the power storage system, it is possible to cause the operation of the load device to return in a short amount of time when the power generation element performs power generation.

According to a ninth aspect of the present invention, there is provided a power storage system, including: a power generation element that performs environmental power generation; a power supply line that supplies power to a load device; a first storage battery that is charged with power generated by the power generation element via the power supply line and supplies the power to the load device; a second storage battery that has a capacitance smaller than that of the first storage battery; a switcher that is selectively set to a parallel connection state in which the first storage battery and the second storage battery are connected in parallel between the power supply line and a ground and a series connection state in which the first storage battery and the second storage battery are connected in series between the power supply line and the ground; a voltage determinator that determines a voltage at which the first storage battery is over-discharged; and a switching unit that controls the switcher according to the determination voltage of the voltage determinator, wherein the switching unit has a first threshold voltage that is compared with a voltage when the determination voltage of the voltage determinator decreases, and a second threshold voltage that is compared with the voltage when the determination voltage of the voltage determinator increases, the switching unit compares the determination voltage of the voltage determinator with the first threshold voltage when the switcher is set to the parallel connection state, and sets the switcher to the series connection state when the determination voltage of the voltage determinator becomes equal to or lower than the first threshold voltage, and the switching unit compares the determination voltage of the voltage determinator with the second threshold voltage when the switcher is set to the series connection state, and sets the switcher to the parallel connection state when the determination voltage of the voltage determinator becomes equal to or higher than the voltage with the second threshold.

Thus, in the power storage system according to one aspect of the present invention, it is possible to cause the operation of the load device to return in a short amount of time when the power generation element performs power generation.

According to a tenth aspect of the present invention, in the power storage system according to the ninth aspect, the switcher may include a first switcher that connects and disconnects between the power supply line and the first storage battery, and a second switcher that selectively connects the second storage battery to the ground side and the first storage battery side, the first switcher may be set so that the power supply line and the first storage battery are connected and the second switcher is set to select the ground side to set the parallel connection state, and the first switcher may be set so that the power supply line and the first storage battery are disconnected and the second switcher is set to select the first storage battery side to set the series connection state.

Thus, in the power storage system according to an aspect of the present invention, a state in which the first storage battery and the second storage battery are connected in parallel between the power supply line and the ground and a state in which the first storage battery and the second storage battery are connected in series between the power supply line and the ground can be selectively set by the first switcher and the second switcher. When the system restarts, the first storage battery and the second storage battery are connected in series between the power supply line and the ground. Thus, it is possible to shorten a restart time.

According to an eleventh aspect of the present invention, in the power storage system according to the ninth or tenth aspect, the capacitance of the first storage battery may be set on the basis of a generated power amount of the power generation element, the average value of power consumption of the load device to which power is supplied from the first storage battery, and the time in which the load device is continuously driven with power stored in the first storage battery, and the capacitance of the second storage battery may be set on the basis of the generated power amount of the power generation element, the average value of power consumption of the load device, and a time from stop of the operation of the load device due to a decrease in the charging voltage of the first storage battery to return of the operation of the load device through power generation in the power generation element.

Accordingly, in the power storage system, the load device can be continuously driven at a desired time by the power stored in the first storage battery. Further, in the power storage system, when power generation is performed by the power generation element, it is possible to cause the operation of the load device to return at a desired time.

According to a twelfth aspect of the present invention, in the battery system according to the ninth to eleventh aspects, the voltage determinator may determine the voltage of the power supply line, the first threshold voltage may be set according to a lower limit voltage of the first storage battery, and the second threshold voltage may be set to a voltage obtained by adding a hysteresis voltage to the first threshold voltage.

Cells of the first storage battery are prevented from deteriorating by setting the first threshold voltage according to the lower limit voltage of the first storage battery. Further, it is possible to stabilize the operation by setting the second threshold voltage to the voltage obtained by adding the hysteresis voltage to the first threshold voltage.

According to a thirteenth aspect of the present invention, in the battery system according to the ninth to eleventh aspects, the voltage determinator may determine the voltage of the first storage battery, the first threshold voltage may be set according to a lower limit voltage of the first storage battery, and the second threshold voltage may be set to a voltage obtained by adding a correction hysteresis voltage corrected according to the capacitance of the first storage battery and the capacitance of the second storage battery to the first threshold voltage.

Cells of the first storage battery are prevented from deteriorating by setting the first threshold voltage according to the lower limit voltage of the first storage battery. Further, it is possible to stabilize the operation by setting the second threshold voltage to the voltage obtained by adding the correction hysteresis voltage corrected according to the capacitance of the first storage battery and the capacitance of the second storage battery to the first threshold voltage.

According to a fourteenth aspect of the present invention, in the power storage system according to the ninth to thirteenth aspects, the first storage battery may be a type of capacitor having a leakage current lower than that of the second storage battery.

In the power storage system having such a configuration, it is necessary for the first storage battery with a large capacitance to hold charge for a long amount of time. Therefore, a lithium ion capacitor with a low leakage current is used as the first storage battery.

According to a fifteenth aspect of the present invention, the power storage system according to the ninth to fourteenth aspects may include a DC/DC converter that converts an output voltage of the power generation element into a predetermined voltage and supplies the voltage to the first storage battery and the second storage battery, and the DC/DC converter may control the output voltage so that the charging voltage of the first storage battery does not exceed a predetermined upper limit voltage.

Accordingly, the power storage system can convert the output voltage of the power generation element into a voltage at which the load device can be operated. Further, the DC/DC converter can prevent the first storage battery from being overcharged.

According to a sixteenth aspect of the present invention, in the power storage system according to the ninth to fifteenth aspects, the first storage battery may be a lithium ion capacitor.

In the power storage system having such a configuration, it is necessary for the first storage battery with a large capacitance to hold charge for a long amount of time. Therefore, a lithium ion capacitor with a low leakage current is used as the first storage battery.

According to a seventeenth aspect of the present invention, there is provided a power storage method in a power storage system including a power generation element that performs environmental power generation, a power supply line that supplies power to a load device, a first storage battery that is charged with power generated by the power generation element via the power supply line and supplies the power to the load device, a second storage battery that has a capacitance smaller than that of the first storage battery, a switcher that is selectively set to a parallel connection state in which the first storage battery and the second storage battery are connected in parallel between the power supply line and a ground and a series connection state in which the first storage battery and the second storage battery are connected in series between the power supply line and the ground, a voltage determinator that determines a voltage at which the first storage battery is over-discharged, and a switching unit that controls the switcher according to the determination voltage of the voltage determinator, wherein the switching unit has a first threshold voltage that is compared with a voltage when the determination voltage of the voltage determinator decreases, and a second threshold voltage that is compared with the voltage when the determination voltage of the voltage determinator increases, the switching unit compares the determination voltage of the voltage determinator with the first threshold voltage when the switcher is set to the parallel connection state, and sets the switcher to the series connection state when the determination voltage of the voltage determinator becomes equal to or lower than the first threshold voltage, and the switching unit compares the determination voltage of the voltage determinator with the second threshold voltage when the switcher is set to the series connection state, and sets the switcher to the parallel connection state when the determination voltage of the voltage determinator becomes equal to or higher than the voltage with the second threshold.

Thus, in the power storage system, it is possible to cause the operation of the load device to return in a short amount of time when the power generation element performs power generation.

Effects of the Invention

According to the power storage system and the power storage method according to the aspects, it is possible to cause the operation of the load device to return in a short amount of time when the power generation element performs power generation.

BRIEF DESCRIPTION OF DRAWINGS

FIG. 3 is an illustrative diagram showing an aspect of current consumption in a load device according to the first embodiment.

EMBODIMENTS FOR CARRYING OUT THE INVENTION

Hereinafter, embodiments of the present invention will be described with reference to the accompanying drawings.

First Embodiment

Figure 1:
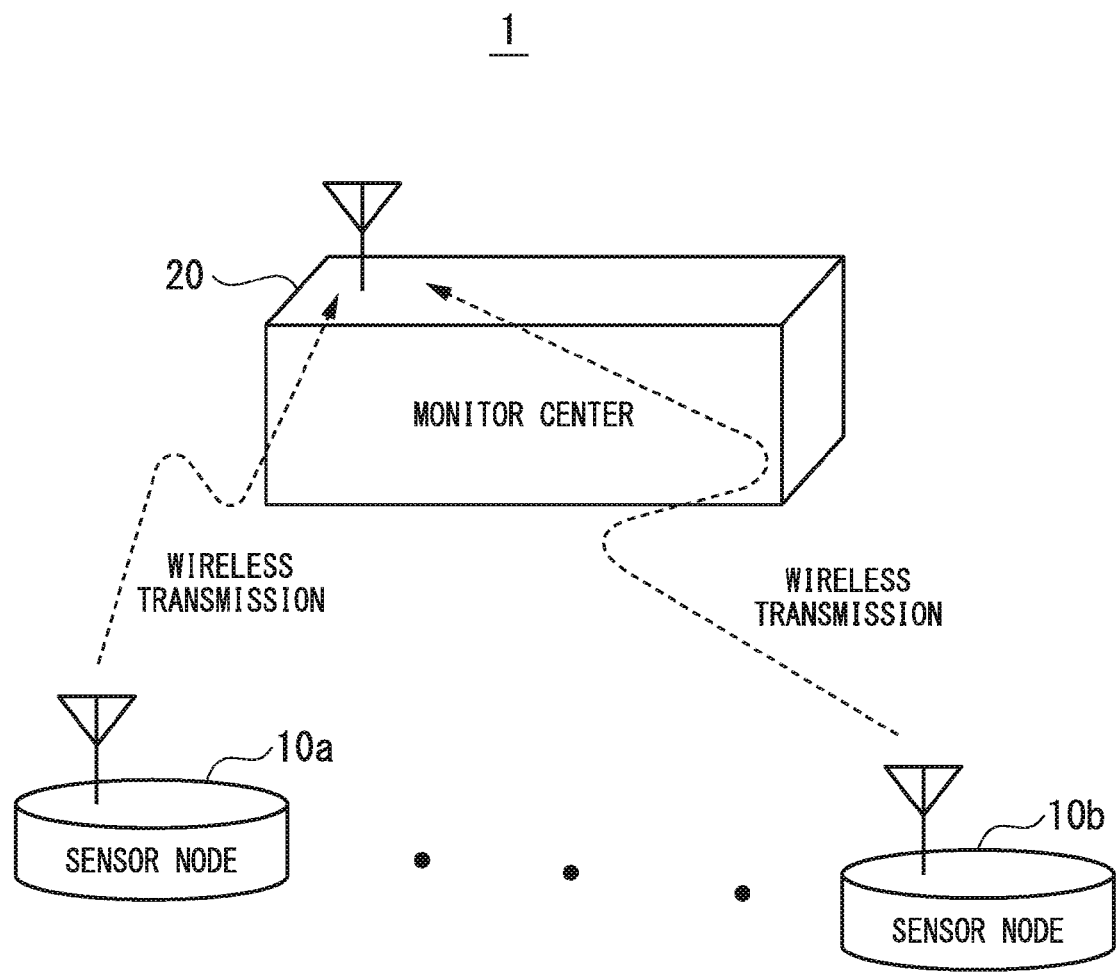
FIG. 1 is an illustrative diagram showing an overview of a wireless sensor system.

FIG. 1 is an illustrative diagram showing an overview of a wireless sensor system 1. As shown in FIG., the wireless sensor system 1 includes a monitor center 20, and sensor nodes 10a and 10b. The sensor nodes 10a and 10b includes a power storage system 100 (see FIG. 2) of the present invention described below.

The monitor center 20 collects measurement results of the ambient environment in the sensor nodes 10a and 10b, and performs arithmetic processing on the collected measurement results. The sensor nodes 10a and 10b wirelessly transmit the measurement results to the monitor center 20.

Here, the measurement results include, for example, information indicating temperature, humidity, $CO_2$ concentration, vibration, water level, illuminance, voltage, current, sound, image, or the like as information determined by the sensor nodes 10a and 10b. Further, the measurement results may include presence or absence of a person, and a result determined using an infrared sensor or the like. Further, the sensor nodes 10a and 10b may be a stationary device or may be a wall-mounted or wall-pasted device.

The sensor nodes 10a and 10b is operated by power supplied by energy harvest (environmental power generation) power supply, and do not require an arrangement of a power line or the like. Accordingly, a degree of freedom at the time of the arrangement is enhanced.

In FIG. 1, although two sensor nodes 10a and 10b are shown as sensor nodes, the number of sensor nodes may be one or may be three or more.

Further, the sensor node 10a and the sensor node 10b have the same configuration. In the following description, when either or both of the sensor node 10a and the sensor node 10b are shown, the sensor node 10a and the sensor node 10b are described as a sensor node 10.

Figure 2:
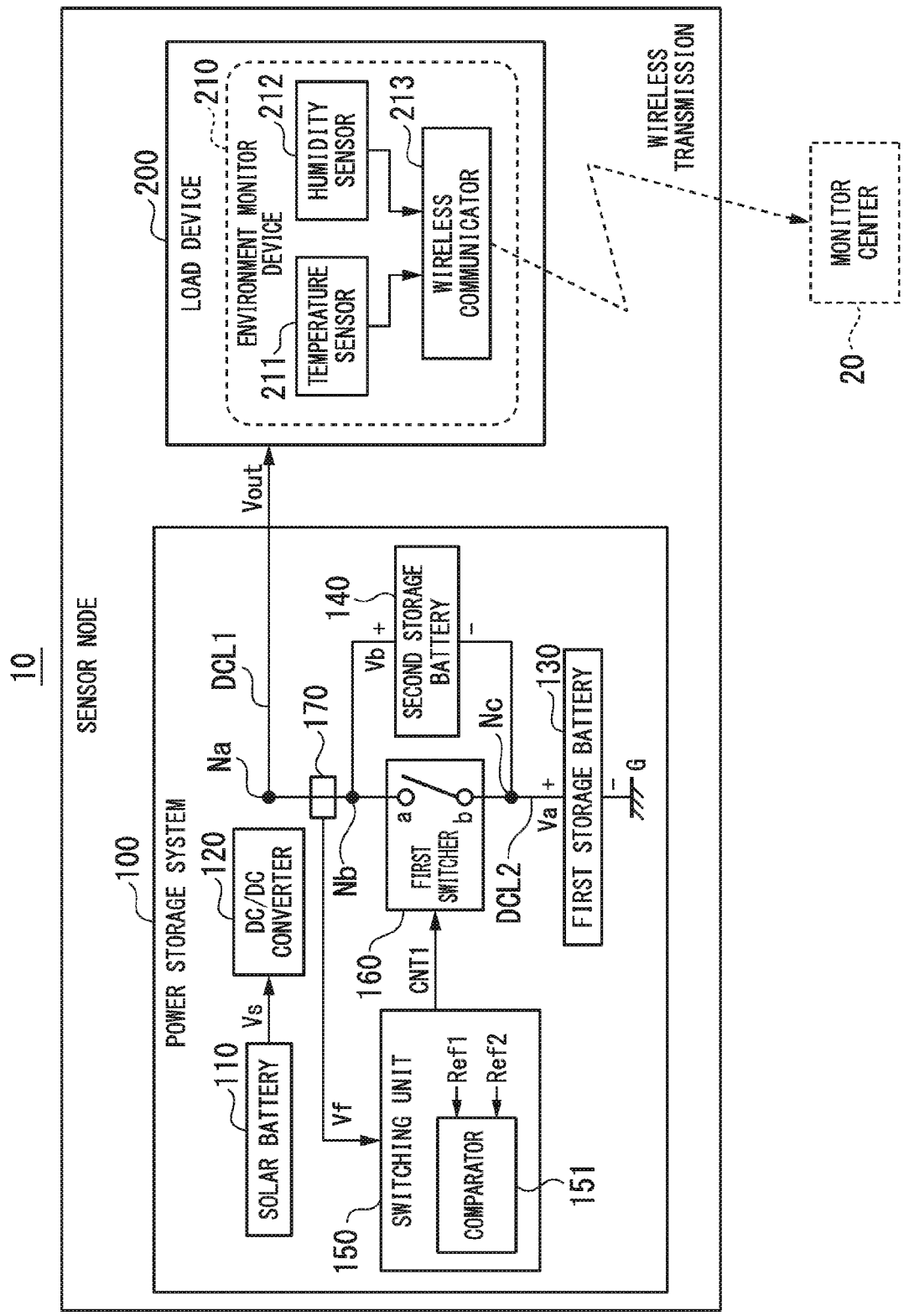
FIG. 2 is a configuration diagram showing a configuration example of a sensor node using a power storage system according to a first embodiment.

FIG. 2 is a configuration diagram showing a configuration example of the sensor node 10 using the power storage system 100 according to this embodiment. The sensor node 10 is, for example, a sensor node that is installed in an interior of an office or the like, and is a sensor node to which power is supplied by solar power generation or indoor light power generation. The sensor node 10 acquires environment information such as temperature and humidity, and periodically wirelessly transmits the environment information to the monitor center 20. For example, the sensor node 10 transmits the environment information to the monitor center 20 at five-minute intervals.

As shown in FIG. 2, the sensor node 10 includes the power storage system 100 that stores, in a storage battery, power generated by a solar battery 110 (a power generation element) that performs environmental power generation, and a load device 200 to which power is supplied from the power storage system 100.

The load device 200 is, for example, an environment monitor device 210 that functions as a wireless sensor that operates without a wiring or battery replacement. The environment monitor device 210 includes a temperature sensor 211 that measures temperature of an interior of an office or the like, and a humidity sensor 212 that measures humidity of the interior. The environment monitor device 210 periodically wirelessly transmits information on the indoor temperature measured by the temperature sensor 211 and information on the indoor humidity measured by the humidity sensor 212 to the external monitor center 20 using a wireless communicator 213.

In the following description, a case in which "the load device 200 stops an operation" means a state that the load device 200 cannot perform a measurement operation and a communication operation since the load device 200 cannot receive required power supply voltage from the power storage system 100, and is different from a sleep period (pause period) in a case in which the load device 200 performs periodic transmission.

Further, a case in which "the load device 200 returns to the operation" means that after the load device 200 temporarily stops the operation due to a decrease in power supply voltage, the load device 200 can receive required power supply voltage from the power storage system 100 again and can perform the measurement operation and the communication operation.

First, the load device 200 will be described.

In FIG. 2, the load device 200 is operated with power supplied from the power storage system 100. The load device 200 is configured to start the operation when a power supply voltage supplied from the power storage system 100 is equal to or higher than, for example, 2.7 V, and stop the operation if the power supply voltage supplied from the power storage system 100 is lower than 2.5 V. That is, the load device 200 is configured to stop the operation if the power supply voltage supplied from the power storage system 100 is equal to or lower than, for example, 2.5 V, and returns to the operation if the power supply voltage is equal to or higher than, for example, 2.7 V after the load device 200 temporarily stops the operation, and has a hysteresis characteristics of 0.2 V for the power supply voltage.

The temperature sensor 211 and the humidity sensor 212 are configured with a measurement instrument or a determinator according to use of the sensor node 10. The temperature sensor 211 and the humidity sensor 212 perform measurement under control of the wireless communicator 213 and outputs information indicating an obtained measurement result to the wireless communicator 213. The measurement by the temperature sensor 211 and the humidity sensor 212 is performed, for example, according to a timing at which the wireless communicator 213 performs wireless transmission.

The wireless communicator 213 encodes and modulates the measurement results input from the temperature sensor 211 and the humidity sensor 212 to generate a transmission signal, and periodically transmits the transmission signal to the monitor center 20 through wireless communication. Most of power consumption in the environment monitor device 210 occurs when the wireless communicator 213 performs wireless transmission. Further, in this embodiment, the wireless communicator 213 does not include a wireless reception function in order to reduce power consumption, but the present invention is not necessarily limited thereto and, the wireless communicator 213 may include the reception function, if necessary.

Further, in a state in which the wireless communicator 213 does not perform the wireless transmission, the environment monitor device 210 proceeds to a sleep state (pause period), thereby reducing power consumption. For example, when a transmission time interval is set to T1 minutes, the environment monitor device 210 enters a sleep state for the T1 minutes and returns to the operation after the T1 minutes has elapsed. When the environment monitor device 210 returns to the operation, the environment monitor device 210 acquires information on the temperature and the moisture again and wirelessly transmits the information. That is, the environment monitor device 210 does not perform the acquisition of the information on the temperature and the humidity and the wireless transmission during the sleep.

FIG. 3 is an illustrative diagram showing an aspect of current consumption in the load device 200 according to this embodiment. In FIG. 3, a horizontal axis indicates time and a vertical axis indicates a magnitude of current consumption. The load device 200 performs transmission, for example, every five minutes. For example, as shown in FIG. 3, the load device 200 starts a communication operation from time t11 and ends the communication operation at time t13.

In a communication period Tm from a time t11 to a time t13, a current flows with a peak value in the order of a maximum current A2 (several mA) at a point of a time t12. Thereafter, a pause period (sleep period) Ts from the time t13 to time t21 elapses, the load device 200 starts the communication operation again at the time t21 after five minutes has elapsed from the time t11, and ends the communication operation at a time t23. In the communication period Tm from the time t21 to the time t23, a current flows with a peak value in the order of a maximum current A2 (several mA) at a time t22.

In this case, the current flowing from the power storage system 100 to the load device 200 is, as an average value, a consumption current in the order of current A1 (tens of μA).

Referring back to FIG. 2, the power storage system 100 will be described.

The power storage system 100 supplies power to the load device 200 to operate the load device 200. The power storage system 100 includes a solar battery 110 using an environmental power generation element, a DC/DC converter 120 (a direct current voltage-to-direction current voltage converter), a first storage battery 130, a second storage battery 140, a switching unit 150, a first switcher 160, and a voltage determinator 170.

The solar battery 110 is a solar battery for low illuminance and is, for example, a solar battery that is used with illuminance equal to or lower than 10000 (Lux). In this embodiment, when brightness of a lamp is about 200 Lux, power generation capability of the solar battery 110 is about 200 to 500 (μW). The solar battery 110 performs charging of the first storage battery 130 and the second storage battery 140 and supply of power to the load device 200 in a period in which a lamp is turned on in an office or the like.

Figure 4A:
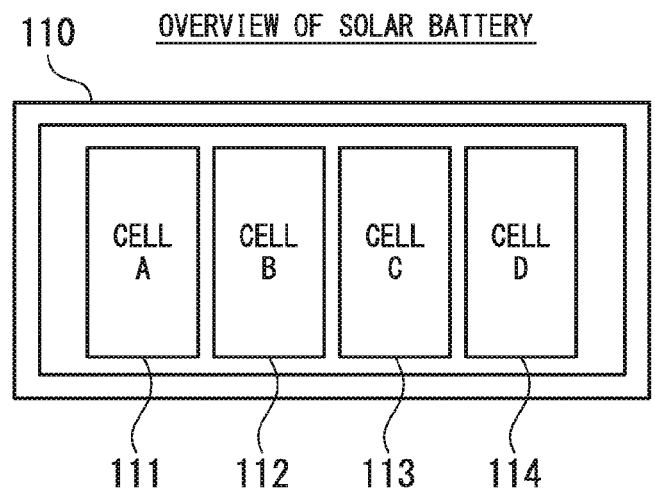
FIG. 4A is an illustrative diagram showing an overview of a solar battery according to the first embodiment.
Figure 4B:
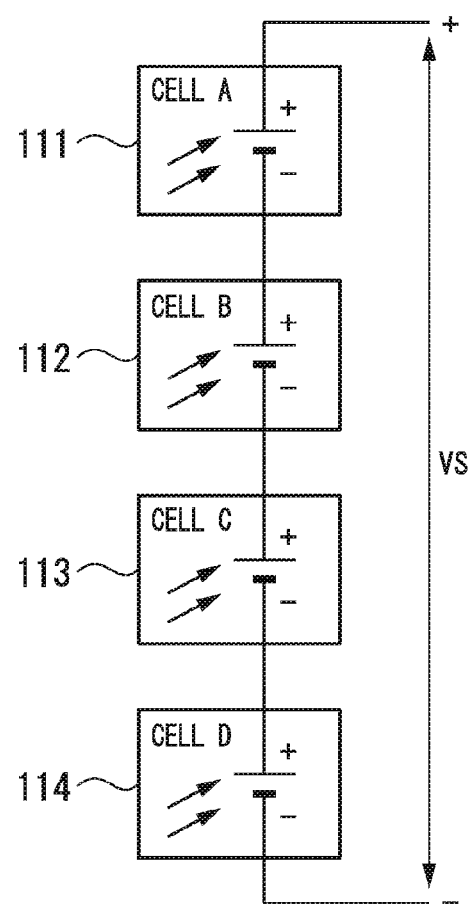
FIG. 4B is an illustrative diagram showing a connection state of solar battery cells of FIG. 4A.

FIGS. 4A and 4B are respectively illustrative diagrams showing an overview of a solar battery and a connection state of a solar battery cell according to this embodiment. As shown in a plan view of FIG. 4A, four solar battery cells including a solar battery cell A 111, a solar battery cell B 112, a solar battery cell C 113, and a solar battery cell D 114 are arranged in a plane form on the light reception surface side of the solar battery 110, and the four solar battery cells A 111 to D 114 are configured to be connected in series so that a predetermined output voltage Vs is obtained, as shown in FIG. 4B.

In an example of the solar battery 110 shown in FIGS. 4A and 4B, four solar battery cells including the solar battery cell A 111 to the solar battery cell D 114 are connected in series. The number of the solar battery cells connected in series is selected so that the voltage Vs output to the DC/DC converter 120 becomes a voltage at which a boosting operation and a step-down operation are performed at a predetermined efficiency or higher in the DC/DC converter 120. For example, when the solar battery cell is a low-illuminance dye-sensitized solar battery, it is preferable for the number of the solar battery cells connected in series to be, for example, at least three.

Referring back to FIG. 2, the description of the power storage system 100 will be continued.

An input side of the DC/DC converter 120 is connected to an output side of the solar battery 110. The output voltage Vs of the solar battery 110 is input to the DC/DC converter 120. The DC/DC converter 120 converts the input voltage Vs into a voltage according to the power supply voltage for the load device 200. For example, when the output voltage Vs of the solar battery 110 is lower than a voltage required for the load device 200, the DC/DC converter 120 is configured as a boost converter device or the like. The DC/DC converter 120 outputs the converted voltage to the power supply line DCL1, and charges the first storage battery 130 or the series circuit of the first storage battery 130 and the second storage battery 140. The output voltage of the DC/DC converter 120 is controlled so as not to exceed a predetermined upper limit voltage (for example, 3.7 V) and prevents the charging voltage of the first storage battery 130 from being overcharged. For example, when the input voltage Vs exceeds the upper limit voltage (3.7 V), the DC/DC converter 120 steps down the input voltage to the voltage according to the power supply voltage for the load device 200.

Normally, even when the output voltage (power generation voltage) Vs of the solar battery 110 does not exceed the upper limit voltage of the first storage battery 130 even when the output voltage Vs is the maximum voltage.

Further, the DC/DC converter 120 includes an integrated circuit and is configured to set the upper limit value of the output voltage, for example, by adjusting a resistance value of an external resistor.

The first storage battery 130 and the second storage battery 140 are connected in series. The first storage battery 130 and the second storage battery 140 are charged to store charge by the solar battery 110.

The first storage battery 130 is a lithium ion capacitor (LIC) and is, for example, a lithium ion capacitor with a large capacitance of 40 F (Farads), which has a capacitance larger than that of the second storage battery 140. The lithium ion capacitor with 40 F constituting the first storage battery 130 has a leakage current lower than that of the second storage battery 140. When the first switcher 160 is in an ON state in a period in which a lamp is turned on in an office or the like, the power generated by the solar battery 110 is supplied to the first storage battery 130 via the DC/DC converter 120. Further, when the solar battery 110 does not perform power generation or when the generated power amount of the solar battery 110 is smaller than the power consumption amount of the load device 200, the first storage battery 130 supplies the power charged in the first storage battery 130 to the load device 200. For example, the first storage battery 130 supplies the power charged in the first storage battery 130 to the load device 200 when the first switcher 160 is in an ON state in a period in which the lamp is turned off in an office or the like.

Further, the lithium ion capacitor of the first storage battery 130 is charged to, for example, a voltage from 2.5 V to 3.7 V at the time of shipment.

The second storage battery 140 is a capacitor with a capacitance smaller than the capacitance of the first storage battery 130 and is, for example, an electric double layer capacitor (EDLC) with an 1 F (farads). The second storage battery 140 is connected in series with the first storage battery 130. Further, the electric double layer capacitor constituting the second storage battery 140 has a leakage current higher than that of the lithium ion capacitor of the first storage battery 130. When the first switcher 160 is in an OFF state in a period in which a lamp is turned on in an office or the like, the power generated by the solar battery 110 is supplied to the second storage battery 140 via the DC/DC converter 120. Further, the second storage battery 140 supplies the power charged in the second storage battery 140 to the load device 200 when a battery value is equal to or greater than a predetermined value.

Since it is necessary for the first storage battery 130 to store charge for a long amount of time, a lithium ion capacitor with a low leakage current is used as the first storage battery 130. On the other hand, the second storage battery 140 is a capacitor that is short-circuited at both terminals in a normal state and is used only for a short amount of time when an operation of the load device 200 returns, and the maximum voltage to be charged is in the order of a voltage (0.2 V) of a difference between the first threshold voltage and the second threshold voltage and is used as a very low charging voltage. Therefore, a capacitor with a leakage current higher than that of the first storage battery 130 can be used as the second storage battery 140. The second storage battery 140 is configured so that at least one operation of the load device 200 can be performed with a capacity of a voltage difference between 2.7 V (a second threshold voltage) and 2.5 V (a first threshold voltage) of the second storage battery 140. Accordingly, in the power storage system 100, the voltage Va of the first storage battery 130 is prevented from being equal to or lower than 2.5 V (the first threshold voltage) immediately after the first switcher 160 is connected.

The capacitance of the first storage battery 130 is not limited to 40 F, and a capacitor with an appropriate capacitance can be selected on the basis of the generated power amount of the solar battery 110, the average value of the power consumption of the load device 200, and a time in which the load device 200 is desired to be continuously driven. Further, the capacitance of the second storage battery 140 is not limited to 1 F, and a capacitor with an appropriate capacitance can be selected on the basis of the generated power amount of the solar battery 110, the average value of the power consumption of the load device 200, and a time at which the load device 200 is desired to return.

Figure 5A:
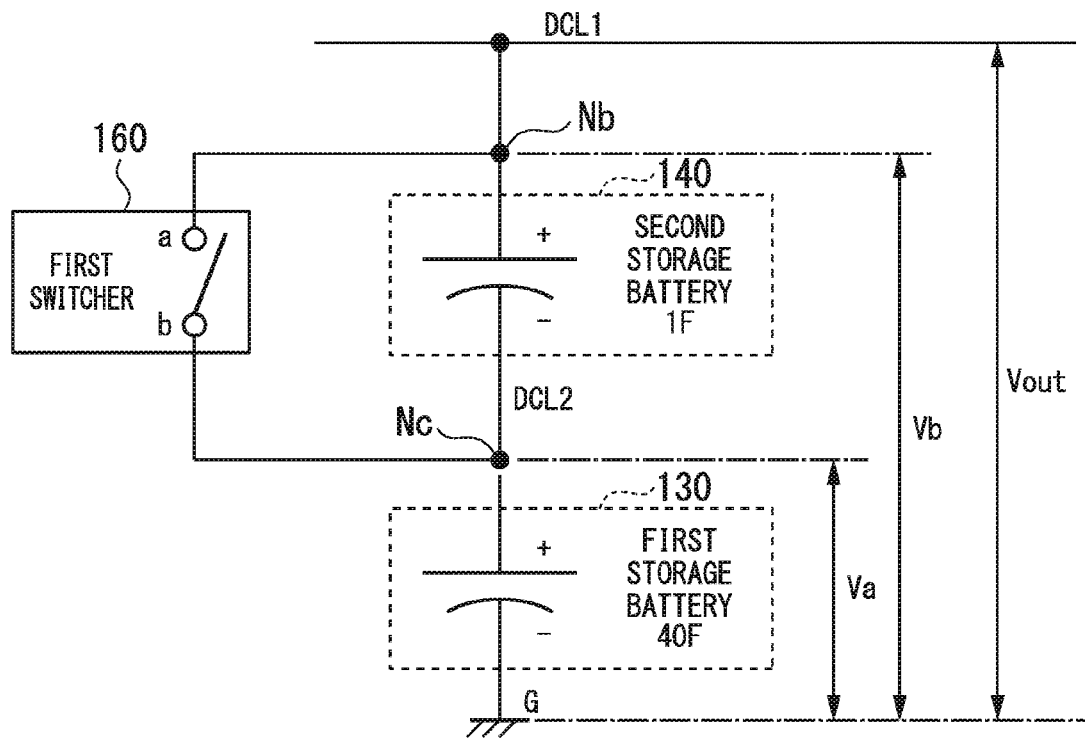
FIG. 5A is a configuration diagram showing a connection configuration between a first storage battery and a second storage battery according to the first embodiment.
Figure 5B:
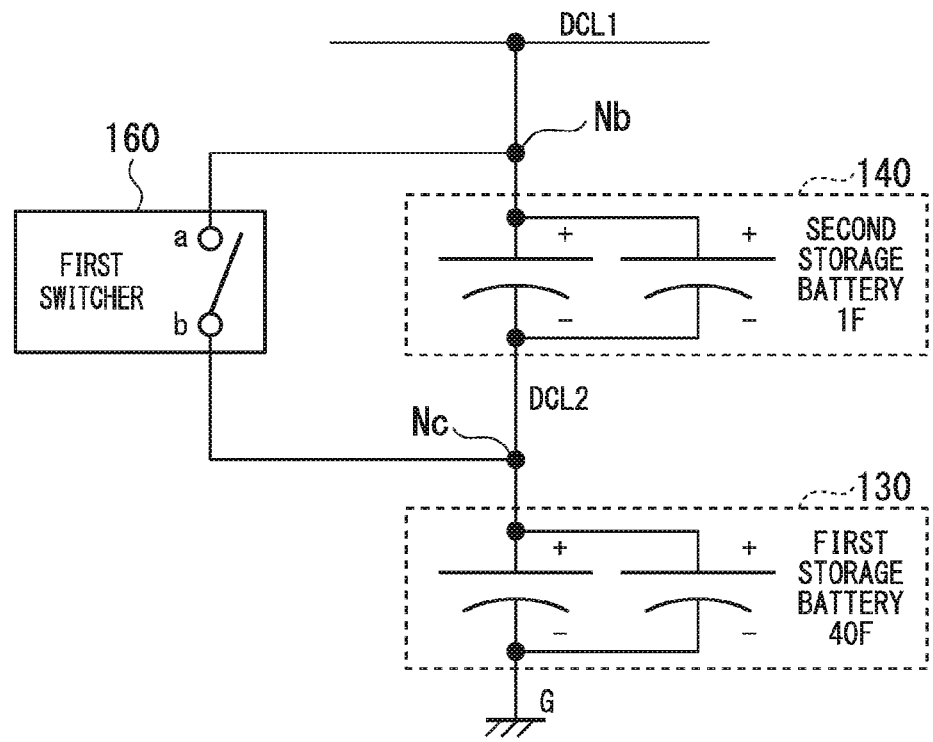
FIG. 5B is a configuration diagram showing a connection configuration between a first storage battery and a second storage battery according to the first embodiment.

FIGS. 5A and 5B are configuration diagrams showing a connection configuration between the first storage battery 130 and the second storage battery 140 according to this embodiment. FIG. 5A shows an example in which the first storage battery 130 and the second storage battery 140 are configured with a single entity of a capacitor. FIG. 5B shows an example in which the first storage battery 130 and the second storage battery 140 are configured with a plurality of capacitors.

As shown in FIG. 5A, the first storage battery 130 is configured as a lithium ion capacitor with a large capacitance of 40 F, and the second storage battery 140 is configured with an electric double layer capacitor with a small capacitance of 1 F. A positive electrode (+) terminal of the second storage battery 140 is connected to the power supply line DCL1, and a negative electrode (−) terminal of the second storage battery 140 is connected to a positive electrode (+) terminal of the first storage battery 130 via the power supply line DCL2. A negative electrode (−) terminal of the first storage battery 130 is connected to a ground G.

Referring back to FIG. 2, the description of the power storage system 100 will be continued.

The first switcher 160 is connected in parallel to the second storage battery 140. When the first switcher 160 is in an ON state (a closed state), both terminals of the second storage battery 140 are short-circuited, and when the first switcher 160 is in an OFF state (open state), both terminals of the second storage battery 140 are opened from a short-circuited state.

A terminal a of the first switcher 160 is connected to a node Nb of the power supply line DCL1, and is connected to a positive electrode (+) terminal of the second storage battery 140 via the node Nb. Further, a terminal b of the first switcher 160 is connected to a node Nc of the power supply line DCL2, and is connected to the negative electrode (−) terminal of the second storage battery 140 and the positive electrode (+) terminal of the first storage battery 130 via the node Nc.

When the first switcher 160 is in an ON state, that is, when both terminals of the second storage battery 140 is short-circuited, the power supply line DCL1 is connected to the power supply line DCL2, and the positive electrode (+) terminal of the first storage battery 130 is directly connected to the power supply line DCL1 via the first switcher 160. When the first switcher 160 is in an ON state, the charging voltage Va of the first storage battery 130 is output to the power supply line DCL1.

On the other hand, when the first switcher 160 is in an OFF state, the first storage battery 130 and the second storage battery 140 are connected in series. When the first switcher 160 is in an OFF state, the voltage Vb of positive electrode (+) terminal of the second storage battery 140 is output to the power supply line DCL1. The voltage Vb of the positive electrode (+) terminal of the second storage battery 140 is the charging voltage Vb of the series circuit of the first storage battery 130 and the second storage battery 140, and is a voltage obtained by adding the charging voltage of the second storage battery 140 and the charging voltage Va of the first storage battery 130.

In the following description, "the voltage Vb of the positive electrode (+) terminal of the second storage battery 140" or "the charging voltage Vb of the series circuit of the first storage battery 130 and the second storage battery 140" is simply referred to as "the voltage Vb of the second storage battery 140". Further, the charging voltage Va of the first storage battery 130 is a voltage of the positive electrode (+) terminal of the first storage battery 130, and "the voltage Va of the positive electrode (+) terminal of the first storage battery 130" or "the charging voltage Va of the first storage battery 130" may be simply referred to as "the voltage Va of the first storage battery 130".

Although an example in which the first storage battery 130 and the second storage battery 140 are configured with a single entity of a capacitor is shown in FIG. 5A, the first storage battery 130 and the second storage battery 140 may be configured with a plurality of storage capacitors, as shown in FIG. 5B. That is, each of the first storage battery 130 and the second storage battery 140 can be configured with any number of storage capacitors.

Referring back to FIG. 2, the description of the power storage system 100 will be continued.

The first switcher 160 enters an ON state or an OFF state according to instruction content of the control signal CNT1 input from the switching unit 150. Although an example in which the first switcher 160 is configured with a switch using a mechanical contact is shown in FIG. 2, the first switcher 160 actually includes a semiconductor switch using a semiconductor switching element such as a Metal Oxide Semiconductor Field Effect Transistor (MOSFET) or an Insulated Gate Bipolar Transistor (IGBT).

The voltage determinator 170 is configured with, for example, a resistance voltage division circuit, and determines a voltage Vout of the power supply line DCL1. The voltage determinator 170 outputs a voltage determination signal Vf of the voltage Vout of the power supply line DCL1 to the switching unit 150. The voltage determined by the voltage determinator 170 becomes the voltage Va of the first storage battery 130 when the first switcher 160 is in an ON state, and becomes the voltage Vb of the second storage battery 140 when the first switcher 160 is in an OFF state.

The switching unit 150 includes a comparator 151.

The comparator 151 compares the voltage determination signal Vf of the voltage Vout of the power supply line DCL1 input from the voltage determinator 170 with predetermined reference voltages Ref1 and Ref2 of the own unit.

The switching unit 150 outputs a control signal CNT1 for turning ON/OFF (closing/opening) the first switcher 160 to the first switcher 160 according to a comparison result of the comparator 151.

When the comparator 151 determines that the voltage Vout of the power supply line DCL1 is equal to or lower than 2.5 V (the first threshold voltage), the switching unit 150 outputs the control signal CNT1 to cause the first switcher 160 to enter an OFF state. Further, when the comparator 151 determines that the voltage Vout of the power supply line DCL1 is equal to or higher than 2.7 V (the second threshold voltage) after the switching unit 150 outputs the control signal CNT1 to cause the first switcher 160 to enter an OFF state, the switching unit 150 outputs the control signal CNT1 to cause the first switcher 160 to enter an ON state. That is, the switching unit 150 controls an opened and closed state of the first switcher 160 with hysteresis characteristics with a width of 0.2 V between 2.5 V and 2.7 V.

More specifically, when the first switcher is in an ON state, the comparator 151 compares the voltage determination signal Vf of the voltage Vout of the power supply line DCL1 with the predetermined reference voltage Ref1. The reference voltage Ref1 corresponds to the voltage 2.5 V (the first threshold voltage) that is used when it is determined that the first storage battery 130 approaches an over-discharge state. The comparator 151 determines whether or not the voltage Va of the first storage battery 130 is equal to or lower than 2.5 V by comparing the voltage determination signal Vf of the power supply line DCL1 with the predetermined reference voltage Ref1 in a state in which the first switcher 160 is turned ON. When the voltage Va of the first storage battery 130 is equal to or lower than 2.5 V, the switching unit 150 outputs the control signal CNT1 to the first switcher 160 to cause the first switcher 160 to enter the OFF state and connect the first storage battery 130 and the second storage battery 140 in series. Accordingly, the power storage system 100 stops charging of the first storage battery 130 and supply of power from the first storage battery 130 to the load device 200.

Further, when the first switcher 160 is in an OFF state, the comparator 151 compares the voltage determination signal Vf of the voltage Vout of the power supply line DCL1 with the predetermined reference voltage Ref2. The reference voltage Ref2 corresponds to the voltage 2.7 V (the second threshold voltage) that is used when it is determined whether or not the power storage system 100 returns to a normal state from a state in which charging from the solar battery 110 to the first storage battery 130 and supply of power from the first storage battery 130 to the load device 200 (hereinafter referred to as a stop state of supply of power from the first storage battery).

The comparator 151 compares the voltage determination signal Vf of the power supply line DCL1 with the reference voltage Ref2 to determine whether or not the voltage Vb of the second storage battery 140 is equal to or higher than 2.7 V when the first switcher 160 is in an OFF state. When the voltage Vb of the second storage battery 140 is equal to or higher than 2.7 V, the switching unit 150 causes the first switcher 160 to enter the ON state and short-circuits both terminals of the second storage battery 140 to directly connect the positive electrode (+) terminal of the first storage battery 130 to the power supply line DCL1. Accordingly, in the power storage system 100, charging of the first storage battery 130 and the supply of power from the first storage battery 130 to the load device 200 are resumed.

The switching unit 150 may determine the charging voltage of a single entity of the second storage battery 140 (the charging voltage of the predetermined portion of the series circuit) using the voltage determinator 170, and cause the first switcher 160 to enter the closed state and short-circuit both terminals of the second storage battery 140 when a sum of the charging voltage of the second storage battery 140 and the charging voltage of the first storage battery 130 (the charging voltage of the entire series circuit) becomes equal to or higher than the predetermined second threshold voltage. In this case, the switching unit 150 may regard the voltage of the first storage battery 130 as the first threshold voltage and determine the charging voltage of the entire series circuit on the basis of the storage capacitance of only the second storage battery 140. The switching unit 150 may determine the charging voltage of the entire series circuit or a predetermined portion when both terminals of the second storage battery 140 are released from the short-circuited state by the first switcher 160 and charging is performed from the solar battery 110 to the series circuit of the first storage battery 130 and the second storage battery 140, and perform controls so that the first switcher 160 enters the ON state when the charging voltage of the entire series circuit becomes equal to or higher than the predetermined second threshold voltage that is a voltage higher than the first threshold voltage.

Next, an operation of the power storage system 100 will be described.

When the solar battery 110 does not perform the power generation or when the generated power amount of the solar battery 110 is smaller than a power consumption amount of the load device 200, the power storage system 100 drives the load device 200 with the power (charge) stored in the first storage battery 130. The power storage system 100 is configured to continuously drive the load device 200 with the power stored in the first storage battery 130, for example, for about 60 hours. Further, the power storage system 100 is configured to cause the operation of the load device 200 to return in about 10 minutes after the power generation of the solar battery 110 is started again when the operation of the load device 200 is temporarily stopped due to a decrease in the charging voltage Va of the first storage battery 130 in a state in which the supply of power stops from the solar battery 110.

Further, the power storage system 100 is configured to be able to cause the operation of the load device 200 to return in a short amount of time according to the generated power amount of the solar battery 110, not only when the generated power amount of the solar battery 110 increases after the operation of the load device 200 temporarily stops due to a decrease in the charging voltage Va of the first storage battery 130 when the generated power amount of the solar battery 110 is smaller than the power consumption amount of the load device 200, but also when the state in which the generated power amount of the solar battery 110 is small continues.

In this disclosure, a case in which the solar battery 110 is in a power generation state, including a "case in which the solar battery 110 stops power generation, and the solar battery 110 starts the power generation again after the load device 200 stops the operation" or a "case in which the generated power amount of the solar battery 110 increases or a state in which the generated power amount is a small continues after the load device 200 stops the operation as the generated power amount of the solar battery 110 is smaller than the power consumption amount of the load device 200, may be simply referred to as a "case in which the solar battery 110 performs power generation."

In the power storage system 100, from the viewpoint of prevention of deterioration of cells of the lithium ion capacitor of the first storage battery 130, the charging voltage Va of the first storage battery 130 is prevented from having a voltage value lower than 2.5 V (the first threshold voltage) not to be over-discharged. Therefore, the power storage system 100 stops the supply of power from the first storage battery 130 to the load device 200 when the charging voltage of the first storage battery 130 is a voltage close to an over-discharge state of 2.5 V. For example, the load device 200 stops its own operation when a power supply voltage supplied from the power storage system 100 becomes equal to or lower than 2.5 V.

Here, when only the first storage battery 130 is recharged to a predetermined voltage and the operation of the load device 200 is caused to return by the first storage battery 130, it is necessary to consider the following points.

For example, it is necessary to prevent a repetitive operation of recharging of the first storage battery 130 by the solar battery 110, the return of the operation of the load device 200, a reduction in the charging voltage Va of the first storage battery 130 due to re-startup of the load device 200, and stop of the operation of the load device 200 due to a decrease in the charging voltage Va from being performed. Therefore, in the power storage system 100, a voltage at which the supply of power to the load device 200 starts is set to, for example, 2.7 V (the second threshold voltage). Further, accordingly, the load device 200 itself returns to the operation with the power supply voltage 2.7 V or more.

However, in the power storage system 100, since a charging current that can be supplied from the solar battery 110 that is an environmental power generation element to the first storage battery 130 is as low as tens of μA, a long charging time such as several hours is required when the first storage battery 130 with a capacitance of 40 F is charged from 2.5 V to 2.7 V. Therefore, there is a problem in that that the operation of the load device 200 stops for several hours at the time of recharging of the first storage battery 130.

Therefore, in the power storage system 100 of this embodiment, the second storage battery 140 and the first switcher 160 serving as a switching mechanism are used together with the first storage battery 130. The power storage system 100 short-circuits both terminals of the second storage battery 140 using the first switcher 160 in a normal state in which the charging voltage of the first storage battery 130 is equal to or higher than the first threshold voltage so that charging and discharging are performed using only the first storage battery 130. When the charging voltage Va of the first storage battery 130 becomes 2.5 V, the power storage system 100 stops the supply of power to the load device 200 and causes the first switcher 160 to enter the OFF state to connect the second storage battery 140 in series with the first storage battery 130.

Thereafter, when the power generation is performed by the solar battery 110, the solar battery 110 flows a charging current to the series circuit of the first storage battery 130 and the second storage battery 140. In this case, since the capacitance of the second storage battery 140 is greatly smaller than the capacitance of the first storage battery 130, the charging voltage of the second storage battery 140 rapidly increases due to the charging current from the solar battery 110. Therefore, the charging voltage Vb of the series circuit of the first storage battery 130 and the second storage battery 140 can reach a voltage of 2.7 V necessary to cause the operation of the load device 200 to return in a short amount of time. Accordingly, the power storage system 100 can cause the load device 200 to return in a short amount of time (for example, about 10 minutes).

Thus, the power storage system 100 of this embodiment can rapidly increase the output voltage Vout that is supplied to the load device 200 even when the first storage battery 130 with a large capacitance in which a charging time of several hours is taken due to a generated power amount of the solar battery 110 is used. Therefore, in the power storage system 100, for example, when the power generation of the solar battery 110 stops and the voltage Va of the first storage battery 130 decreases such that the operation of the load device 200 temporarily stops, it is possible to cause the operation of the load device 200 to return in a short amount of time after the solar battery 110 starts the power generation.

Further, the power storage system 100 can rapidly increase the output voltage Vout that is supplied to the load device 200 when the state in which a generated power amount is small continues after the operation of the load device 200 stops in a state in which the generated power amount of the solar battery 110 is small. Therefore, in the power storage system 100, when the operation of the load device 200 temporarily stops in a state in which the generated power amount of the solar battery 110 is small, it is possible to cause the operation of the load device 200 to return in a short amount of time according to the generated power amount of the solar battery 110.

When the state in which a generated power amount of the solar battery 110 is small continues, the load device 200 operates for a certain time, and then eventually, the charging voltage Va of the first storage battery 130 decreases to be equal to or lower than 2.5 V, and the operation of the load device 200 stops again. That is, in a state in which a generated power amount of the solar battery 110 is small, the operation stop and the operation return of the load device 200 are repeated. However, the load device 200 can continue to perform the measurement and communication operations for a certain time at the time of the operation return of the load device 200.

Further, in the power storage system 100 described above, although the first threshold voltage is set to 2.5 V, this voltage may have a value of a voltage or higher such that the lithium ion capacitor is not over-discharged. For example, if a voltage at which the voltage lithium ion capacitor enters an over-discharged state is 2.2 V, the first threshold voltage may be a voltage exceeding 2.2 V such as 2.3 V.

Further, in the power storage system 100, the second threshold voltage is set to 2.7 V so that the charging voltage of the second storage battery 140 is 0.2 V, but the second threshold voltage is not limited thereto and may, for example, 2.6 V. Further, the capacitance of the second storage battery 140 may be changed according to the second threshold voltage. For example, in the power storage system 100, when the second threshold voltage is set to 2.6 V, the capacitance of the second storage battery 140 is 2 F so that the same amount of charge as in the case in which the second threshold voltage is 2.7 V can be stored.

Figure 6A:
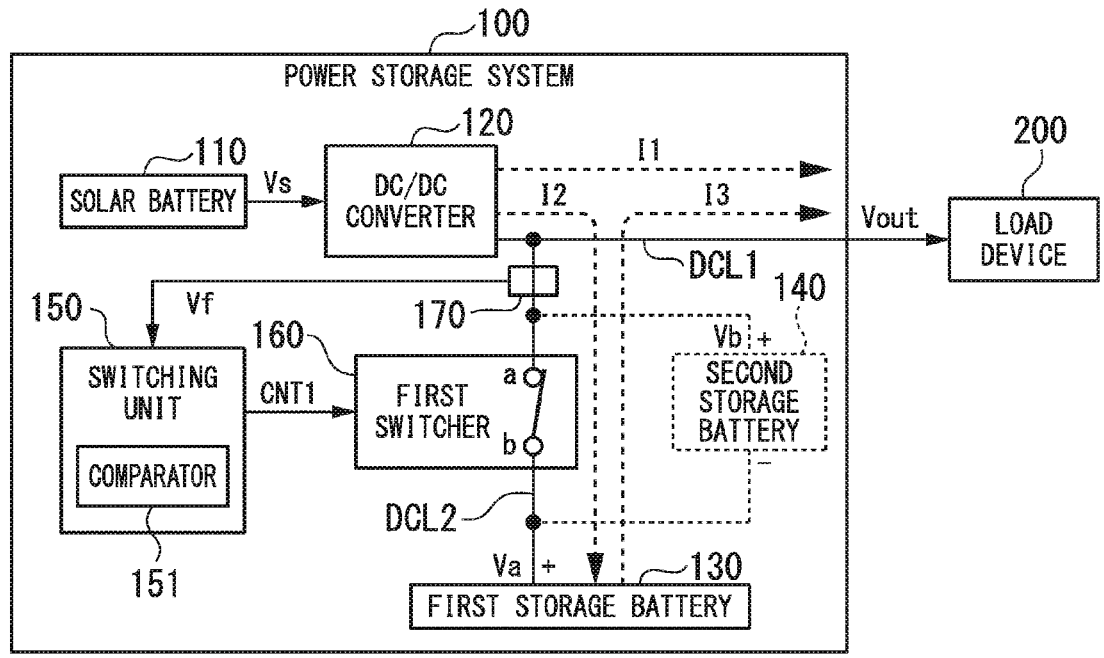
FIG. 6A is an illustrative diagram showing a state of supply of power to a load device when a first switcher is in an ON state according to the first embodiment.
Figure 6B:
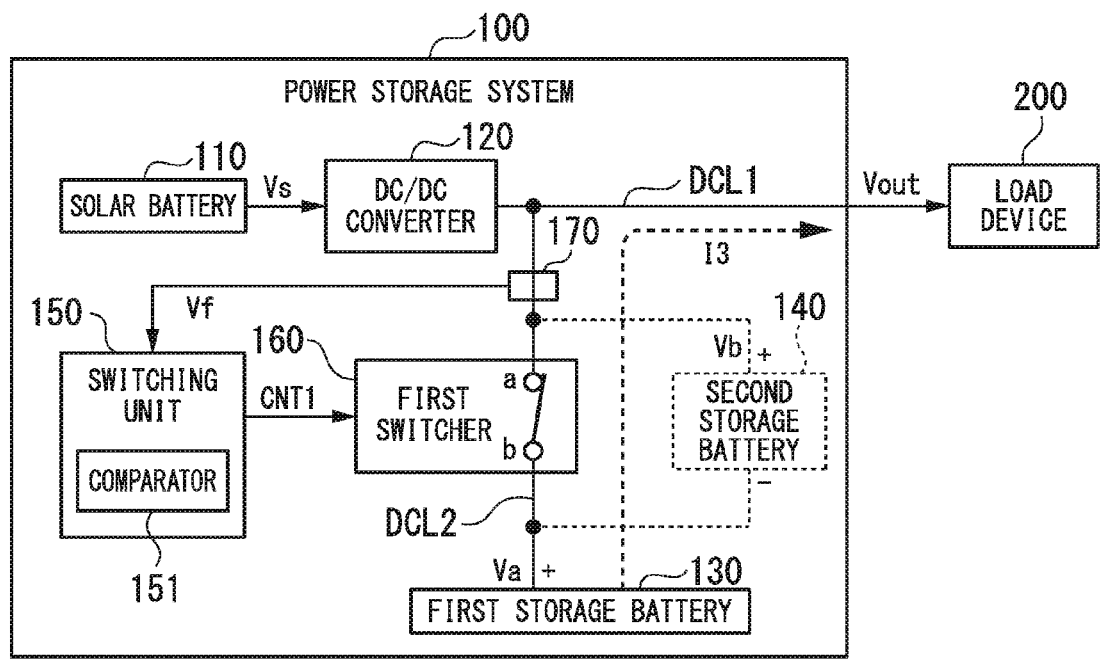
FIG. 6B is an illustrative diagram showing the state of supply of power to a load device when the first switcher is in the ON state according to the first embodiment.

FIGS. 6A and 6B are illustrative diagrams showing a state of supply of power to the load device 200 when the first switcher 160 according to this embodiment is in an ON state. Hereinafter, an aspect of supply of power to the load device 200 when the first switcher 160 is turned ON will be described with reference to FIGS. 6A and 6B.

An example shown in FIG. 6A is an example of a case in which the first switcher 160 is in an ON state, the solar battery 110 performs power generation, and the charging voltage Va of the first storage battery 130 exceeds 2.5 V (first threshold voltage).

In a state shown in FIG. 6A, when the power generated by the solar battery 110 is sufficiently high, for example, when the output voltage of the DC/DC converter 120 that performs voltage conversion of the output voltage Vs of the solar battery 110 is 3.0 V or the like, the DC/DC converter 120 flows a current I1 to the load device 200 to supply the power, and supplies a charging current I2 to the first storage battery 130 via the first switcher 160. Further, in the state shown in FIG. 6A, when the power generated by the solar battery 110 decreases and the generated power amount of the solar battery 110 is smaller than the power consumption amount of the load device 200, a current I3 flows from the first storage battery 130 to the load device 200 via the first switcher 160 to supply power. That is, when the generated power amount of the solar battery 110 is smaller than the power consumption amount of the load device 200, the first storage battery 130 flows the current I3 to the load device 200 via the first switcher 160 to supply the power.

On the other hand, as shown in FIG. 6B, when the solar battery 110 does not perform power generation and the power is not supplied from the DC/DC converter 120, the first storage battery 130 flows the current I3 to the load device 200 via the first switcher 160 to supply the power. In the state shown in FIG. 6B, if the output voltage of the first storage battery 130 is equal to or lower than 2.5 V, the load device 200 stops the measurement operation and the communication operation, and the current I3 does not flow from the first storage battery 130 to the load device 200. Thus, in the state shown in FIG. 6B, if the output voltage of the first storage battery 130 is equal to or lower than 2.5 V, the switching unit 150 switches the first switcher 160 to the OFF state. Accordingly, the power storage system 100 stops charging of the first storage battery 130 and the supply of power from the first storage battery 130 to the load device 200, and connects the first storage battery 130 in series with the second storage battery 140.

Figure 7A:
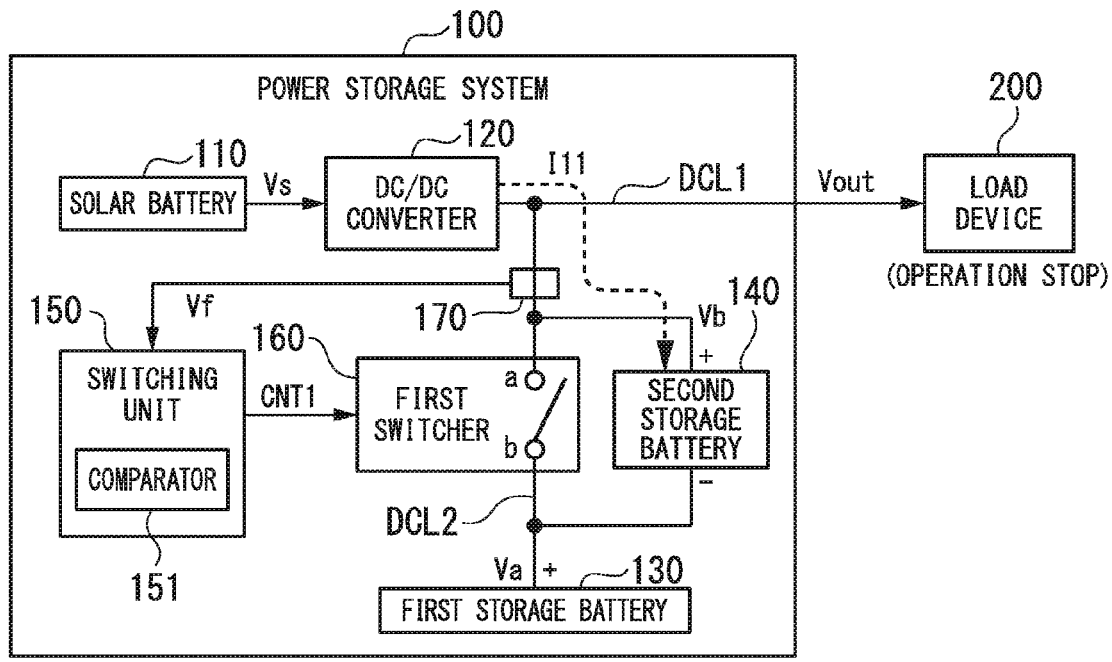
FIG. 7A is an illustrative diagram showing a state of supply of power from a solar battery to a second storage battery when the first switcher is in an OFF state according to the first embodiment.
Figure 7B:
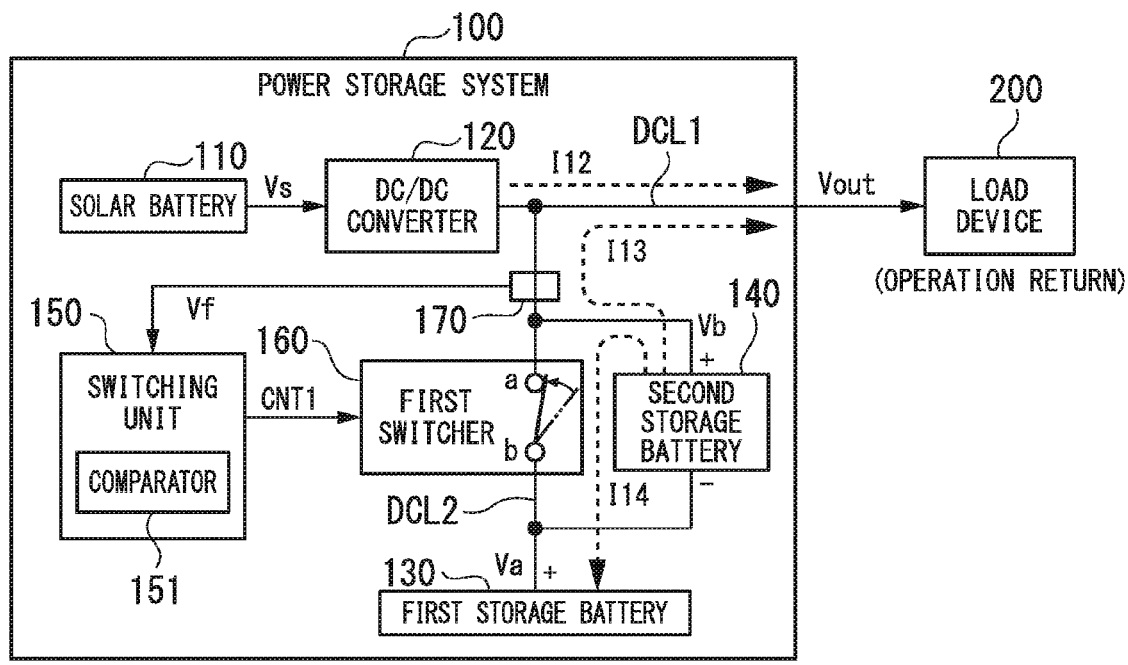
FIG. 7B is an illustrative diagram showing the state of supply of power from the solar battery to the second storage battery when the first switcher is in the OFF state according to the first embodiment.

FIGS. 7A and 7B are illustrative diagrams showing a state of supply of power from the solar battery 110 to the second storage battery 140 when the first switcher 160 according to this embodiment is in the OFF state. Hereinafter, an aspect of supply of power from the solar battery 110 to the second storage battery 140 and the first storage battery 130 when the first switcher 160 is turned OFF will be described with reference to FIGS. 7A and 7B.

FIG. 7A shows a state in which the solar battery 110 performs charging of the series circuit of the first storage battery 130 and the second storage battery 140 after the first switcher 160 enters an OFF state, and a state in which the load device 200 stops the operation. Since the voltage Vout of the power supply line DCL1 becomes the voltage Vb of the second storage battery 140 immediately after the first switcher 160 enters the OFF state, but the voltage Vb is substantially equal to the charging voltage 2.5 V of the first storage battery 130 since the charging voltage of the second storage battery 140 is initially about 0 V.

After the first switcher 160 enters the OFF state, a current I11 flows from the solar battery 110 to the series circuit of the first storage battery 130 and the second storage battery 140 that are connected in series. Accordingly, charging of the first storage battery 130 and the second storage battery 140 is started. In this case, since the capacitance of the first storage battery 130 is much larger than the capacitance of the second storage battery 140, an increase in the voltage Vb of the second storage battery 140 occupies most of an increase in the charging voltage of the second storage battery 140. Therefore, charging from the solar battery 110 to the series circuit of the first storage battery 130 and the second storage battery 140 can be regarded as charging from the solar battery 110 to the second storage battery 140. Therefore, in the following description, "an operation of performing charging from the solar battery 110 to the series circuit of the first storage battery 130 and the second storage battery 140" may be referred to as "an operation of performing charging from the solar battery 110 to the second storage battery 140".

when charging from the solar battery 110 to the second storage battery 140 is started, the voltage Vb of the second storage battery 140 rapidly increases as compared with the case in which the first storage battery 130 with 40 F is changed from the solar battery 110, since the capacitance of the second storage battery 140 is as small as 1 F. When the voltage Vb of the second storage battery 140 increases to 2.7 V, the load device 200 returns to the operation, and a current I12 flows from the solar battery 110 to the load device 200, as shown in FIG. 7B. Further, when the generated power amount of the solar battery 110 is smaller than the power consumption amount of the load device 200, a current I13 flows from the second storage battery 140 to the load device 200.

Accordingly, the load device 200 performs measurement and communication operations. Since the voltage Vb of the second storage battery 140 increases to 2.7 V, the first switcher 160 changes from the OFF state to the ON state and the power storage system 100 returns to an operation in the normal state shown in FIGS. 6A and 6B.

When the first switcher 160 changes from the OFF state to the ON state, a current I14 flows from the second storage battery 140 to the first storage battery 130 via the first switcher 160, and the first storage battery 130 is charged by the charge stored in the second storage battery 140, as shown in FIG. 7B.

Figure 8:
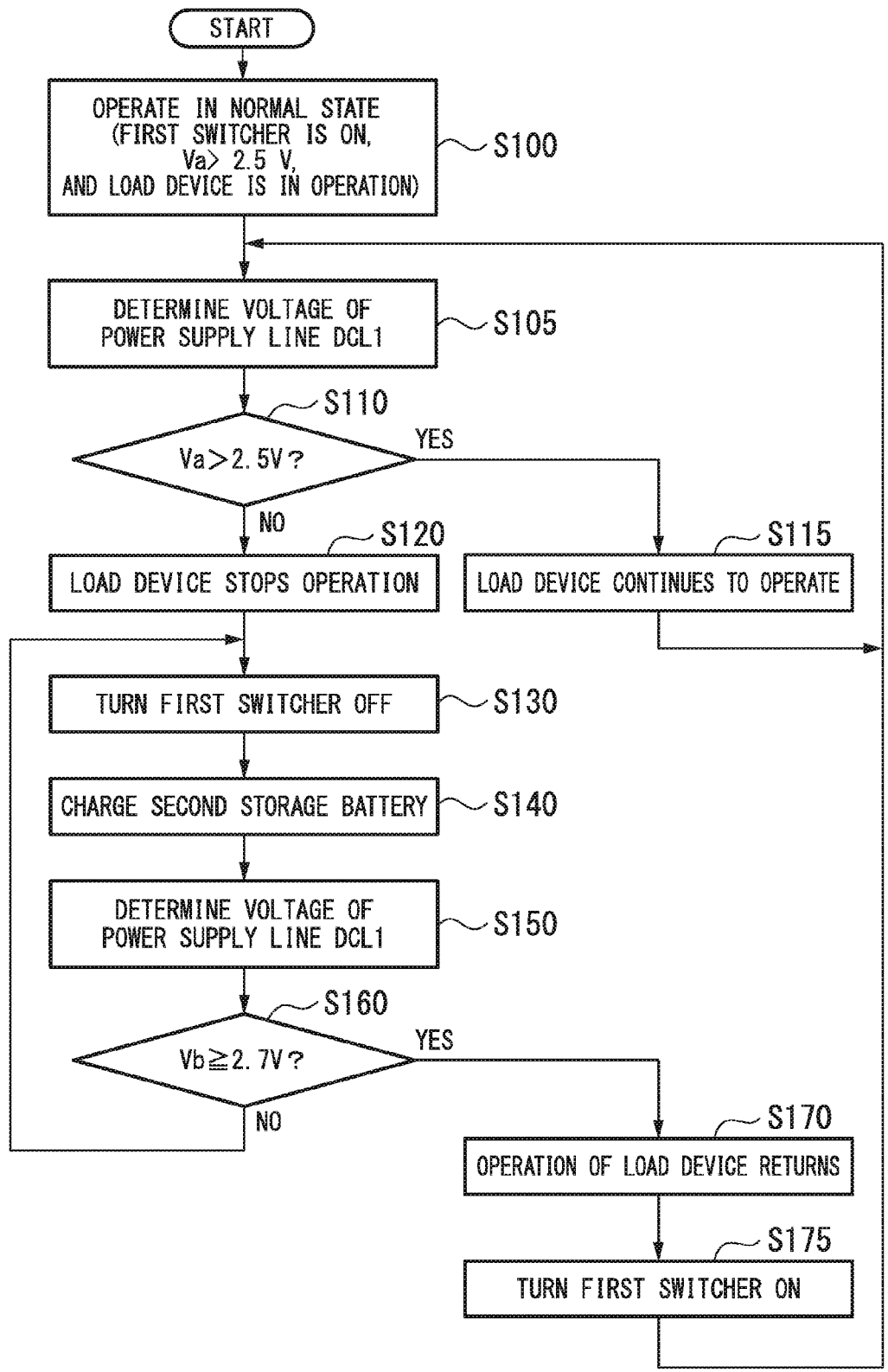
FIG. 8 is a flowchart showing a processing procedure in the power storage system according to the first embodiment.

FIG. 8 is a flowchart showing a processing procedure in the power storage system 100 according to this embodiment. In FIG. 8, a flow of the operation in the power storage system 100 described above is shown in a flowchart. Hereinafter, a flow of the process will be described with reference to FIG. 8.

First, the power storage system 100 is assumed to operate in a normal state (step S100). That is, in the power storage system 100, it is assumed that the first switcher 160 is in an ON state, the voltage Va of the first storage battery 130 exceeds 2.5 V, and the load device 200 is in operation.

Then, the voltage determinator 170 determines the voltage of the power supply line DCL1 (in this case, the voltage Va of the first storage battery 130) and outputs the voltage determination signal Vf to the switching unit 150 (step S105).

Then, the switching unit 150 determines whether or not the voltage Va of the first storage battery 130 exceeds 2.5 V (the first threshold voltage) by comparing the voltage determination signal Vf with the predetermined reference voltage Ref1 (step S110).

When the voltage Va of the first storage battery 130 is determined to exceed 2.5 V (the first threshold voltage) in step S110 (step S110: Yes), that is, when the voltage Va of the first storage battery 130 is not equal to or lower than 2.5 V, the load device 200 continues to operate (step S115) and the power storage system 100 returns to the process of step S105.

Then, the power storage system 100 executes step S105 and subsequent processes again.

On the other hand, when the voltage Va of the first storage battery 130 is determined not to exceed 2.5 V (the first threshold voltage) in step S110 (step S110: No), that is, when the voltage Va of the first storage battery 130 becomes equal to or lower than 2.5 V, the load device 200 stops the operation (step S120) and the power storage system 100 proceeds to a process of step S130. When the voltage Va of the first storage battery 130 becomes equal to or lower than 2.5 V, the load device 200 determines that the power supply voltage (in this case, the voltage Va of the first storage battery 130) supplied from the first storage battery 130 via the power supply line DCL1 becomes equal to or lower than 2.5 V, and stops measurement and a communication operation.

Subsequently, the switching unit 150 switches the first switcher 160 from the ON state to the OFF state (step S130). Accordingly, the power storage system 100 stops charging of the first storage battery 130 and the supply of power from the first storage battery 130 to the load device 200, and connects the first storage battery 130 in series with the second storage battery 140. When the solar battery 110 is performing the power generation, the charging from the solar battery 110 to the second storage battery 140 is performed (step S140).

Then, the voltage determinator 170 determines the voltage of the power supply line DCL1 (in this case, the voltage Vb of the second storage battery 140) and outputs the voltage determination signal Vf to the switching unit 150 (step S150).

The switching unit 150 compares the voltage determination signal Vf with the predetermined reference voltage Ref2 to determine whether or not the voltage Vb of the second storage battery 140 is equal to or higher than 2.7 V (the second threshold voltage) (step S160).

When it is determined in step S160 that the voltage Vb of the second storage battery 140 is not equal to or higher than 2.7 V (the second threshold voltage) (step S160: No), the power storage system 100 returns to the process of step S130, and the switching unit 150 just maintains the OFF state of the first switcher 160 (step S130). Subsequently, the power storage system 100 repeatedly executes step S140 and subsequent processes.

That is, when the power generation is not performed in the solar battery 110 and charging is not performed from the solar battery 110 to the second storage battery 140 after the power storage system 100 proceeds the stop state of the supply of power from the first storage battery, the voltage Vb of the second storage battery 140 does not increase. Accordingly, the processes of steps S130 to S160 are repeatedly executed. Further, even when charging is performed from the solar battery 110 to the second storage battery 140, the processes of steps S130 to S160 are repeatedly executed until the voltage Vb of the second storage battery 140 becomes equal to or higher than 2.7 V.

When the solar battery 110 performs the power generation, the voltage Vb of the second storage battery 140 increases and becomes equal to or higher than 2.7 V. When the switching unit 150 determines that the voltage Vb of the second storage battery 140 is equal to or higher than 2.7 V (the second threshold voltage) (step S160: Yes), that is, when the voltage Vb of the second storage battery 140 increases to 2.7 V, the operation of the load device 200 returns (step S170), and the switching unit 150 switches the first switcher 160 from the OFF state to the ON state (step S175). When the voltage Vb of the second storage battery 140 becomes equal to or higher than 2.7 V, the load device 200 determines that the power supply voltage supplied from the second storage battery 140 via the power supply line DCL1 (in this case, the voltage Vb of the second storage battery 140) becomes equal to or higher than 2.7 V, and the operation thereof returns. Accordingly, the power storage system 100 returns to a normal state.

Further, the switching unit 150 may delay a timing at which the first switcher 160 is switched from the OFF state to the ON state in step S175 by a predetermined time after the load device 200 returns to the operation. Accordingly, when the load device 200 performs the measurement operation and the communication operation, the second storage battery 140 can supply power at least one time.

Subsequently, the power storage system 100 returns to the process of step S105 and executes step S105 and subsequent processes again.

Through the flow of the process, the power storage system 100 stops discharging from the first storage battery 130 to the load device 200 when the charging voltage Va of the first storage battery 130 decreases to 2.5 V or lower when the power generation by the solar battery 110 is not performed or when the generated power amount of the solar battery 110 is smaller than the power consumption amount of the load device 200.

The power storage system 100 performs charging of the solar battery 110 to the second storage battery 140 when the solar battery 110 performs power generation after the second storage battery 140 is connected in series with the first storage battery 130. Since the capacitance of the second storage battery 140 is smaller than the capacitance of the first storage battery 130, the power storage system 100 can rapidly perform charging of the second storage battery 140. Accordingly, the power storage system 100 can rapidly increase the voltage to be output to the load device 200 using the power charged in the second storage battery 140. As a result, in the power storage system 100, the operation of the load device 200 of which the operation has temporarily stopped due to a decrease in the voltage value of the first storage battery 130 can return in a short amount of time.

Figure 9:
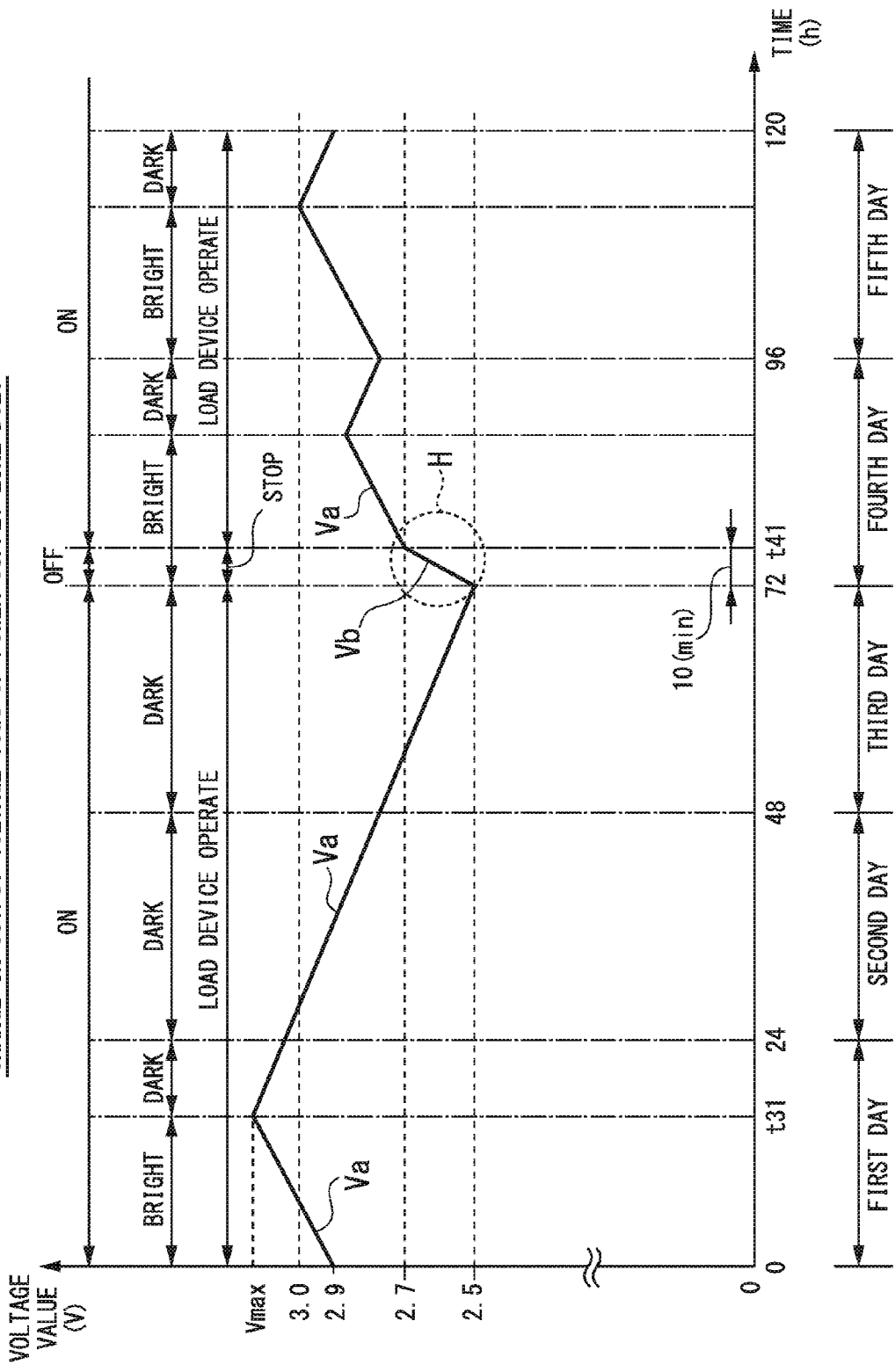
FIG. 9 is an image diagram showing an operation example of the power storage system according to the first embodiment.

FIG. 9 is an image diagram showing an operation example of the power storage system 100 according to this embodiment. In the example shown in FIG. 9, a vertical axis indicates a voltage value, a horizontal axis indicates an elapsed time (h: hour), and change characteristics of the output voltage Vout appearing at the power supply line DCL1 are conceptually shown in an image.

Further, in FIG. 9, a period indicated by "bright" refers to a time zone in which an interior of an office becomes bright due to an illumination or external light, a period indicated by "dark" refers to a time zone in which the interior of the office becomes dark at night or due to off of the illumination, a period indicated by "ON" indicates a period in which the first switcher 160 is in an ON state, and a period indicated by "OFF" indicates a period in which the first switcher 160 is in an OFF state.

In FIG. 9, the voltage Vout appearing at the power supply line DCL1 becomes the voltage Va of the first storage battery 130 when the first switcher 160 is in an ON state, and the voltage Vb of the second storage battery 140 when the first switcher 160 is in an OFF state. Therefore, since the first switcher 160 is in the ON state in a period from elapsed time "0 hours" to elapsed time "72 hours" and a period from elapsed time t41 to elapsed time "120 hours", the output voltage Vout of the power supply line DCL1 is shown as the voltage Va of the first storage battery 130. Further, since the first switcher 160 is in an OFF state in a period from the elapsed time "72 hours" to the elapsed time t41, the output voltage Vout of the power supply line DCL1 is shown as the voltage Vb of the second storage battery 140.

In FIG. 9, a first day includes, for example, 24 hours from Friday morning 8:00 of a weekend (for example, a time at which an interior becomes bright in an office or the like) to the next day morning 8:00. A second day includes 24 hours from Saturday morning 8:00 to the next day morning 8:00. A third day includes 24 hours from Sunday morning 8:00 to the next day morning 8:00. A fourth day includes 24 hours from Monday morning 8:00 of the next week to the next day morning 8:00. A fifth day includes 24 hours from Tuesday morning 8:00 to the next day morning 8:00.

In the example shown in FIG. 9, a period "bright" and a period "dark" are repeated on a daily basis on a first day (from Friday morning 8:00 to Saturday morning 8:00), a fourth day (from Monday morning 8:00 to Tuesday morning 8:00), and a fifth day (from Tuesday morning 8:00 to Wednesday morning 8:00). On the other hand, it is assumed that the period "dark" continues since it is a holiday on the second day (Saturday morning 8:00 to Sunday morning 8:00) and the third day (Sunday morning 8:00 to Monday morning from 8:00). Further, it is assumed that, at the first point in time of the first day (elapsed time "0 hours": Friday morning 8:00), the first switcher 160 is in the ON state, and the voltage Vout of the power supply line DCL1 (the voltage Va of the first storage battery 130) is about 2.9 V. It is assumed that the voltage 2.9 V of the power supply line DCL1 is supplied as the power supply voltage from the power supply line DCL1 to the load device 200, and the load device 200 is in an operable state.

At a point in time of an elapsed time "0 hours", the period "bright" in which the interior of the office becomes bright due to external light (alternatively, illumination light) begins. The period "bright" that begins at the elapsed time "0 hours" continues to elapsed time t31 after the elapsed time "0 hours". If light hits the solar battery 110 and the power generation of the solar battery 110 starts after the elapsed time "0 hours", charging from the solar battery 110 to the first storage battery 130 starts, and the voltage Vout of the power supply line DCL1 begins to increase. In this case, since the first switcher 160 is in the ON state, the voltage Vout of the power supply line DCL1 becomes the voltage Va of the first storage battery 130.

In the period "bright" from elapsed time 0 to elapsed time t31, the voltage Va of the first storage battery 130 gradually increases and the voltage Va of the first storage battery 130 reaches a maximum value Vmax at the time t31.

Then, the period "dark" in which the interior of the office becomes dark begins at the elapsed time t31. The period "dark" that begins from the elapsed time t31 continues to the elapsed time "72 hours" after the elapsed time t31. From the elapsed time t31, the power generation of the solar battery 110 stops, and charging from the solar battery 110 to the first storage battery 130 stops. In the period "dark" after the elapsed time t31, the charge stored in the first storage battery 130 gradually decreases and the voltage Va of the first storage battery 130 gradually decreases as the measurement and communication operations of the load device 200 are periodically repeated. The period "dark" is continued from the elapsed time t31 to the elapsed time "72 hours" of the third day through elapsed time "24 hours" of the second day and elapsed time "48 hours" of the third day.

In the period "dark" from the elapsed time t31 to the elapsed time "72 hours", the voltage Va of the first storage battery 130 gradually decreases, but the voltage Va of the first storage battery 130 exceeds 2.5 V in the period "dark". Accordingly, the first switcher 160 maintains the ON state. Further, in the period "dark", the load device 200 continues to operate since the voltage Va of the first storage battery 130 exceeds 2.5 V.

Thus, when the load device 200 is operated on a weekly basis, the power storage system 100 performs charging from the solar battery 110 to the first storage battery 130 to Friday (the first day) of a weekday, and operates the load device 200 using the power stored in the first storage battery 130 in a holiday (the second day and the third day).

In the example shown in FIG. 9, the voltage of the first storage battery 130 decreases to 2.5 V or lower at the elapsed time "72 hours", and the period "bright" begins immediately after the elapsed time "72 hours".

Therefore, at the elapsed time "72 hours", the voltage Va of the first storage battery 130 decreases to 2.5 V or lower, the load device 200 stops the operation, and the first switcher 160 enters the OFF state. As the first switcher 160 enters an OFF state, the second storage battery 140 is connected in series with the first storage battery 130. At a point in time at which the first switcher 160 enters the OFF state, the charging voltage of the second storage battery 140 is 0 V, and accordingly, the charging voltage (2.5 V) of the first storage battery 130 just appears as the voltage Vb of the second storage battery 140 (more accurately, the charging voltage Vb of the series circuit of the first storage battery 130 and the second storage battery 140).

If the period "bright" begins immediately after the elapsed time "72 hours", the light begins to hit the solar battery 110, and the solar battery 110 starts power generation and starts charging of the second storage battery 140. In this case, the second storage battery 140 with a small capacitance is rapidly charged by the solar battery 110, and the voltage Vb of the second storage battery 140 increases to 2.7 V at the elapsed time t41 after 10 minutes (min) from the start of charging. That is, when charging is performed from the solar battery 110 to the second storage battery 140, the charging voltage Vb of the second storage battery 140 increases at a speed of about 40 times as compared with the case in which charging is performed from the solar battery 110 to the first storage battery 130 with a large capacitance. Therefore, the voltage Vb of the second storage battery 140 increases to 2.7 V after 10 minutes (min) from the start of charging.

At the elapsed time t41, if the voltage of the second storage battery 140 increases to 2.7 V, the operation of the load device 200 returns so that the load device 200 starts the measurement operation and the communication operation. Further, at the elapsed time t41, since the first switcher 160 changes from the OFF state to the ON state, the power storage system 100 proceeds to the normal state. After the elapsed time t41, the first switcher 160 enters an ON state, the voltage Va of the first storage battery 130 appears at the Vout of the power supply line DCL1. After the elapsed time t41, the periods "bright" and "dark" are repeated and, accordingly, the voltage Va of the first storage battery 130 is changed. Then, after the fourth day, the first storage battery 130 gradually stores power that is consumed on the next Saturday and Sunday.

Figure 10:
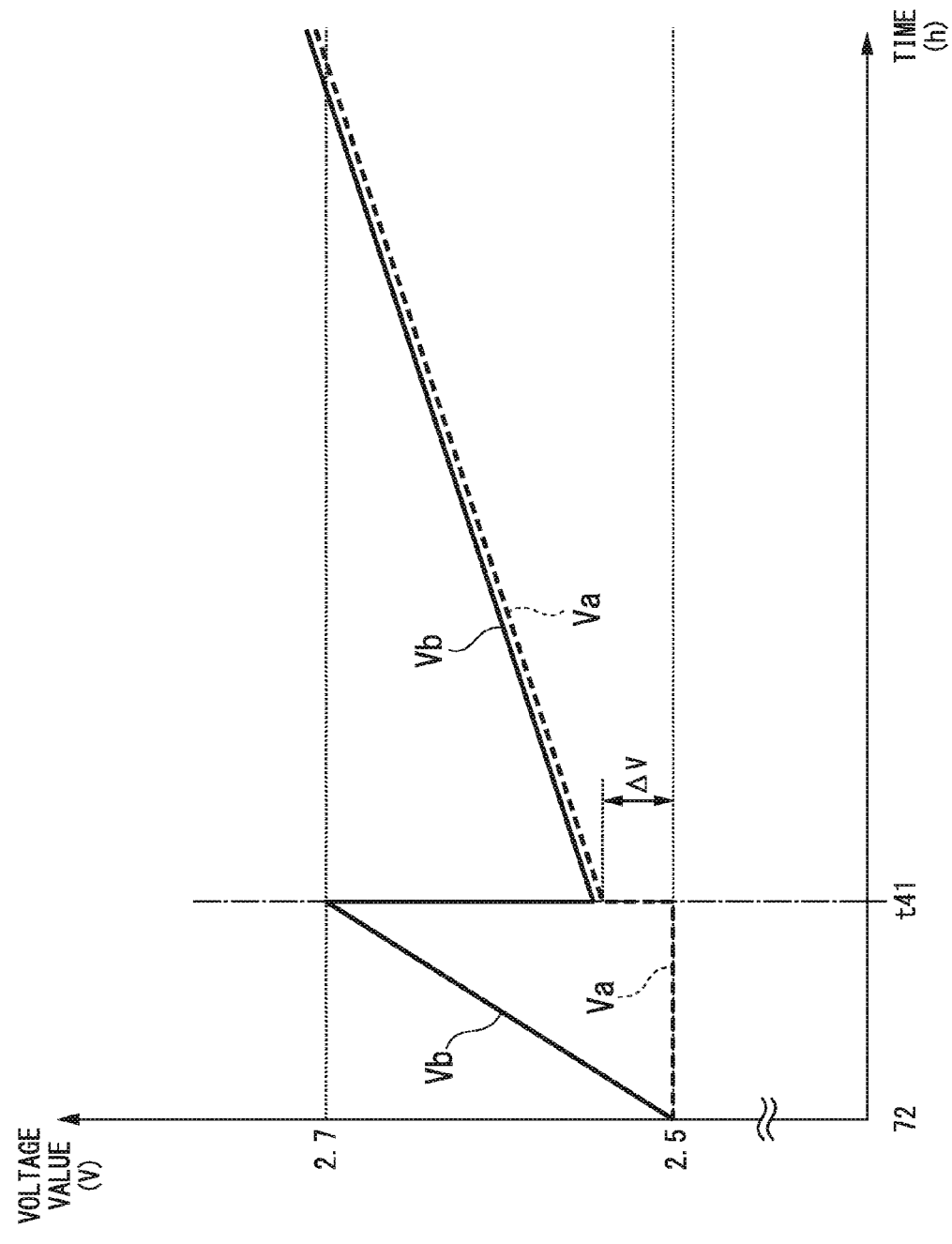
FIG. 10 is a partial enlarged diagram of FIG. 9.

FIG. 10 is a partially enlarged diagram of FIG. 9. FIG. 10 is a diagram showing an enlarged portion of the area H surrounded by a dashed circle in FIG. 9.

In FIG. 10, at the elapsed time "72 hours", the first switcher 160 enters an OFF state, and the second storage battery 140 and the first storage battery 130 are connected in series. Immediately after the elapsed time "72 hours", light begins to hit the solar battery 110, and the solar battery 110 starts charging of the series circuit of the first storage battery 130 and the second storage battery 140. The voltage Vb of the second storage battery 140 with a small capacitance rapidly increases between the elapsed time "72 hours" and the elapsed time t41 and reaches 2.7 V at the elapsed time t41.

On the other hand, the voltage Va of the first storage battery 130 with a large capacitance does not almost change between the elapsed time "72 hours" and the elapsed time t41 (strictly, increases by a voltage of 1/40 of increase in the charging voltage of the second storage battery 140).

If the voltage Vb of the second storage battery 140 reaches 2.7 V at the elapsed time t41, the first switcher 160 is turned ON, both terminals of the second storage battery 140 is short-circuited, and the voltage Va of the first storage battery 130 decreases by ΔV (for example, 0.05 V). Further, the voltage Vb of the second storage battery 140 decreases to the voltage of the first storage battery 130 (2.5 V+ΔV). After the elapsed time t41, charging starts from the solar battery 110 to the first storage battery 130. Since the first switcher 160 is turned ON (the short-circuited state of the second storage battery 140) after the elapsed time t41, the voltage Vb of the second storage battery 140 and the voltage Va of the first storage battery 130 become the same voltage. In FIG. 10, the voltage Va is shown as a voltage lower than the voltage Vb after the elapsed time t41 for clarity of the drawing but, in fact, the voltage Va and the voltage Vb are the same voltage.

In the example shown in FIGS. 9 and 10, the voltage Va of the first storage battery 130 begins to decrease from the elapsed time t31 and just becomes 2.5 V at the elapsed time "72 hours" but for example, the voltage Va of the first storage battery 130 may reach 2.5 V midway on the third day in the case of three consecutive holidays. This is because continuous driving capability of the load device 200 required for the sensor node 10 is continuous driving for 60 hours.

Figure 11:
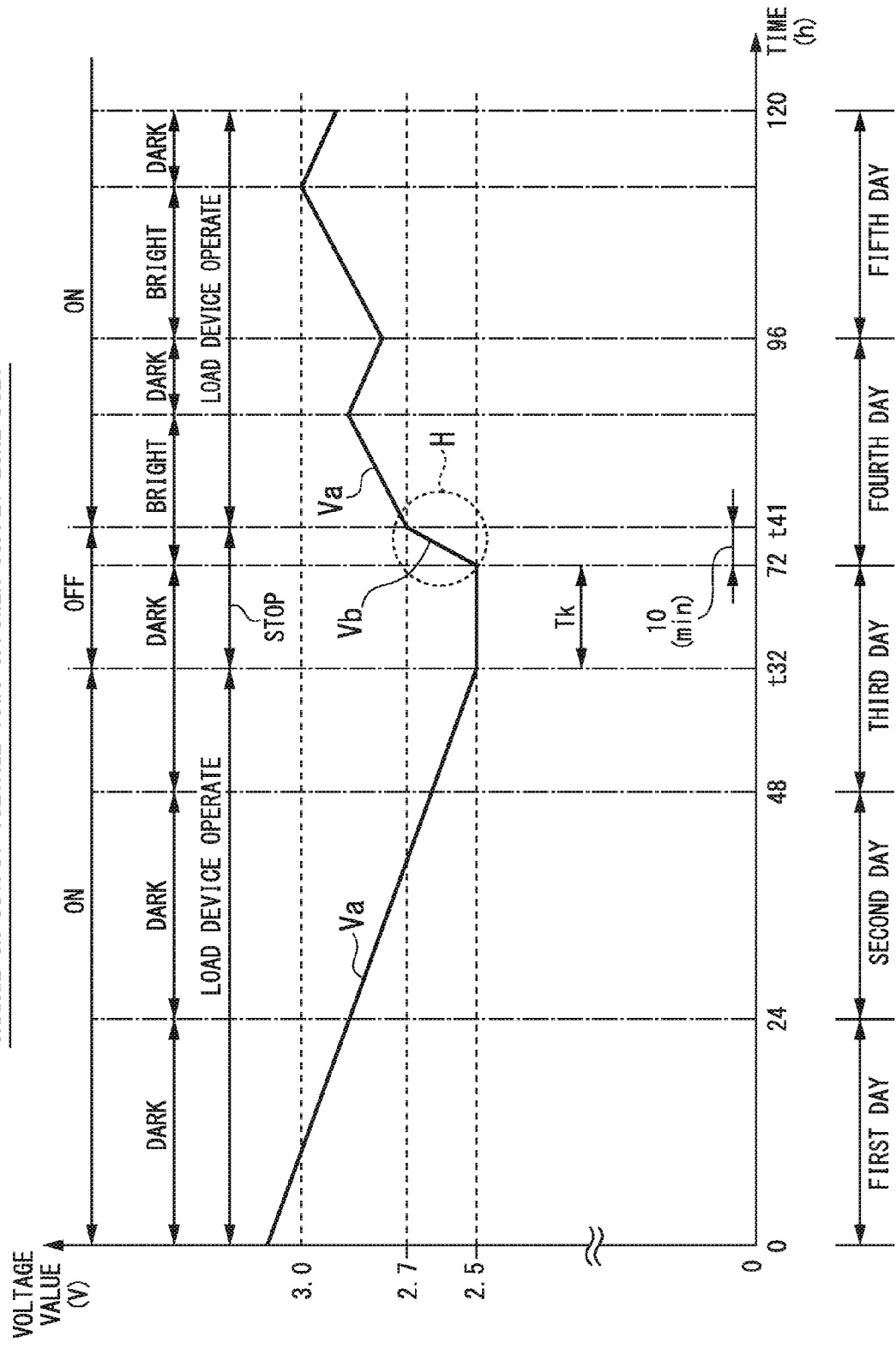
FIG. 11 is an image diagram showing an operation example of the power storage system in the case of three consecutive holidays according to the first embodiment.

For example, FIG. 11 is an image diagram showing an operation example of the power storage system 100 in the case of three consecutive holidays according to this embodiment. FIG. 11 conceptually shows change characteristics of the voltage Va of the first storage battery 130 and the voltage Vb of the second storage battery 140 appearing at the power supply line DCL1, as an image, in which a vertical axis indicates a voltage value and a horizontal axis indicated elapsed time (h), similar to FIG. 9. FIG. 11 is different from the FIG. 10 in which the first day to the third day are holidays (three consecutive holidays), and the period "dark" continues between the elapsed time "0 hours" of the first day and the elapsed time "72 hours" of the third day.

In this example, the voltage Va of the first storage battery 130 decreases to 2.5 V at the elapsed time t32 on the third day. That is, the voltage Va of the first storage battery 130 decreases to 2.5 V at the point in time t32 before the elapsed time "72 hours" on the third day. At the lapse time t32, the load device 200 stops the operation at a point in time at which the voltage Va of the first storage battery 130 reaches 2.5 V. Further, at the elapsed time t32, the first switcher 160 enters an OFF state, and the second storage battery 140 is connected in series with the first storage battery 130. Since a period Tk from the elapsed time t32 to the elapsed time "72 hours" is a period "dark", the charging is not performed from the solar battery 110 to the second storage battery 140. In this period Tk, the charging voltage (2.5 V) of the first storage battery 130 appears at the power supply line DCL1 as it is.

At the lapsed time "72 hours" on the third day, the period "bright" begins from the elapsed time from "72 hours", light hits the solar battery 110, the solar battery 110 starts the power generation, and charging of the second storage battery 140 starts. In this case, the second storage battery 140 with a small capacitance is rapidly charged by the solar battery 110, and the voltage Vb of the second storage battery 140 increases to 2.7 V at the elapsed time t41 after 10 minutes (min) from the charging start. If the voltage Vb of the second storage battery 140 increases to 2.7 V at the elapsed time t41, the operation of the load device 200 returns, and the load device 200 starts the measurement and communication operations.

Thus, even when holidays such as three consecutive holidays are continued and the load device 200 stops the operation midway on the holiday, it is possible to cause the operation of the load device 200 to return in a short amount of time if light hits the solar battery 110 and the solar battery 110 starts the power generation, in the power storage system 100.

In the power storage system 100, a communication time interval of the load device 200 can be widened when the voltage Va of the first storage battery 130 is lower than a predetermined threshold voltage (the first threshold voltage). Accordingly, when the solar battery 110 does not perform power generation or when the generated power amount of the solar battery 110 is smaller than the power consumption amount of the load device 200, the power storage system 100 can reduce the amount of power that the first storage battery 130 supplies to the load device 200. Therefore, the power storage system 100 can widen a period in which the power is supplied to the load device 200.

Further, in the power storage system 100, when the voltage Vout of the series circuit of the first storage battery 130 and the second storage battery 140 is equal to or higher than 2.7 V (the second threshold voltage) after the switching unit 150 causes the first switcher 160 to enter the OFF state, the switching unit 150 causes the first switcher 160 to enter the ON state. The present invention is not limited thereto, and the switching unit 150 may determine the second threshold voltage on the basis of a potential difference (charging voltage) of the second storage battery 140.

That is, the switching unit 150 may determine the charging voltage of a single entity of the second storage battery 140 (the charging voltage of the predetermined portion of the series circuit) using the voltage determinator 170, and cause the first switcher 160 to enter the closed state and short-circuit both terminals of the second storage battery 140 when a sum of the charging voltage of the second storage battery 140 and the charging voltage of the first storage battery 130 (the charging voltage of the entire series circuit) becomes equal to or higher than the predetermined second threshold voltage. In this case, the switching unit 150 may regard the voltage of the first storage battery 130 as the first threshold voltage and determine the charging voltage of the entire series circuit on the basis of the storage capacitance of only the second storage battery 140. The switching unit 150 may determine the charging voltage of the entire series circuit or a predetermined portion when both terminals of the second storage battery 140 are released from the short-circuited state by the first switcher 160 and charging is performed from the solar battery 110 to the series circuit of the first storage battery 130 and the second storage battery 140, and perform controls so that the first switcher 160 enters the ON state when the charging voltage of the entire series circuit becomes equal to or higher than the predetermined second threshold voltage that is a voltage higher than the first threshold voltage.

As described above, the power storage system 100 of this embodiment includes the solar battery 110 (power generation element) that performs environmental power generation, the first storage battery 130 that is supplied with the power generated by the solar battery 110 and supplies the power to the load device 200, the second storage battery 140 that has a capacitance smaller than that of the first storage battery 130 and is connected in series with the first storage battery 130, the first switcher 160 that is connected in parallel to the second storage battery 140, short-circuits both terminals of the second storage battery 140 in the closed state, and releases the short-circuited state of the second storage battery 140 in the open state, and the switching unit 150 that controls the opened and closed states of the first switcher 160.

The switching unit 150 compares the charging voltage Va of the first storage battery 130 with 2.5 V (the predetermined first threshold voltage) when both terminals of the second storage battery 140 are short-circuited by the first switcher 160 and charging is performed from the first storage battery 130 to the load device 200 via the first switcher 160, performs control so that the first switcher 160 enters an open state when the charging voltage Va of the first storage battery 130 becomes equal to or lower than 2.5 V, determines the charging voltage of the entire series circuit (the first storage battery 130 and the second storage battery 140) (the charging voltage of the entire series circuit) Vb) or a charging voltage of a predetermined portion when the short-circuited state of both terminals of the second storage battery 140 are released by the first switcher 160 and charging is performed from the solar battery 110 to the series circuit of the first storage battery 130 and the second storage battery 140, and performs control so that the first switcher 160 enters the closed state when the charging voltage of the series circuit becomes equal to or higher than 2.7 V (the predetermined second threshold voltage) that is higher than the first threshold voltage.

In the power storage system 100 having such a configuration, the second storage battery 140 with small capacitor is connected in series with the first storage battery 130, and the first switcher 160 is connected in parallel to the second storage battery 140. The first switcher 160 short-circuits both terminals of the second storage battery 140 in a closed state and releases the short-circuited state of the second storage battery 140 in an open state. The switching unit 150 controls the opened and closed states of the first switcher 160. When both terminals of the second storage battery 140 is short-circuited by the first switcher 160 and the supply of power is performed from the first storage battery 130 to the load device 200 via the first switcher 160, the switching unit 150 compares the charging voltage Va of the first storage battery 130 with 2.5 V (the first threshold voltage). When the charging voltage Va of the first storage battery 130 becomes equal to or lower than 2.5 V (the first threshold voltage) or lower in a state in which the supply of power is performed from the first storage battery 130 to the load device 200 via the first switcher 160, the switching unit 150 causes the first switcher 160 to enter the open state to release the short-circuited state between both terminals of the second storage battery 140.

Further, when a short-circuited state of the second storage battery 140 is released and the supply of power from the solar battery 110 to the series circuit of the first storage battery 130 and the second storage battery 140 is performed, the switching unit 150 determines, for example, the charging voltage of the first storage battery 130 and the second storage battery 140 (a charging voltage of the entire series circuit), and causes the first switcher 160 to enter a closed state to short-circuit both terminals of the second storage battery 140 when the charging voltage is equal to or higher than 2.7 V (a predetermined second threshold voltage).

Accordingly, in the power storage system 100, when the solar battery 110 (power generation element) performs power generation, it is possible for the load device 200 to return to the operation in a short amount of time.

Further, in the power storage system 100, since the charging voltage of the second storage battery 140 with a small capacitance increases in a short amount of time, the charging voltage can increase to a voltage of 2.7 V (a second threshold voltage) or higher in a short amount of time. Therefore, the power storage system 100 causes the operation of the load device 200 to return in a short amount of time.

Further, in a normal state, the second storage battery 140 is short-circuited by the first switcher 160, and both the positive electrode and the negative electrode thereof have the same potential as a potential of the positive electrode of the first storage battery 130. Therefore, when the first switcher 160 is released, the power storage from the same potential as the first storage battery 130 at this time into the second storage battery 140 is started. Thus, it is possible to charge the second storage battery 140 to a voltage equal to or higher than 2.7 V (the second threshold voltage) in a short amount of time. In other words, since the second storage battery 140 is connected in series with the first storage battery 130, the charging operation is started from the potential of the first storage battery 130 even when a potential difference at the positive electrode and the negative electrode of the second storage battery 140 is small. Therefore, the power storage system 100 can cause the operation of the load device 200 to return in a short amount of time.

Further, in the power storage system 100, the capacitance of the first storage battery 130 is set on the basis of the generated power amount of the solar battery 110 (power generation element), an average value of power consumption of the load device 200 to which power is supplied from the first storage battery 130, and the time in which the load device 200 is continuously driven by the power stored in the first storage battery 130, and the capacitance of the second storage battery 140 is set on the basis of the generated power amount of the solar battery 110, the average value of power consumption of the load device 200, and time from stop of the operation of the load device 200 due to a decrease in the charging voltage Va of the first storage battery 130 to return of the operation of the load device 200 through power generation in the solar battery 110.

In the power storage system 100 having such a configuration, when a magnitude of the capacitance of the first storage battery 130 that supplies power to the load device 200 is determined, the capacitance of the first storage battery 130 is determined on the basis of the generated power amount of the solar battery 110 (power generation element), the average value of the power consumption of the load device 200, and the time in which the load device 200 is continuously driven by the power stored in the first storage battery 130. Further, in the power storage system 100, when the capacitance of the second storage battery 140 with a small capacitance is determined, the capacitance of the second storage battery 140 is set on the basis of the generated power amount of the solar battery 110, the average value of power consumption of the load device 200, and the time from stop of the operation of the load device 200 to the return of the operation of the load device 200 through the power generation in the solar battery 110.

Accordingly, in the power storage system 100, the load device 200 can be continuously driven at a desired time by the power stored in the first storage battery 130. Further, in the power storage system 100, when the solar battery 110 performs the power generation after the operation of the load device 200 stops, it is possible to cause the operation of the load device 200 to return at a desired time.

Further, in the power storage system 100, the first storage battery 130 is a type of capacitor with a leakage current lower than that of the second storage battery 140.

In the power storage system 100 having such a configuration, the first storage battery 130 is a capacitor that holds power for a long amount of time. In order for stored power not to be wastefully consumed, a capacitor with a low leakage current is used as the first storage battery 130. On the other hand, the second storage battery 140 is a capacitor that is used only in a short amount of time until the solar battery 110 performs power generation to cause the load device 200 to return to the operation after the operation of the load device 200 stops, and the maximum voltage to be charged is 0.2 V (a difference voltage between the first threshold voltage and the second threshold voltage) and is used only as a low charging voltage. Therefore, in the power storage system, a capacitor in which a leakage current is higher than that in the first storage battery 130 can be used as the second storage battery 140.

Accordingly, the first storage battery 130 can hold the power for a long amount of time without wastefully consuming the stored power.

Further, the power storage system 100 includes the DC/DC converter 120 that converts the output voltage Vs of the solar battery 110 (power generation element) into a predetermined voltage and supplies the voltage to the first storage battery 130 and the second storage battery 140, and the DC/DC converter 120 controls the output voltage so that the charging voltage Va of the first storage battery 130 does not exceed a predetermined upper limit voltage (for example, 3.7 V).

In the power storage system 100 having such a configuration, the DC/DC converter 120 is connected to the output side of the solar battery 110 (power generation element). The DC/DC converter 120 converts the output voltage Vs of the solar battery 110 into a voltage according to the power supply voltage to be supplied to the load device 200.

The DC/DC converter 120 performs, using the converted voltage, supply of power to the first storage battery 130 when the first switcher 160 is in a closed state and performs supply of power to the series circuit of the first storage battery 130 and the second storage battery 140 when the first switcher 160 is in an open state. Further, the DC/DC converter 120 performs control so that the output voltage does not exceed a predetermined upper limit voltage (for example, 3.7 V), to thereby prevent the first storage battery 130 from being overcharged.

Accordingly, the power storage system 100 can convert the output voltage Vs of the solar battery 110 (power generation element) into a voltage capable of operating the load device 200. Further, the DC/DC converter 120 can prevent the first storage battery 130 from being overcharged.

Further, in the power storage system 100, a lithium ion capacitor is used as the first storage battery 130 with a large capacitance.

In the power storage system 100 having such a configuration, it is necessary for the first storage battery 130 with a large capacitance to hold charge for a long amount of time. Therefore, a lithium ion capacitor with a low leakage current is used as the first storage battery 130.

Thus, the first storage battery 130 can hold power supplied from the solar battery 110 (power generation element) for a long amount of time by preventing the power from being wastefully consumed. Therefore, the power storage system 100 of the present invention can operate the load device 200 for a long amount of time in a case in which the solar battery 110 stops power generation or a case in which the generated power amount of the solar battery 110 is smaller than the power consumption amount of the load device 200.

Second Embodiment

Figure 12:
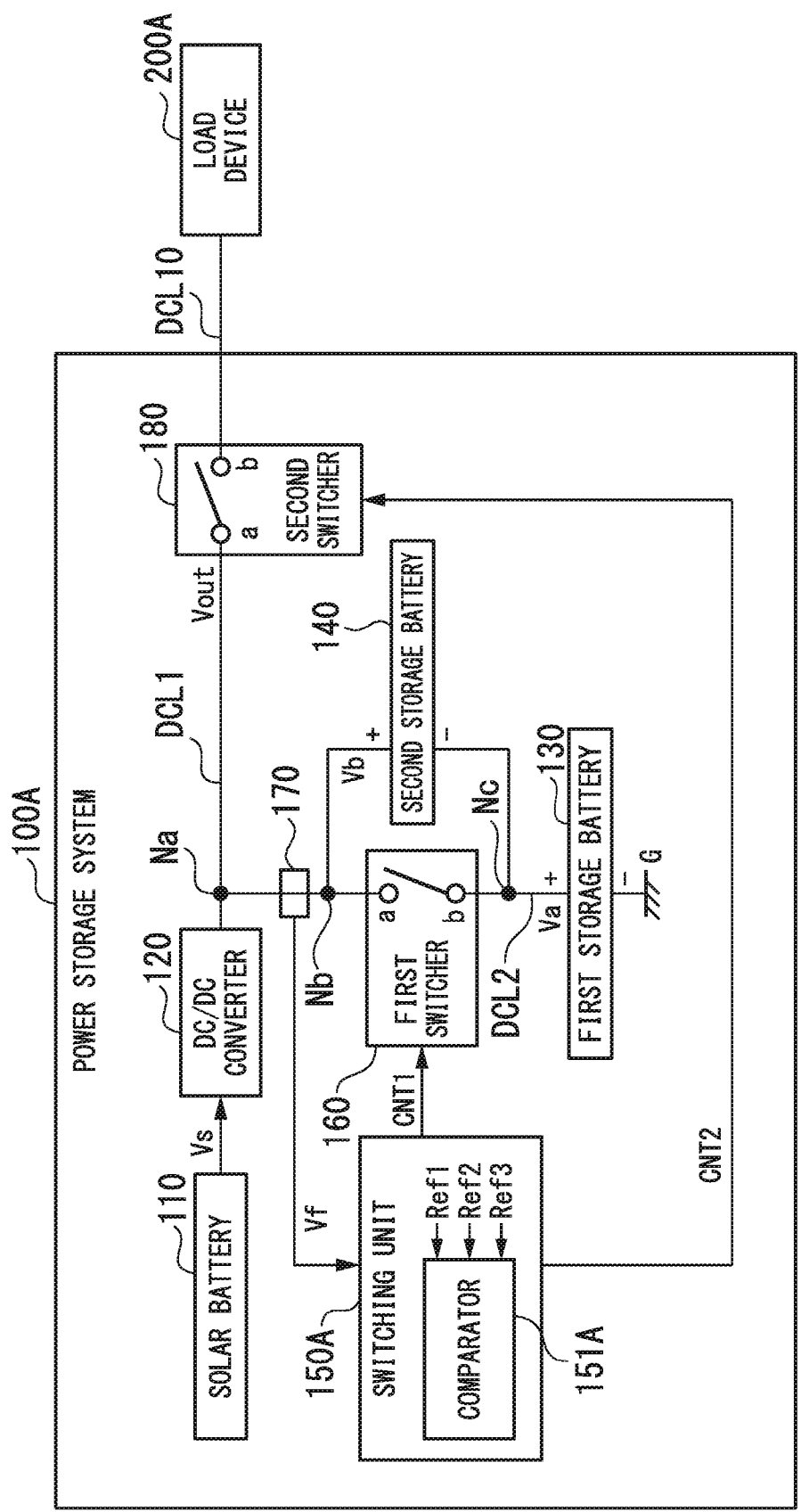
FIG. 12 is a configuration diagram showing a configuration example of a power storage system according to a second embodiment.

FIG. 12 is a configuration diagram showing a configuration example of a power storage system 100A according to this embodiment. The power storage system 100A shown in FIG. 12 is different from the power storage system 100 shown in FIG. 2 in that a second switcher 180 is newly added, the switching unit 150 is replaced with a switching unit 150A, and the load device 200 is replaced with a load device 200A. Further, the load device 200A is different from the load device 200 in that the load device 200A is configured to just start an operation if the load device 200A receives supply of a power supply voltage exceeding 2.5 V that is an input power supply specification. Other configurations are the same as those of the power storage system 100 shown in FIG. 2. Therefore, the same components are denoted with the same reference numerals, and repeated description will be omitted.

In FIG. 12, the second switcher 180 has one terminal a connected to the power supply line DCL1, and the other terminal b connected to the load device 200A via the power supply line DCL10. The second switcher 180 enters the ON state or the OFF state according to instruction content of the control signal CNT2 input from the switching unit 150A to connect or disconnect between the power supply line DCL1 and the power supply line DCL10. That is, when the second switcher 180 is turned ON, the power supply line DCL1 is connected to the power supply line DCL10 and the power is supplied from the power storage system 100A to the load device 200A.

The switching unit 150A includes a comparator 151A, and the comparator 151A outputs the control signal CNT1 to the first switcher 160 to cause the first switcher 160 to enter the OFF state and thereby connect the first storage battery 130 in series with the second storage battery 140, when the first switcher 160 is in an ON state and the voltage Va of the first storage battery 130 becomes equal to or lower than 2.5 V (the first threshold voltage). Accordingly, the power storage system 100A proceeds to a stop state of supply of power from the first storage battery.

Further, the switching unit 150A compares the voltage determination signal Vf with a predetermined reference voltage Ref3 to determine whether or not the voltage Va of the first storage battery 130 exceeds a predetermined third threshold voltage. The third threshold voltage may be a voltage equal to or higher than 2.5 V and equal to or lower than 2.7 V (the second threshold voltage) and may be, for example, the same voltage as 2.5 V that is the first threshold voltage or may be a voltage higher than 2.5 V that is the first threshold voltage, such as 2.55 V or 2.6 V.

When the voltage Va of the first storage battery 130 is equal to or lower than the third threshold voltage, the switching unit 150A outputs a control signal CNT2 to the second switcher 180 to cause the second switcher 180 to enter an OFF state and stop the supply of power to the load device 200A. Further, when the voltage Va of the first storage battery 130 exceeds the third threshold voltage, the switching unit 150A outputs a control signal CNT2 to the second switcher 180 to cause the second switcher 180 to enter an ON state and supply the power to the load device 200A.

Accordingly, the power storage system 100A can supply the power to the load device 200A only when the charging voltage Va of the first storage battery 130 exceeds the third threshold voltage.

When the voltage Vb of the second storage battery 140 becomes equal to or higher than 2.7 V in a state in which the first switcher 160 is turned OFF, the comparator 151A causes the first switcher 160 to enter the ON state to short-circuit both terminals of the second storage battery 140 and directly connect the first storage battery 130 to the power supply line DCL1. Accordingly, the power storage system 100A returns from the stop state of supply of power from the first storage battery to the normal state.

Thus, in the power storage system 100A, it is not necessary for the load device 200A to determine a magnitude of the power supply voltage supplied from the power supply line DCL1, and if the second switcher 180 is turned ON and the power supply voltage is supplied from the power storage system 100A, the operation can immediately start.

In the power storage system 100A, the first switcher 160 and the second switcher 180 can be turned ON or OFF at the same timing by setting the third threshold voltage to 2.5 V (the same voltage as the first threshold voltage). That is, when the first switcher 160 is in an ON state, the second switcher 180 enters an ON state, and when the first switcher 160 is in the OFF state, the second switcher 180 enters an OFF state.

Figure 13:
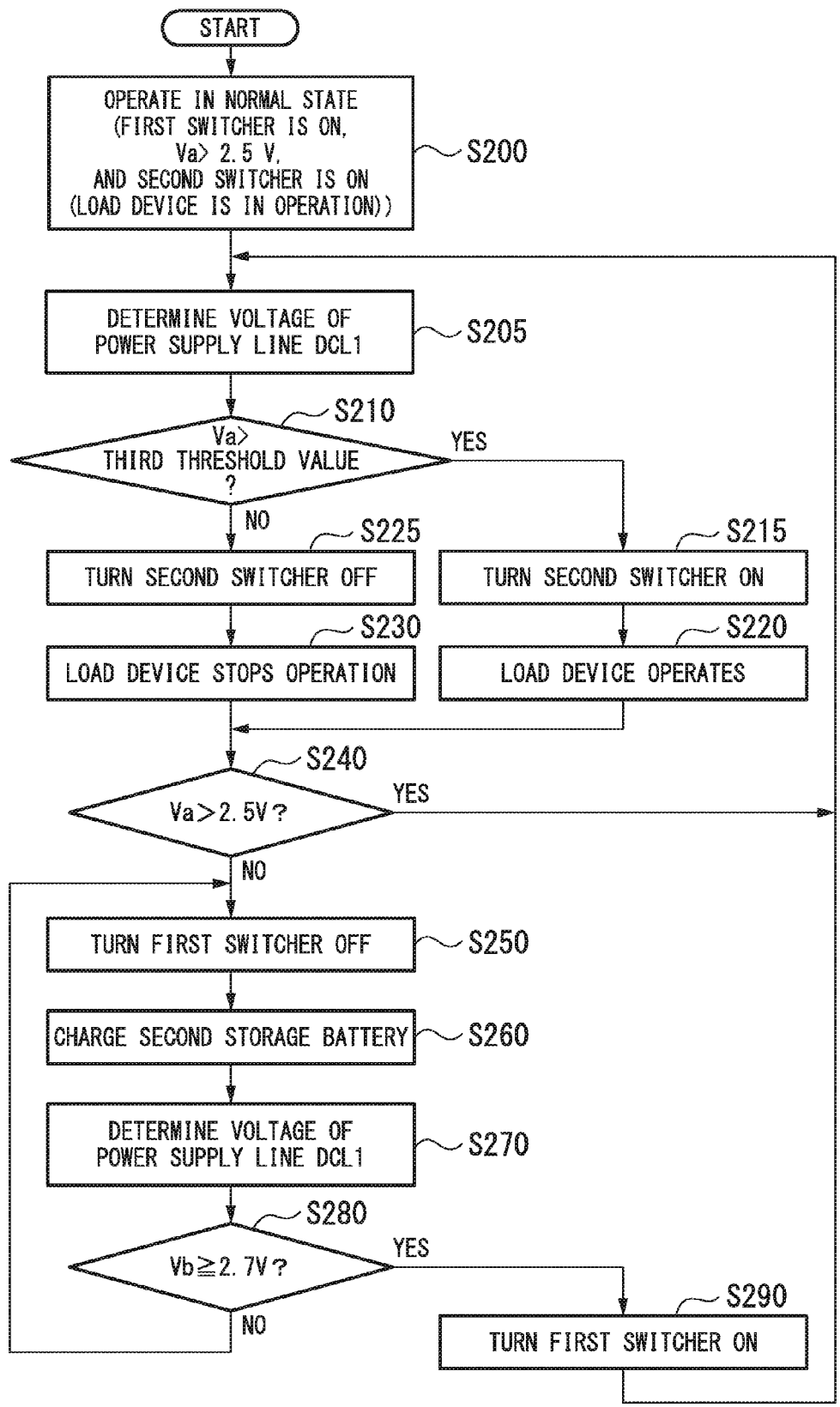
FIG. 13 is a first flowchart showing a processing procedure in the power storage system according to the second embodiment.

FIG. 13 is a flowchart showing a first processing procedure in the power storage system 100A according to this embodiment. In FIG. 13, a flow of the operation in the power storage system 100A described above is shown in a flowchart. Hereinafter, a flow of the process will be described with reference to FIG. 13.

First, the power storage system 100A is assumed to operate in a normal state (step S200). That is, in the power storage system 100A, it is assumed that the first switcher 160 is in an ON state, the voltage Va of the first storage battery 130 exceeds 2.5 V, the second switcher 180 is in an ON state, and the load device 200A is in operation.

Then, the voltage determinator 170 determines the voltage of the power supply line DCL1 (in this case, the voltage Va of the first storage battery 130) and outputs the voltage determination signal Vf to the switching unit 150A (step S205).

Then, the switching unit 150A determines whether or not the voltage Va of the first storage battery 130 exceeds a third threshold voltage by comparing the voltage determination signal Vf with a predetermined reference voltage Ref3 (step S210).

When it is determined in step S210 that the voltage Va of the first storage battery 130 exceeds the third threshold voltage (step S210: Yes), the switching unit 150A switches the second switcher 180 to an ON state when the second switcher 180 is in an OFF state, and just maintains the ON state when the second switcher 180 is in the ON state (step S215). Accordingly, the power storage system 100A supplies power to the load device 200A to operate the load device 200A (step S220). Subsequently, the power storage system 100A proceeds to a process of step S240.

On the other hand, when it is determined in step S210 that the voltage Va of the first storage battery 130 does not exceed the third threshold voltage (step S210: No), the switching unit 150A switches the second switcher 180 to the OFF state when the second switcher 180 is in the ON state and just maintains the OFF state when the second switcher 180 is in the OFF state (step S225). Accordingly, the power storage system 100A stops the supply of power to the load device 200A to stop the operation of the load device 200A (step S230). Subsequently, the power storage system 100A proceeds to a process of step S240.

Then, the switching unit 150A determines whether or not the voltage Va of the first storage battery 130 exceeds 2.5 V (the first threshold voltage) by comparing the voltage determination signal Vf with the predetermined reference voltage Ref1 (step S240).

When it is determined in step S240 that the voltage Va of the first storage battery 130 exceeds 2.5 V (the first threshold voltage) (step S240: Yes), the power storage system 100A returns to the process of step S205 and repeatedly executes step S205 and subsequent processes.

On the other hand, when it is determined in step S240 that the voltage Va of the first storage battery 130 does not exceed 2.5 V (the first threshold voltage) (step S240: No), that is, when the voltage of the first storage battery 130 is equal to or lower than 2.5 V, the switching unit 150A switches the first switcher 160 from the ON state to the OFF state (step S250). Accordingly, the power storage system 100A proceeds to a stop state of supply of power from the first storage battery, and connects the first storage battery 130 in series with the second storage battery 140. When the solar battery 110 performs power generation, charging from the solar battery 110 to the second storage battery 140 is performed (step S260).

Then, the voltage determinator 170 determines the voltage of the power supply line DCL1 (in this case, the voltage Vb of the second storage battery 140) and outputs the voltage determination signal Vf to the switching unit 150A (step S270). The switching unit 150A compares the voltage determination signal Vf with the predetermined reference voltage Ref2 to determine whether or not the voltage Vb of the second storage battery 140 is equal to or higher than 2.7 V (the second threshold voltage) (step S280).

When it is determined in step S280 that the voltage Vb of the second storage battery 140 is not equal to or higher than 2.7 V (step S280: No), the power storage system 100A returns to the process of step S250, and just maintains the OFF state of the first switcher 160 (step S250). Then, the power storage system 100A repeatedly executes step S260 and the subsequent processes.

When the switching unit 150A determines that the voltage Vb of the second storage battery 140 is equal to or higher than 2.7 V (the second threshold voltage) (step S280: Yes), the switching unit 150A switches the first switcher 160 from the OFF state to the ON state (step S290). Subsequently, the power storage system 100A returns to the process of step S100 and executes step S205 and the subsequent processes again.

Through the flow of the process, when the solar battery 110 performs power generation after the operation of the load device 200A temporarily stops due to a decrease in the charging voltage Va of the first storage battery 130, the power storage system 100A can cause the operation of the load device 200A to return in a short amount of time. Further, the power storage system 100A can perform the supply of power to the load device 200A only when the power storage system 100A can supply a voltage exceeding the third threshold voltage with which the load device 200A is operable.

Figure 14:
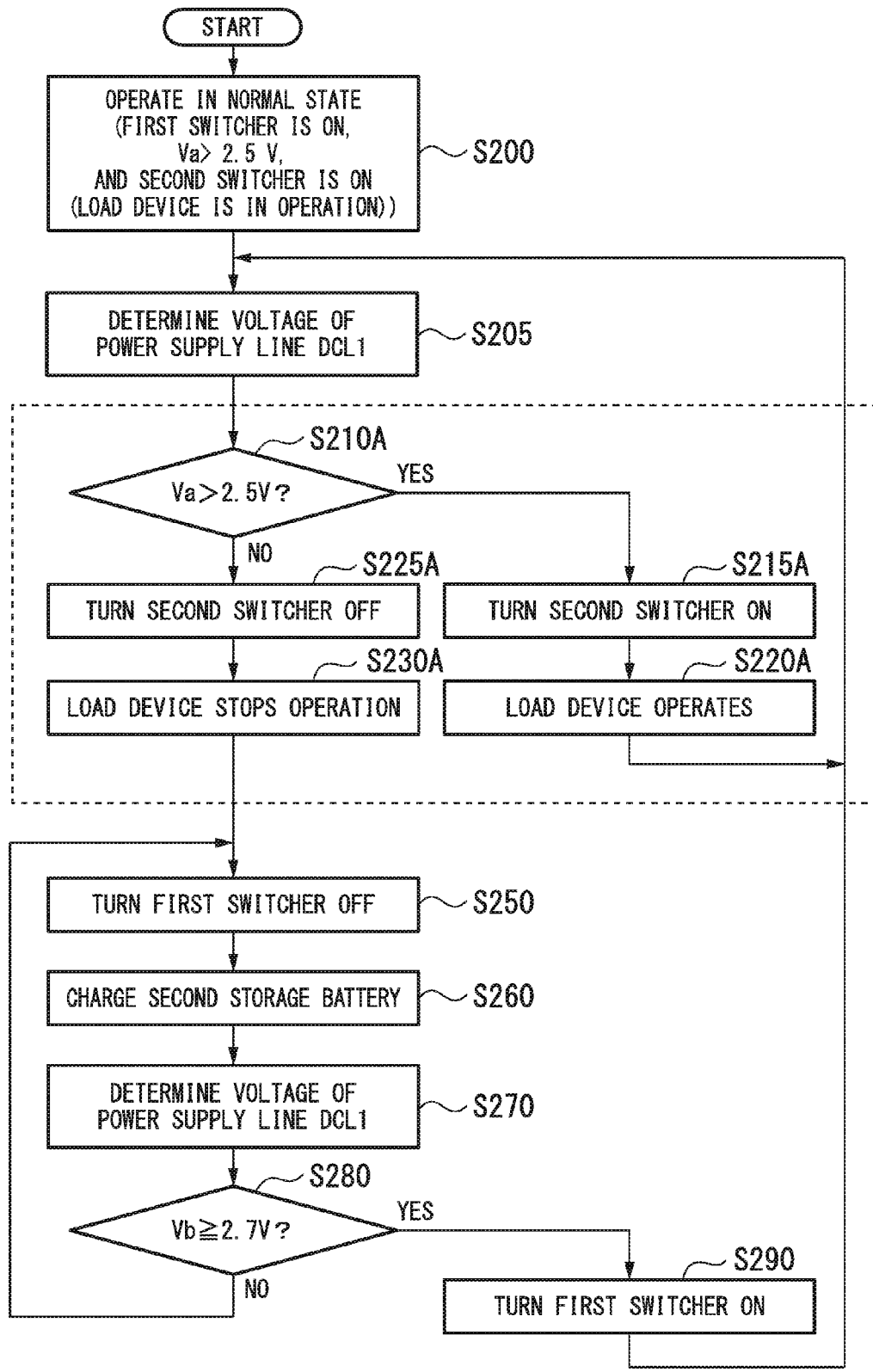
FIG. 14 is a second flowchart showing a processing procedure in the power storage system according to the second embodiment.

Further, FIG. 14 is a second flowchart showing a processing procedure in the power storage system 100A according to this embodiment. FIG. 14 is an example of a case in which the third threshold voltage and the first threshold voltage are the same voltage 2.5 V in the power storage system 100A.

The flowchart shown in FIG. 14 is different from the flowchart shown in FIG. 13 in a portion from processing step S210A to processing step 230A surrounded by a dashed line in FIG. 14, when compared with FIG. 13. Other processing steps are the same as those of the flowchart shown in FIG. 13. Therefore, steps of the same processing content are denoted with the same reference numerals and a description thereof will be omitted here.

Referring to FIG. 14, in step S205, the voltage determinator 170 determines the voltage of the power supply line DCL1 (in this case, the voltage Va of the first storage battery 130) and outputs a voltage determination signal Vf to the switching unit 150A.

Subsequently, the switching unit 150A determines whether or not the voltage Va of the first storage battery 130 exceeds than 2.5 V (the third threshold voltage and the first threshold voltage) (step S210A).

When it is determined in step S210A that the voltage Va of the first storage battery 130 exceeds 2.5 V (step S210A: Yes), the switching unit 150A switches the second switcher 180 to an ON state when the second switcher 180 is in an OFF state, and just maintains the ON state when the second switcher 180 is in the ON state (step S215A). Accordingly, the power storage system 100A supplies power to the load device 200A to operate the load device 200A (step S220A).

Subsequently, the power storage system 100A returns to the process of step S205 and repeatedly executes step S210A and subsequent processes.

On the other hand, when it is determined in step S210A that the voltage Va of the first storage battery 130 does not exceed 2.5 V (step S210A: No), that is, when the charging voltage Va of the first storage battery 130 is equal to or lower than 2.5 V, the switching unit 150A switches the second switcher 180 to the OFF state (step S225A). Accordingly, the power storage system 100A stops the supply of power to the load device 200A to stop the operation of the load device 200A (step S230A). Subsequently, the switching unit 150A proceeds to a process of step S250. Step S250 and subsequent processes are the same as the processes shown in FIG. 13, and repeated description will be omitted.

Thus, in the power storage system 100A, the first switcher 160 and the second switcher 180 can be turned ON or OFF at the same timing by setting the third threshold voltage to 2.5 V (the same voltage as the first threshold voltage). That is, when the first switcher 160 is in an ON state, the second switcher 180 enters an ON state, and when the first switcher 160 is in the OFF state, the second switcher 180 enters an OFF state. Therefore, the control in the switching unit 150A is simplified as compared with the case of FIG. 13.

As described above, the power storage system 100A may further include the second switcher 180 that connects or disconnects between the power storage system 100A and the load device 200A, and the switching unit 150A compares the charging voltage Va of the first storage battery 130 with the voltage with the third threshold voltage that is equal to or higher than 2.5 V (the first threshold voltage), causes the second switcher 180 to enter a closed state when the charging voltage Va of the first storage battery 130 exceeds the third threshold voltage, and causes the second switcher 180 to enter an open state when the charging voltage Va of the first storage battery 130 is equal to or lower than the voltage with the third threshold voltage.

In the power storage system 100A having such a configuration, the switching unit 150A causes the second switcher 180 to enter the connection state and supplies the power to the load device 200A when the charging voltage Va of the first storage battery 130 exceeds the third threshold voltage and the required power can be supplied from the first storage battery 130 to the load device 200A. On the other hand, the switching unit 150A causes the second switcher 180 to enter the open state and stop the supply of the power to the load device 200A when the charging voltage Va of the first storage battery 130 is equal to or lower than the third threshold voltage and the required power cannot be supplied from the first storage battery 130 to the load device 200A.

Accordingly, the power storage system 100A can cause the second switcher 180 to enter the open state and stop supply of the power to the load device 200A when the required power cannot be supplied to the load device 200A, and can cause the second switcher 180 to enter the connection state and supply the power to the load device 200A when the required power can be supplied to the load device 200A.

Further, in the power storage system 100A, the third threshold voltage is set to 2.5 V (the same voltage as the first threshold voltage), and the switching unit 150A causes the second switcher 180 to enter the connection state when the switching unit 150A causes the first switcher 160 to enter the closed state and short-circuit both terminals of the second storage battery 140, and causes the second switcher 180 to enter the open state when the switching unit 150A causes the first switcher 160 to enter the open state and release the short-circuited state of both terminals of the second storage battery 140.

In the power storage system 100A having such a configuration, the switching unit 150A causes the second switcher 180 to enter the connection state and supplies the power to the load device 200A when the switching unit 150A causes the first switcher 160 to enter the closed state and short-circuits both terminals of the second storage battery 140, that is, when required power can be supplied from the first storage battery 130 to the load device 200A. Further, the switching unit 150A causes the second switcher 180 to enter the open state when the switching unit 150A causes the first switcher 160 to enter the open state and release the short-circuited state of both terminals of the second storage battery 140, that is, when charging is performed from the solar battery 110 (power generation element) to the series circuit of the first storage battery 130 and the second storage battery 140.

Accordingly, the power storage system 100A can cause the second switcher 180 to enter the connection state when the power storage system 100A causes the first switcher 160 to enter the closed state, and cause the second switcher 180 to enter the open state when the power storage system 100A causes the first switcher 160 to enter the open state. That is, the power storage system 100A can control the opened and closed state of the first switcher 160 and the opened and closed state of the second switcher 180 at the same timing.

The present invention has been described above, but the power storage system of the present invention is not limited to only the shown examples described above and it is understood that various changes can be made without departing from the gist of the present invention.

For example, in the examples shown in FIGS. 2 and 12, the example of the solar battery 110 using the environmental power generation element as a power generation element is shown, but the present invention is not limited thereto. The power generation element may be any power generation element capable of performing environmental power generation. Here, the environmental power generation other than light is, for example, power generation using heat, vibration, wind power, or radio waves.

Further, although example in which the environment monitor device 210 includes the temperature sensor 211 and the humidity sensor 212 are shown in the example of the load device 200 shown in FIG. 2, the environment monitor device 210 may include any one of the temperature sensor 211 and the humidity sensor 212. Further, the environment monitor device 210 may include a sensor that determines information on other environments. The information on other environments is, for example, an illuminance, a $CO_2$ concentration, a vibration, a water level, a voltage, a current, sound, or an image.

Further, the power storage system 100 or 100A can be used as a power supply for opening and closing a door or a power supply for an electrical switch. When the power storage system is used for the power supply for opening and closing the door, or the like, a balance of the generated power amount and the power consumption amount may be negative, for example, even when light hits the solar battery 110 since the power supply for opening and closing a door or the power supply for an electrical switch has a different power consumption amount according to an installation environment or a use situation. In such a case, the power storage system 100 or 100A can be preferably used.

Third Embodiment

Figure 15:
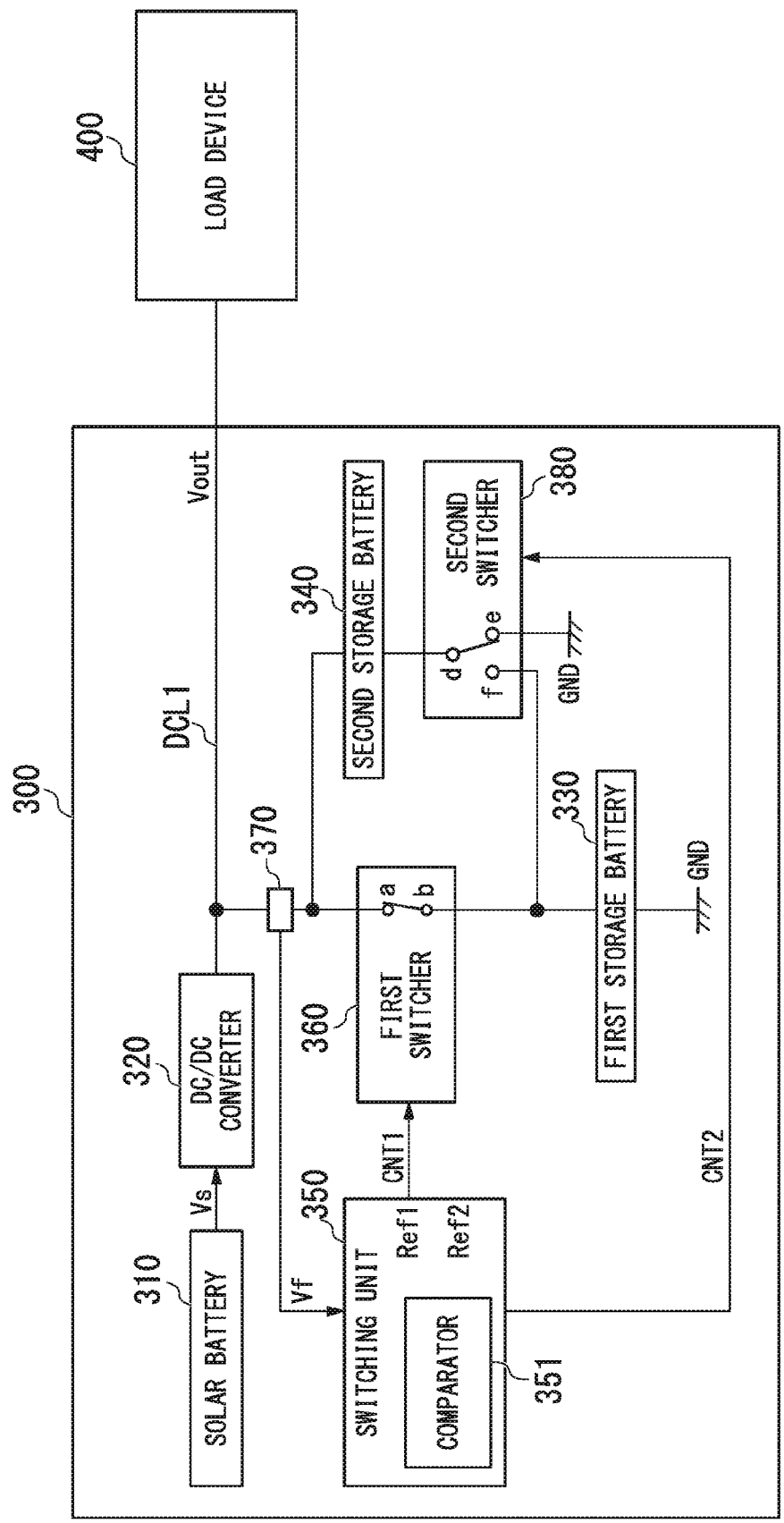
FIG. 15 is a configuration diagram showing a configuration example of a power storage system according to a third embodiment.

FIG. 15 is a configuration diagram showing a configuration example of a power storage system 300 according to this embodiment. The power storage system 300 supplies power to a load device 400 to operate the load device 400. The load device 400 is, for example, an environment monitor device functioning as a wireless sensor that operates without wiring or battery replacement. The environment monitor device includes a temperature sensor that measures temperature in an interior of an office or the like, or a humidity sensor that measures humidity in the interior. The load device 400 is configured to operate with power supplied from the power storage system 300, and to start the operation when the power supply voltage supplied from the power storage system 300 is equal to higher than, for example, 5.2 V and stop the operation when the power supply voltage supplied from the power storage system 300 is equal to lower than 2.5 V. Each voltage value described above is an example, but the present invention is not limited thereto. The voltage value may be a voltage value according to the storage battery used in the power storage system 300 or may be a voltage value according to use of the power storage system 300.

As shown in FIG. 15, the power storage system 300 includes a solar battery 310 using an environmental power generation element, a DC/DC converter 320 (DC voltage-to-DC voltage conversion device), a first storage battery 330, a second storage battery 340, a switching unit 350, a first switcher 360, a voltage determinator 370, and a second switcher 380.

The solar battery 310 is a solar battery for low illuminance and is, for example, a solar battery that is used with illuminance equal to or lower than 10000 (Lux). The solar battery 310 is configured so that a plurality of solar battery cells are arranged in series on the light reception surface side and a predetermined output voltage Vs is obtained. An input side of the DC/DC converter 320 is connected to the output side of the solar battery 310.

The DC/DC converter 320 converts the voltage Vs input from the solar battery 310 into a voltage according to the power supply voltage for the load device 400. The power supply line DCL1 is connected to an output side of the DC/DC converter 320. The power is supplied to the load device 400 via the power supply line DCL1. The DC/DC converter 320 is configured with a boost converter device or the like, for example, when the output voltage Vs of the solar battery 310 is lower than a voltage required by the load device 400. Further, the DC/DC converter 320 controls an output voltage so that the charging voltage of the first storage battery 330 does not exceed a predetermined upper limit voltage.

The first switcher 360 connects or disconnects between the positive electrode (+) terminal of the first storage battery 330 and the power supply line DCL1. The terminal a of the first switcher 360 is connected to the power supply line DCL1 via the voltage determinator 370 and is connected to the positive electrode (+) terminal of the second storage battery 340. The terminal b of the first switcher 360 is connected to the positive electrode (+) terminal of the first storage battery 330 and is connected to a terminal f of the second switcher 380.

The first storage battery 330 receives the power generated by the solar battery 310 and supplies the power to the load device 400. The first storage battery 330 is a capacitor with a large capacitance and is, for example, a lithium ion capacitor (LIC) with 40 F (farad). The negative electrode (−) terminal of the first storage battery 330 is connected to a ground GND. The positive electrode (+) terminal of the first storage battery 330 is connected to the terminal b of the first switcher 360 and connected to the terminal f of the second switcher 380. Since it is necessary for the first storage battery 330 to store charge for a long amount of time, a lithium-ion capacitor with a low leakage current is used. The capacitance of the first storage battery 330 is not limited to 40 F. and a capacitor with an appropriate capacitance can be selected on the basis of a generated power amount of the solar battery 310, an average value of the power consumption of the load device 400, and a time in which the load device 400 is desired to be continuously driven. The first storage battery 330 is charged to a voltage of, for example, about 2.5 V to 3.7 V at the time of shipment.

The second storage battery 340 is a capacitor having a capacitance smaller than the capacitance of the first storage battery 330 and is, for example, an electric double layer capacitor (EDLC) with 1 F (farads). A positive electrode (+) terminal of the second storage battery 340 is connected to the power supply line DCL1 via the voltage determinator 370 and connected to a terminal a of the first switcher 360. A negative electrode (−) terminal of the second storage battery 340 is connected to a common terminal d of the second switcher 380. The capacitance of the second storage battery 340 is not limited to 1 F, and a capacitor with an appropriate capacitance can be selected on the basis of the generated power amount of the solar battery 310, the average value of the power consumption of the load device 400, and a time in which the load device 400 is desired to return.

The second switcher 380 selectively connects the negative electrode (−) terminal of the second storage battery 340 to the ground GND side and the positive electrode (+) terminal of the first storage battery 330. The common terminal d of the second switcher 380 is connected to the negative electrode (−) terminal of the second storage battery 340. The terminal e of the second switcher 380 is connected to the ground GND. The terminal f of the second switcher 380 is connected to the positive electrode (+) terminal of the first storage battery 330, and is connected to the terminal b of the first switcher 360. Hereinafter, a state in which the common terminal d and the terminal e of the second switcher 380 are connected is referred to as a state in which the second switcher 380 selects the ground GND side. Further, a state in which the common terminal d and the terminal f of the second switcher 380 are connected is referred to as a state in which the second switcher 380 selects the first storage battery 330 side.

The voltage determinator 370 is provided to determine an over-discharging voltage of the first storage battery 330. That is, the lithium ion capacitor constituting the first storage battery 330 has a lower limit voltage, and if the first storage battery 330 is over-discharged to the lower limit voltage, cells deteriorate. The voltage determinator 370 determines a voltage corresponding to the charging voltage of the first storage battery 330 so that the lithium ion capacitor constituting the first storage battery 330 is not over-discharged to the lower limit voltage. Here, the voltage determinator 370 determines the voltage Vout of the power supply line DCL1 and output the voltage determination signal Vf to the switching unit 350 to determine a voltage corresponding to the over-discharging voltage of the first storage battery 330. The voltage determinator 370 is configured with, for example, a resistance voltage division circuit.

The switching unit 350 controls the first switcher 360 and the second switcher 380 according to a determination voltage of the voltage determinator 370. The switching unit 350 includes a comparator 351. The comparator 351 compares the voltage determination signal Vf from the power supply line DCL1 input from the voltage determinator 370 with a predetermined first threshold voltage Ref1 and a predetermined second threshold voltage Ref2 of the comparator 351. The first threshold voltage Ref1 is a threshold voltage at which the load device 400 stops the operation due to a decrease in the voltage Vout of the power supply line DCL1 from a normal state. The first threshold voltage Ref1 is set according to the lower limit voltage of the lithium ion capacitor constituting the first storage battery 330. The lower limit voltage of the lithium ion capacitor is, for example, about 2V, and the first threshold voltage Ref1 is, for example, 2.5 V. The second threshold voltage Ref2 is a threshold voltage when the load device 4 returns to the normal state due to an increase the voltage Vout of the power supply line DCL1 from a state in which the load device 400 stops the operation. The second threshold voltage Ref2 is a voltage higher by a voltage corresponding to the hysteresis voltage than the first threshold voltage Ref1. The hysteresis voltage is, for example, a 2.7 V, and the second threshold voltage Ref2 is (2.5 V+2.7 V=5.2 V).

In the normal state, the switching unit 350 outputs a control signal CNT1 to cause the first switcher 360 to enter an ON state, and outputs a control signal CNT2 to cause the second switcher 380 to select the ground GND side. The normal state is a state in which the first storage battery 330 and the second storage battery 340 are charged with the power generated by the solar battery 310, and power is mainly supplied from the first storage battery 330 to the load device.

In the normal state, the switching unit 350 determines that the voltage Vout of the power supply line DCL1 decreases from the voltage in the normal state (for example 3 V) to the first threshold voltage Ref1 (2.5 V) or lower on the basis of the voltage determination signal Vf input from the voltage determinator 370 due to stop of the power generation of the solar battery 310. When such a determination is performed, the switching unit 350 outputs a control signal CNT1 to cause the first switcher 360 to enter the OFF state, and outputs a control signal CNT2 to cause the second switcher 380 to select the first storage battery 330 side. Accordingly, the first storage battery 330 and the second storage battery 340 are switched from the parallel connection to the series connection, and the voltage Vout of the power supply line DCL1 becomes a voltage obtained by the charging voltage of the second storage battery 340 to the charging voltage of the first storage battery 330. Further, the load device 400 stops the operation.

Since the first storage battery 330 and the second storage battery 340 are switched from a parallel connection to a series connection immediately after the second switcher 380 enters a state in which the second switcher 380 selects the first storage battery 330 side (also referred to as a high-speed start state) in a state in which the first switcher 360 is in an OFF state, the voltage Vout of the power supply line DCL1 is about twice the first threshold voltage Ref1. The voltage Vout of the power supply line DCL1 increases due to subsequent resumption of the power generation of the solar battery 310. When the voltage Vout of the power supply line DCL1 increases to the second threshold voltage Ref2 (5.2 V), the operation of the load device 400 first returns. Further, the switching unit 350 determines that the voltage Vout of the power supply line DCL1 increases to the second threshold voltage Ref2, outputs a control signal CNT1 to cause the first switcher 360 to enter an ON state, and outputs a control signal CNT2 to cause the second switcher 380 to select the ground GND side.

Accordingly, the first storage battery 330 and the second storage battery 340 are switched from the series connection to the parallel connection. Thus, the switching unit 350 controls the first switcher 360 and the second switcher 380 with a hysteresis characteristic having a width of 2.7 V between the first threshold voltage Ref1 (2.5 V) and the second threshold voltage Ref2 (5.2 V).

In FIG. 15, an example in which the first switcher 360 and the second switcher 380 are configured with a switch using a mechanical contact. The switch may include a semiconductor switch using a semiconductor switching element such as a Metal Oxide Semiconductor Field Effect Transistor (MOSFET) or an Insulated Gate Bipolar Transistor (IGBT).

Figure 16A:
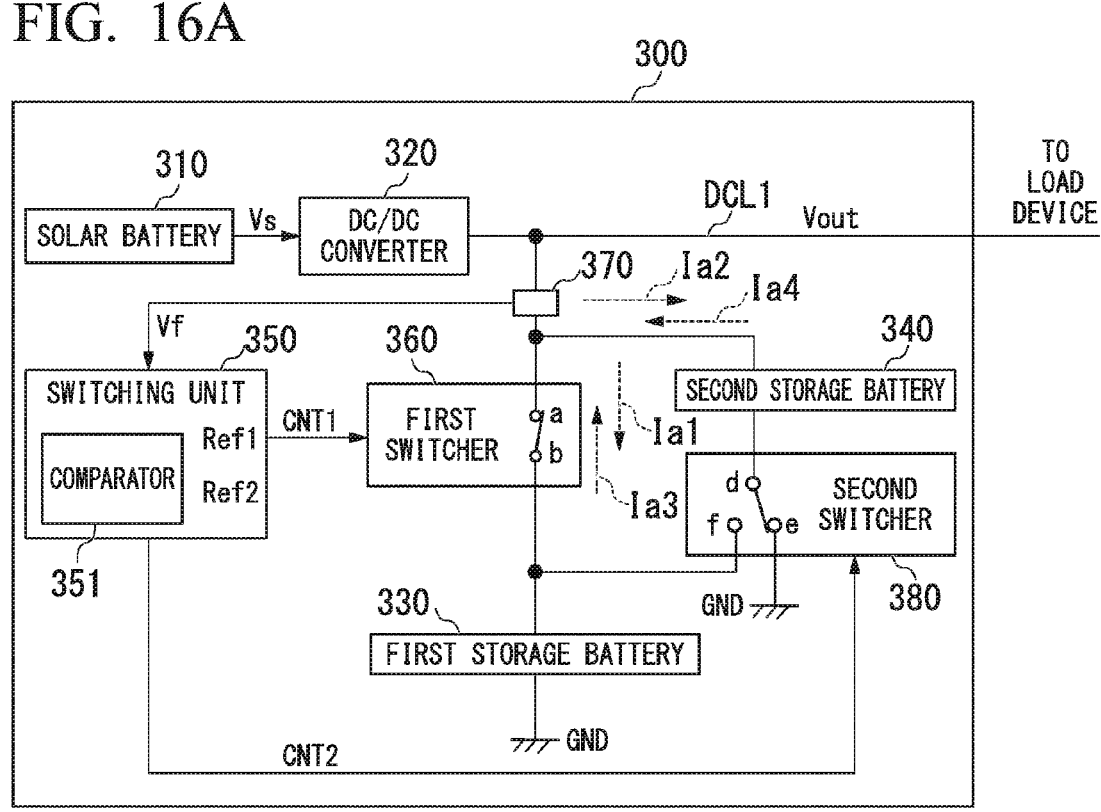
FIG. 16A is an illustrative diagram showing a power supply state in each switch state in the power storage system according to the third embodiment.
Figure 16B:
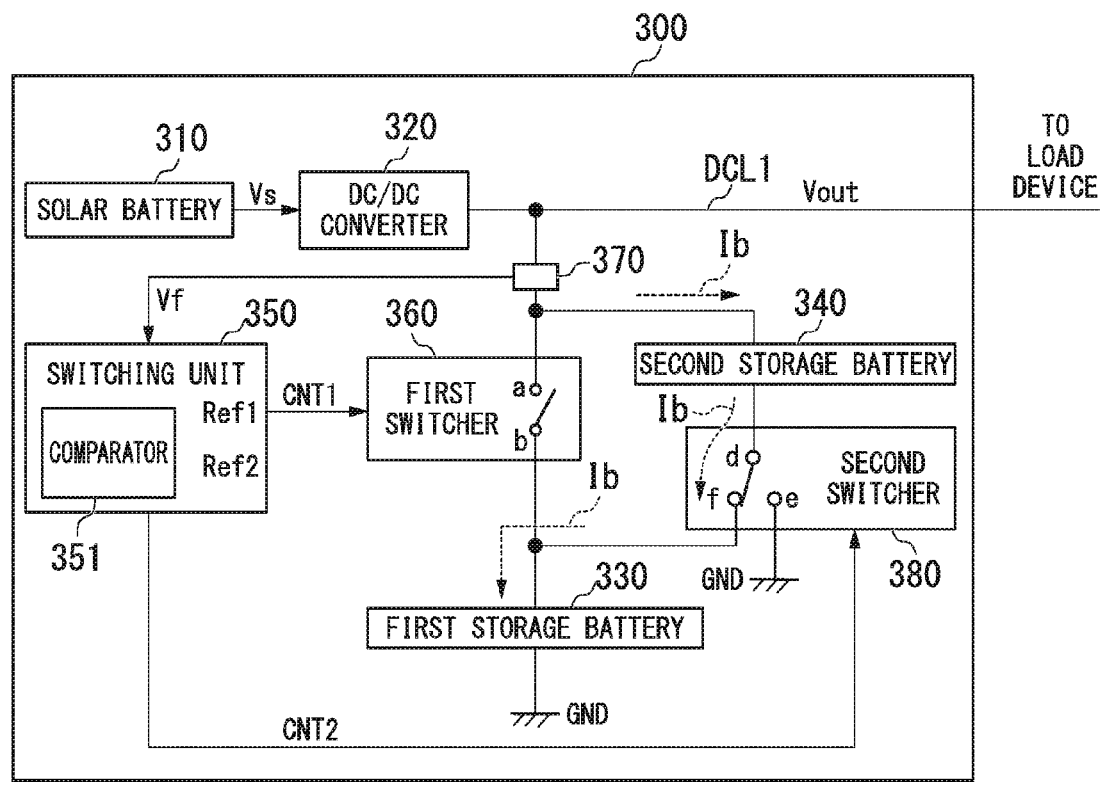
FIG. 16B is an illustrative diagram showing a power supply state in each switch state in the power storage system according to the third embodiment.

Next, an operation of the power storage system 300 will be described. FIGS. 16A and 16B are illustrative diagrams showing a power supply state in each switch state in the power storage system according to this embodiment.

FIG. 16A is an illustrative diagram when the first switcher 360 is caused to enter an ON state, and the second switcher 380 is caused to select a ground GND side. In this state, terminals a and b of the first switcher 360 are connected, and a common terminal d and a terminal e of the second switcher 380 are connected. In this case, a positive electrode (+) terminal of the first storage battery 330 is connected to the power supply line DCL1 via the first switcher 360, and a negative electrode (−) terminal of the first storage battery 330 is connected to the ground GND. A positive electrode (+) terminal of the second storage battery 340 is connected to the power supply line DCL1, and a negative electrode (−) terminal of the second storage battery 340 is connected to the ground GND via the second switcher 380. Therefore, the first storage battery 330 and the second storage battery 340 are connected in parallel between the power supply line DCL1 and the ground GND.

In a normal state, the first storage battery 330 and the second storage battery 340 are charged with power generated by the solar battery 310, and discharge currents Ia3 and Ia4 flow from the first storage battery 330 and the second storage battery 340 to the load device 400 to supply power. Thus, in the normal state, the first storage battery 330 and the second storage battery 340 are connected in parallel between the power supply line DCL1 and the ground GND, and the first storage battery 330 and the second storage battery 340 are charged and discharged according to the generated power of the solar battery 3 and an operating state of the load device 400. Since the capacitance of the first storage battery 330 is larger than that of the second storage battery 340, mainly, the first storage battery 330 charges or discharges the generated power from the solar battery 310.

If the power generation of the solar battery 310 stops, discharging of the first storage battery 330 and the second storage battery 340 is performed, and the voltage Vout of the power supply line DCL11 decreases. When the voltage Vout of the power supply line DCL1 decreases to the first threshold voltage Ref1 (2.5 V) or lower, the load device 400 stops the operation, and the switching unit 350 causes the first switcher 360 to enter the OFF state and causes the second switcher 380 to select a first storage battery 330 side.

FIG. 16B is an illustrative diagram when the first switcher 360 is in an OFF state and the first storage battery 330 side of the second switcher 380 is selected. In this state (a fast start state), the terminals a and b of the first switcher 360 is blocked, and the common terminal d and a terminal f of the second switcher 380 are connected. In this case, the positive electrode (+) terminal of the first storage battery 330 is connected to the negative electrode (−) terminal of the second storage battery 340 via the second switcher 380. Thus, the first storage battery 330 and the second storage battery 340 are switched from the parallel connection to a series connection between the power supply line DCL1 and the ground GND, and the voltage Vout of the power supply line DCL1 becomes about twice the first threshold voltage Ref1 (2.5 V).

Thereafter, when the power generation of the solar battery 310 is resumed, a current Ib flows from the solar battery 310 to the series circuit of the first storage battery 330 and the second storage battery 340, and charging of the first storage battery 330 and the second storage battery 340 is started. Thus, the voltage Vout of the power supply line DCL1 further increases.

The capacitance of the second storage battery 340 (for example, 1 F) is smaller than the capacitance (for example 40 F) of the first storage battery 330. Therefore, if charging from the solar battery 310 to the second storage battery 340 is started, the charging voltage of the second storage battery 340 rapidly increases. Since the voltage Vout of the power supply line DCL1 becomes a sum of the charging voltage of the first storage battery 330 and the charging voltage of the second storage battery 340, the voltage Vout of the power supply line DCL1 rapidly increases due to the increase of the charging voltage of the second storage battery 340.

When the voltage Vout of the power supply line DCL1 increases to the second threshold voltage Ref2 (5.2 V) or more, the load device 400 returns to an operation, and the switching unit 350 causes the first switcher 360 to enter the ON state and causes the second switcher 380 to select the ground GND side, as shown in FIG. 16A. Accordingly, the first storage battery 330 and the second storage battery 340 are switched from the series connection to the parallel connection, the power supply voltage is supplied again from the first storage battery 330 to the load device 400, and the power storage system 300 returns to the operation in the normal state.

In this embodiment, the switching unit 350 controls the first switcher 360 and the second switcher 380 with hysteresis characteristics with 2.7 V in width between the first threshold voltage Ref1 (2.5 V) and the second threshold voltage Ref2 (5.2 V). Therefore, it is possible to maintain a stable operation.

Figure 17:
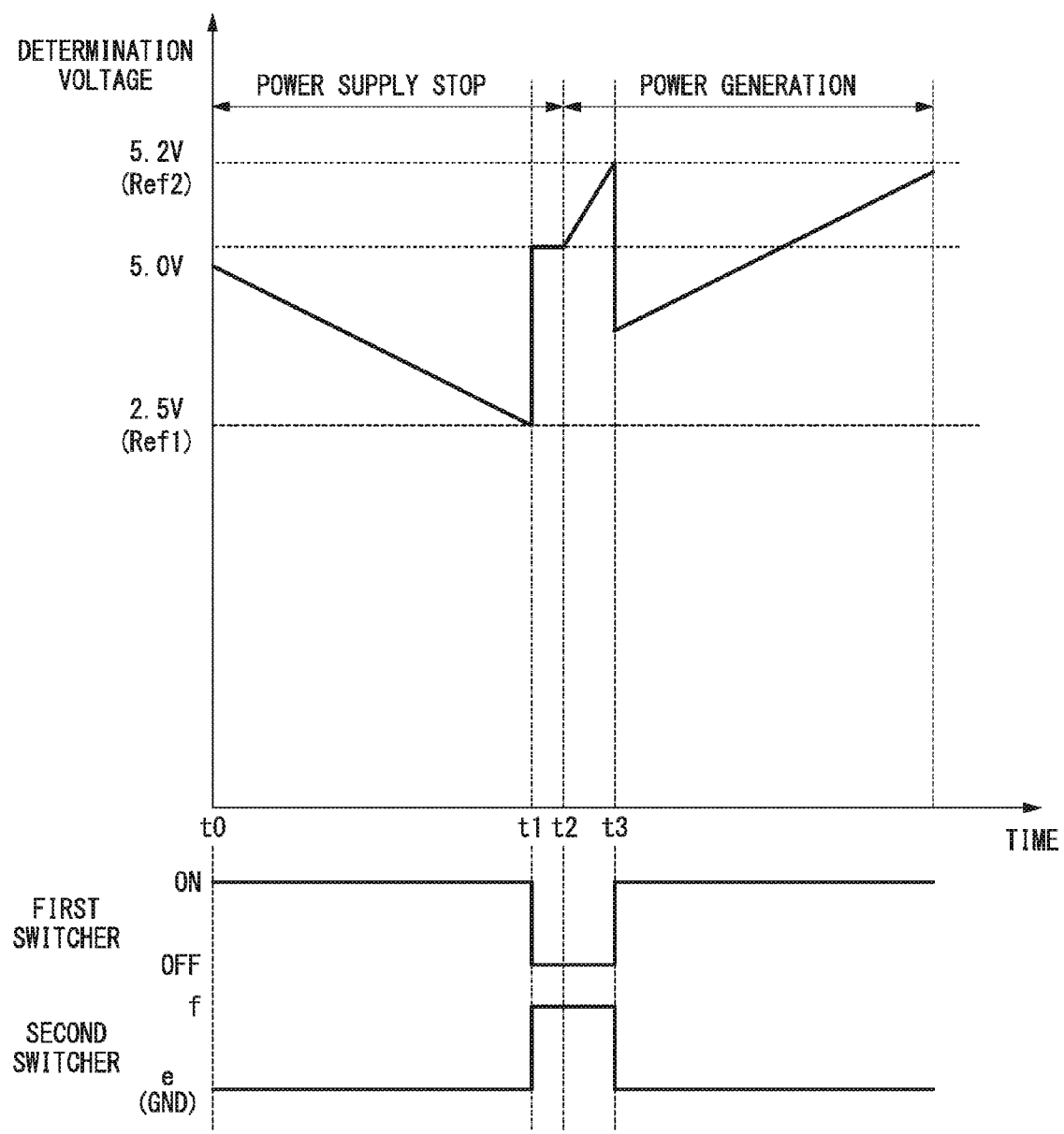
FIG. 17 is an illustrative diagram of switch control in the power storage system in the third embodiment.

FIG. 17 is an illustrative diagram of switch control in the power storage system 300 according to this embodiment.

In FIG. 17, a horizontal axis indicates time and a vertical axis indicates a determination voltage of the voltage determinator 370.

At a time t0, a power generation operation of the solar battery 310 is assumed to stop in a normal state. At this time, it is assumed that the first switcher 360 is in an ON state, and the ground GND side of the second switcher 380 is selected. When the power generation operation of the solar battery 310 stops, the first storage battery 330 and the second storage battery 340 are discharged, and the determination voltage of the voltage determinator 370 decreases, as shown in FIG. 17.

At a time t1, if the determination voltage of the voltage determinator 370 decreases to the first threshold voltage Ref1 (2.5 V) or lower, the load device 400 stops the operation. The first switcher 360 enters an OFF state, the second switcher 380 enters a state in which the second switcher 380 selects the first storage battery 330 side, the first storage battery 330 and the second storage battery 340 are connected in series between the power supply line DCL1 and the ground GND, and the voltage Vout of the power supply line DCL1 is about twice the voltage of the first threshold voltage Ref1 (2.5 V).

Thereafter, at a time t2, the power generation operation of the solar battery 310 is assumed to be resumed. If the power generation of the solar battery 310 is resumed, a charging current flows from the solar battery 310 to the series circuit of the first storage battery 330 and the second storage battery 340. Accordingly, the determination voltage of the voltage determinator 370 increases. Since the second storage battery 340 with a small capacitance is connected in series with the first storage battery 330, the voltage Vout of the power supply line DCL1 increases rapidly. Therefore, at the time t2 and subsequent time, the determination voltage of the voltage determinator 370 increases rapidly as shown in FIG. 17.

At a time t3, if the determination voltage of the voltage determinator 370 increases to the second threshold voltage Ref2 (5.2 V) or higher, the operation of the load device 400 returns, the first switcher 360 enters an ON state, the second switcher 380 enters a state in which the second switcher 380 selects the ground GND side, and return to the operation in the normal state is performed. In the normal state, since the first storage battery 330 and the second storage battery 340 are connected in parallel between the power supply line DCL1 and the ground GND, the determination voltage of the voltage determinator 370 gradually increases after the time t3.

Thus, in the power storage system 300 according to this embodiment, the first storage battery 330 and the second storage battery 340 with a small capacitance are arranged in series between the power supply line DCL1 and the ground GND in the high-speed start state. Accordingly, the power storage system 300 can cause the operation of the load device 400 of which the operation temporarily stops due to a decrease in a voltage value of the first storage battery 330 to return in a short amount of time after the power generation of the solar battery 310 is resumed.

In the normal state, since the first storage battery 330 and the second storage battery 340 are connected in parallel between the power supply line DCL1 and the ground GND, charging is also performed in the second storage battery 340. Thus, when the first storage battery 330 and the second storage battery 340 are connected in series between the power supply line DCL1 and the ground GND, the charge remains in the second storage battery 340. Accordingly, the return time can be shortened as compared with a case in which the return is caused from the state in which the second storage battery 340 is fully discharged.

Figure 18:
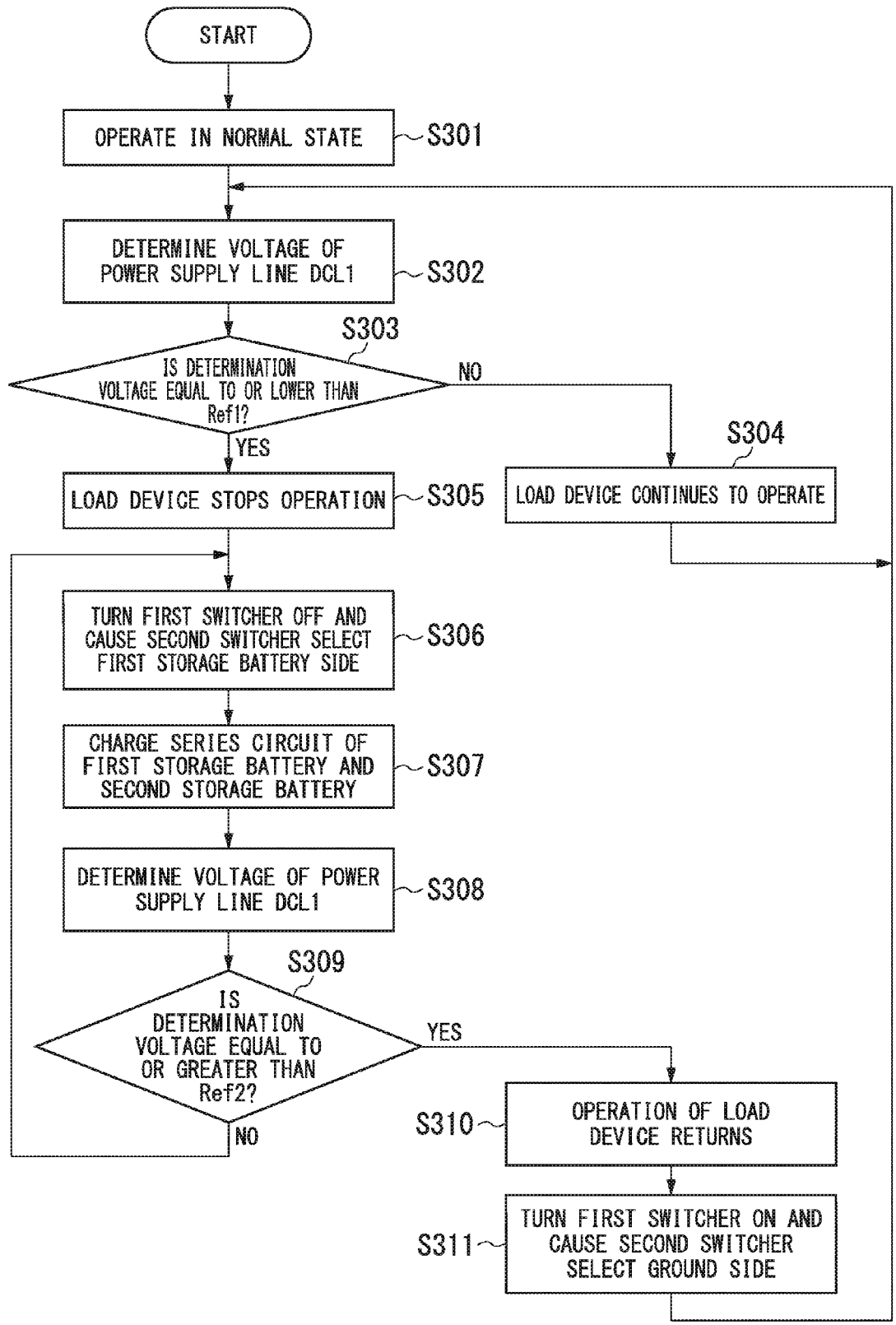
FIG. 18 is a flowchart showing a processing procedure in the power storage system according to the third embodiment.

FIG. 18 is a flowchart showing a processing procedure in the power storage system 300 according to this embodiment.

First, the power storage system 300 is assumed to operate in a normal state (parallel connection) (step S301). That is, in the power storage system 300, it is assumed that the first switcher 360 is in an ON state, the second switcher is in a state in which the second switcher selects the ground GND side, the voltage Vout of the power supply line DCL1 exceeds 2.5 V, and the load device 400 is in operation.

The voltage determinator 370 determines the voltage Vout of the power supply line DCL1, and outputs the voltage determination signal Vf to the switching unit 350 (step S302). Then, the switching unit 350 determines whether or not a determination voltage of the voltage determinator 370 is equal to or lower than the first threshold voltage Ref1 (2.5 V) (step S303). If it is determined in step S303 that the determination voltage of the voltage determinator 370 is not equal to or lower than the first threshold voltage Ref1 (2.5 V) (step S303: No), the load device 400 continues to perform the operation (step S304) and the power storage system 300 returns to the process of step S302. Subsequently, the power storage system 300 executes step S302 and subsequent processes again.

On the other hand, when it is determined in step S303 that the voltage Vout of the power supply line DCL1 is equal to or lower than the first threshold voltage Ref1 (2.5 V) (step S303: Yes), the load device 400 stops the operation (step S305) and the power storage system 300 proceeds to a process of step S306.

In step S306, the switching unit 350 switches the first switcher 360 from the ON state to the OFF state, and switches the second switcher 380 to a state in which the second switcher 380 selects the first storage battery 330 side. Accordingly, the first storage battery 330 and the second storage battery 340 are connected in series between the power supply line DCL1 and the ground GND. When the solar battery 310 performs the power generation, charging is performed from the solar battery 310 to the series circuit of the first storage battery 330 and the second storage battery 340 (step S307).

Then, the voltage determinator 370 determines the voltage Vout of the power supply line DCL1, and outputs the voltage determination signal Vf to the switching unit 350 (step S308). The switching unit 350 determines whether or not a determination voltage of the voltage determinator 370 is equal to or higher than the voltage with the second threshold Ref2 (5.2 V) (step S309). When it is determined in step S309 that the determination voltage of the voltage determinator 370 is not equal to or higher than the voltage with the second threshold Ref2 (5.2 V) (step S309: No), the power storage system 300 returns to the process of step S306, and the switching unit 350 maintains the first switcher 360 in the OFF state and maintains the second switcher 380 in a state in which the second switcher 380 selects the first storage battery 330 side (step S306). Subsequently, the power storage system 300 repeatedly executes step S306 and subsequent processes.

In the power storage system 300, since the voltage Vout of the power supply line DCL1 does not increase when the power generation is not performed in the solar battery 310 and charging from the solar battery 310 to the series circuit of first storage battery 330 and the second storage battery 340 is not performed, the processes of steps S306 to S309 are repeatedly performed. If the power generation from the solar battery 310 is resumed, a charging current flows to the series connection of the first storage battery 330 and the second storage battery 340, and the voltage Vout of the power supply line DCL1 increases.

When the voltage Vout of the power supply line DCL1 is determined to have increased to the second threshold voltage Ref2 (5.2 V) or more (step S309: Yes), the operation of the load device 400 returns (step S310), and the switching unit 350 switches the first switcher 360 from the OFF state to the ON state and switches the second switcher 380 to a state in which the second switcher 380 selects the ground GND side (step S311). Accordingly, the power storage system 300 returns to the normal state (parallel connection). Subsequently, the power storage system 300 returns to the process of step S302 and executes step S302 and subsequent processes again.

As described above, the power storage system 300 of this embodiment includes the power generation element (for example, the solar battery 310) that performs environmental power generation, the power supply line DCL1 that supplies the power to the load device 400, the first storage battery 330 that is charged by power generated by the power generation element via the power supply line and supplies the power to the load device, the second storage battery 340 having a capacitance smaller than that of the first storage battery, the switcher (the first switcher 360 and the second switcher 380) that is selectively set to a parallel connection state (FIG. 16A) in which the first storage battery and the second storage battery are connected in parallel between the power supply line and the ground (GND) and a series connection state (FIG. 16B) in which the first storage battery and the second storage battery are connected in series between the power supply line and the ground, the voltage determinator 370 that determines a voltage at which the first storage battery is over-discharged, and the switching unit 350 that controls the switcher according to the determination voltage of the voltage determinator, wherein the switching unit has the first threshold voltage Ref1 that is compared with the voltage when the determination voltage of the voltage determinator decreases, and the second threshold voltage Ref2 that is compared with the voltage when the determination voltage of the voltage determinator increases, the switching unit compares the determination voltage of the voltage determinator with the first threshold voltage when the switcher is set to the parallel connection state and sets the switcher to the series connection state when the determination voltage of the voltage determinator becomes equal to or lower than the first threshold voltage, and the switching unit compares the determination voltage of the voltage determinator with the second threshold voltage when the switcher is set to the series connection state and sets the switcher to the parallel connection state when the determination voltage of the voltage determinator becomes equal to or higher than the voltage of the second threshold.

According to the configuration, in this embodiment, it is possible to cause the operation of the load device to return in a short amount of time when the power generation element performs power generation.

Fourth Embodiment

Figure 19:
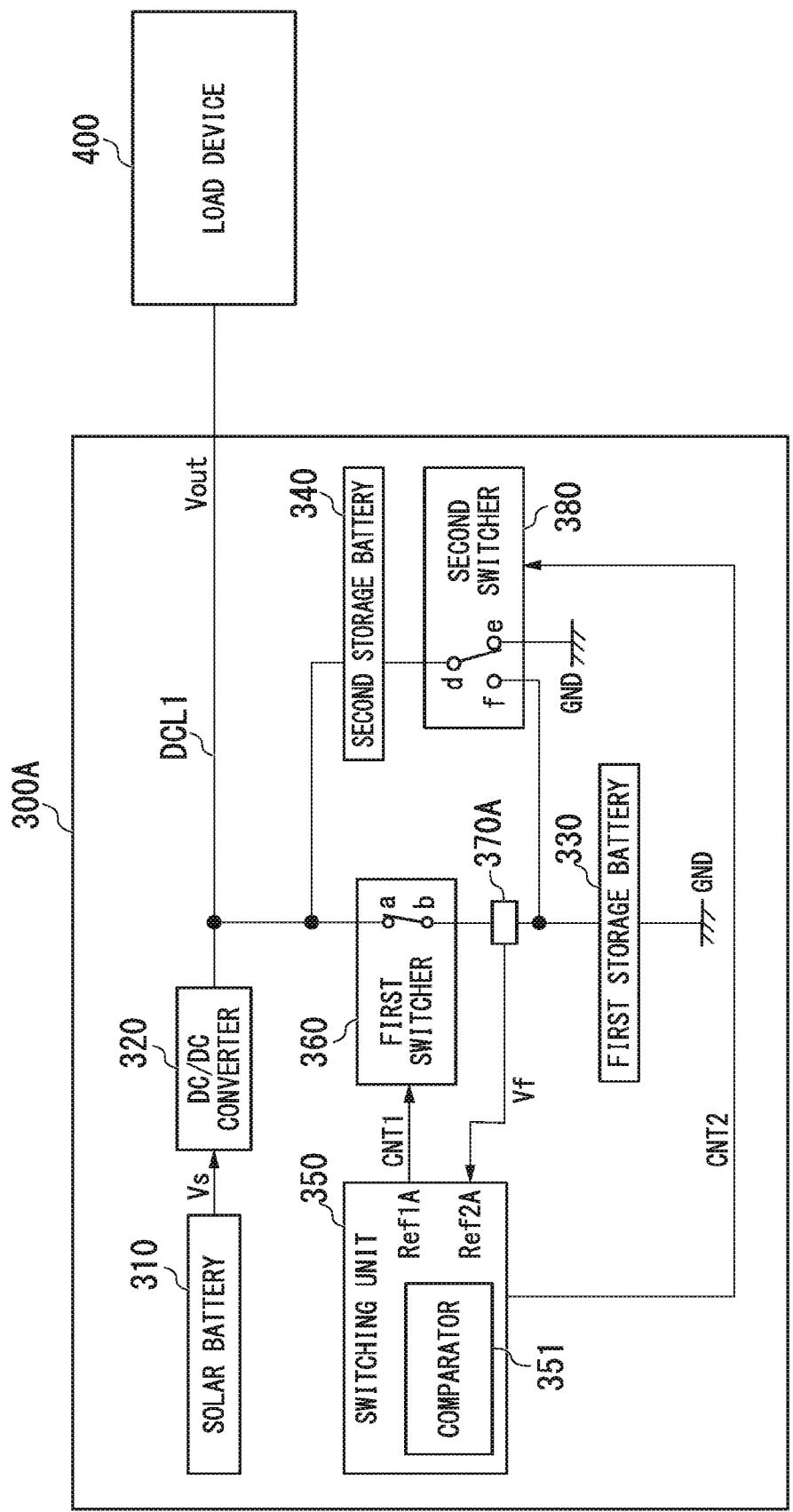
FIG. 19 is a configuration diagram showing a configuration example of a power storage system according to a fourth embodiment.

FIG. 19 is a configuration diagram showing a configuration example of a power storage system 300A according to this embodiment. The position of a voltage determinator 370A is different from a position of the voltage determinator 370 of the first embodiment. Other configurations are the same as those in the first embodiment. The same components are denoted with the same reference numerals and description thereof will be omitted.

In the third embodiment, the voltage determinator 370 determines the voltage between the ground GND and the power supply line DCL1, and outputs the voltage to the switching unit 350. On the other hand, in the second embodiment, the voltage determinator 370A determines the voltage between the ground GND and the positive electrode (+) terminal of the first storage battery 330, and outputs the voltage to the switching unit 350.

In the third embodiment, the first threshold voltage Ref1 is set according to a lower limit voltage of the lithium ion capacitor constituting the first storage battery 330. The first threshold voltage Ref1 is a threshold voltage when the first switcher 360 is in an ON state and the ground GND side of the second switcher 380 is selected. In this case, since the first switcher 360 is in an ON state, the voltage between the ground GND and the power supply line DCL1, is equal to the voltage between the ground GND and the positive electrode (+) terminal of the first storage battery 330. Therefore, the first threshold voltage Ref1A in the second embodiment is set to, for example, 2.5 V according to the lower limit voltage of the lithium ion capacitor constituting the first storage battery 330, similar to the first threshold voltage Ref1 in the first embodiment.

In the third embodiment, the second threshold voltage Ref2 is set to a voltage higher by a voltage corresponding to the hysteresis voltage than the first threshold voltage Ref1. The second threshold voltage Ref2 is a threshold voltage when the first switcher 360 is in an OFF state and the first storage battery 330 side of the second switcher 380 is selected. In this case, the voltage determinator 370 of the first embodiment determines the voltage between the ground GND and the power supply line DCL1, and this voltage is a sum of the charging voltage of the first storage battery 330 and the charging voltage of the second storage battery 340. On the other hand, the voltage determinator 370A of the second embodiment determines the voltage between the ground GND and the first storage battery 330 (the charging voltage of the first storage battery 330), and a value different by the charging voltage of the second storage battery 340 is obtained. Therefore, in the second embodiment, the second threshold voltage Ref2A is set to a voltage obtained by adding a correction hysteresis voltage corrected according to the capacitance of first storage battery 330 and the capacitance of the second storage battery 340 to the first threshold voltage Ref1A.

That is, in the third embodiment, the second threshold voltage Ref2 (5.2 V) is a voltage (2.5 V+2.7 V=5.2 V) higher by 2.7 V corresponding to the hysteresis voltage than the first threshold voltage Ref1 (2.5 V). Here, 2.7 V of the hysteresis voltage consists of the charging voltage (2.5 V) of the second storage battery 340 immediately after series connection and, mainly, an increase (0.2 V) in the charging voltage of the second storage battery 340 due to the power generation of the solar battery 310.

On the other hand, in this embodiment, if the capacitance of the first storage battery 330 is 40 F and the capacitance of the second storage battery 340 is 1 F, a voltage change of 0.2 V in the second storage battery 340 corresponds to a voltage change of $(0.2 \text{ V} \times (1 \text{ F}/40 \text{ F}))$ V in the first storage battery 330. Thus, the second threshold voltage Ref2A in this embodiment is set as Equation (1) below $$Ref2A = 2.5 \text{ V} + (0.2 \text{ V} \times (1 \text{ F}/40 \text{ F})) \quad (1)$$

That is, the second threshold voltage Ref2A is expressed as $Ref2A = 2.5 \text{ V} + (0.2 \text{ V} \times (C2/C1))$ when the capacitance of the first storage battery 330 is C1 and the capacitance of the second storage battery 340 is C2. Values 2.5 V and 0.2 V in Equation (1) are examples and the present invention is not limited thereto.

As described above, in the power storage system 300A of this embodiment, the voltage determinator 370A determines the voltage of the first storage battery 330, the first threshold voltage Ref1A is set according to the lower limit voltage of the first storage battery, and the second threshold voltage Ref2A is set to a voltage obtained by adding the correction hysteresis voltage corrected according to the capacitance of the first storage battery and the capacitance of the second storage battery 340 to the first threshold voltage.

With this configuration, in this embodiment, cells of the first storage battery are prevented from deteriorating by setting the first threshold voltage according to the lower limit voltage of the first storage battery. Further, in this embodiment, it is possible to stabilize the operation by setting the second threshold voltage to the voltage obtained by adding the correction hysteresis voltage corrected according to the capacitance of the first storage battery and the capacitance of the second storage battery.

The embodiments of the present invention have been described above, but the power storage system of the present invention is not limited to only the above-described embodiments and it is understood that various changes can be made without departing from the gist of the present invention.

For example, in the above-described embodiments, the example of the solar battery 310 using the environmental power generation element as a power generation element is shown, but the present invention is not limited thereto. The power generation element may be any power generation element capable of performing environmental power generation. Here, the environmental power generation other than light is, for example, power generation using heat, vibration, wind power, or radio waves.

Further, the power storage system 300 or 300A can be used as a power supply for opening and closing a door or a power supply for an electrical switch. When the power storage system is used for the power supply for opening and closing the door, or the like, a balance of the generated power amount and the power consumption amount may be negative, for example, even when light hits the solar battery 310 since the power supply for opening and closing a door or the power supply for an electrical switch has a different power consumption amount according to an installation environment or a use situation. In such a case, the power storage system 300 or 300A can be preferably used.

DESCRIPTION OF THE REFERENCE SYMBOLS 100, 100A, 300,300A: Power storage system
110, 310: Solar battery (power generation element)
120, 320: DC/DC converter
130, 330: First storage battery
140, 340: Second storage battery
150, 150A, 350: Switching unit
151, 151A, 351: Comparator
160, 360: First switcher
170, 370, 370A: Voltage determinator
180, 380: Second switcher
200, 200A, 400: Load device
210: Environment monitor device
211: Temperature sensor
212: Humidity sensor
213: Wireless communicator

The invention claimed is:

1. A power storage system, comprising:
a power generation element that performs environmental power generation;
a first storage battery that receives power generated by the power generation element and supplies the power to a load device;
a second storage battery that has a capacitance smaller than that of the first storage battery and is connected in series with the first storage battery;
a first switcher that is connected in parallel to the second storage battery, short-circuits both terminals of the second storage battery in a closed state, and releases a short-circuited state of the second storage battery in an open state; and
a switching unit that controls the opened and closed states of the first switcher, wherein the switching unit
compares a charging voltage of the first storage battery with a predetermined first threshold voltage when both terminals of the second storage battery are short-circuited by the first switcher and charging is performed from the first storage battery to the load device via the first switcher,
performs control so that the first switcher enters an open state when the charging voltage of the first storage battery becomes equal to or lower than the predetermined first threshold voltage,
determines the charging voltage of the entire series circuit of the first storage battery and the second storage battery or determines the charging voltage of a single entity of the second storage battery and sums the determined charging voltage and the charging voltage of the first storage battery to obtain the charging voltage of the entire series circuit when the short-circuited state of both terminals of the second storage battery is released by the first switcher and charging is performed from the power generation element to the series circuit, and
performs control so that the first switcher enters the closed state when the charging voltage of the entire series circuit becomes equal to or higher than a predetermined second threshold voltage that is higher than the first threshold voltage.

2. The power storage system according to claim 1,
wherein a capacitance of the first storage battery is set on the basis of a generated power amount of the power generation element, an average value of power consumption of the load device to which power is supplied from the first storage battery, and a time in which the load device is continuously driven with power stored in the first storage battery, and
wherein the capacitance of the second storage battery is set on the basis of the generated power amount of the power generation element, the average value of power consumption of the load device, and a time from stop of the operation of the load device due to a decrease in the charging voltage of the first storage battery to return of the operation of the load device through power generation in the power generation element.

3. The power storage system according to claim 1,
wherein the first storage battery is a type of capacitor having a leakage current lower than that of the second storage battery.

4. The power storage system according to claim 1, further comprising:
a second switcher that connects or disconnects between the power storage system and the load device wherein the switching unit causes the second switcher to enter a connection state when the charging voltage of the first storage battery exceeds a third threshold voltage that is equal to or higher than the first threshold voltage when comparing the charging voltage of the first storage battery with the third threshold voltage, and causes the second switcher to enter an open state when the charging voltage of the first storage battery is equal to or lower than the third threshold voltage.

5. The power storage system according to claim 4,
wherein the third threshold voltage is set to the same voltage as the first threshold voltage, and
wherein the switching unit causes the second switcher to enter a closed state when the switching unit causes the first switcher to enter a closed state and short-circuit both terminals of the second storage battery, and
causes the second switcher to enter an open state when the switching unit causes the first switcher to enter the open state and release a short-circuited state of both terminals of the second storage battery.

6. The power storage system according to claim 1, comprising:
a DC/DC converter that converts an output voltage of the power generation element into a predetermined voltage and supplies the voltage to the first storage battery and the second storage battery,
wherein the DC/DC converter controls the output voltage so that the charging voltage of the first storage battery does not exceed a predetermined upper limit voltage.

7. The power storage system according to claim 1,
wherein the first storage battery is a lithium ion capacitor.

8. A power storage method in a power storage system comprising a power generation element that performs environmental power generation, a first storage battery that receives power generated by the power generation element and supplies the power to a load device, a second storage battery that has a capacitance smaller than that of the first storage battery and is connected in series with the first storage battery, a first switcher that is connected in parallel to the second storage battery, short-circuits both terminals of the second storage battery in a closed state, and releases a short-circuited state of the second storage battery in an open state, and a switching unit that controls the opened and closed states of the first switcher,
wherein the switching unit controls such that
comparing a charging voltage of the first storage battery with a predetermined first threshold voltage when both terminals of the second storage battery are short-circuited by the first switcher and charging is performed from the first storage battery to the load device via the first switcher,
performing control so that the first switcher enters an open state when the charging voltage of the first storage battery becomes equal to or lower than the predetermined first threshold voltage,
determining the charging voltage of the entire series circuit or determines the charging voltage of a single entity of the second storage battery and sums the determined charging voltage and the charging voltage of the first storage battery to obtain the charging voltage of the entire series circuit when the short-circuited state of both terminals of the second storage battery is released by the first switcher and charging is performed from the power generation element to the series circuit of the first storage battery and the second storage battery, and performing control so that the first switcher enters the closed state when the charging voltage of the entire series circuit becomes equal to or higher than a predetermined second threshold voltage that is higher than the first threshold voltage.

9. A power storage system, comprising:
a power generation element that performs environmental power generation;
a power supply line that supplies power to a load device;
a first storage battery that is charged with power generated by the power generation element via the power supply line and supplies the power to the load device;
a second storage battery that has a capacitance smaller than that of the first storage battery;
a switcher that is selectively set to a parallel connection state in which the first storage battery and the second storage battery are connected in parallel between the power supply line and a ground and a series connection state in which the first storage battery and the second storage battery are connected in series between the power supply line and the ground;
a voltage determinator that determines a voltage at which the first storage battery is over-discharged; and
a switching unit that controls the switcher according to the determination voltage of the voltage determinator,
wherein the switching unit has a first threshold voltage that is compared with a voltage when the determination voltage of the voltage determinator decreases, and a second threshold voltage that is compared with the voltage when the determination voltage of the voltage determinator increases,
wherein the switching unit compares the determination voltage of the voltage determinator with a first threshold voltage when the switcher is set to the parallel connection state, and sets the switcher to the series connection state when the determination voltage of the voltage determinator becomes equal to or lower than the first threshold voltage, and
wherein the switching unit compares the determination voltage of the voltage determinator with the second threshold voltage when the switcher is set to the series connection state, and sets the switcher to the parallel connection state when the determination voltage of the voltage determinator becomes equal to or higher than the voltage with the second threshold.

10. The power storage system according to claim 9,
wherein the switcher comprises a first switcher that connects and disconnects between the power supply line and the first storage battery, and a second switcher that selectively connects the second storage battery to the ground side and the first storage battery side,
wherein the first switcher is set so that the power supply line and the first storage battery are connected and the second switcher is set to select the ground side to set the parallel connection state, and
wherein the first switcher is set so that the power supply line and the first storage battery are disconnected and the second switcher is set to select the first storage battery side to set the series connection state.

11. The power storage system according to claim 9,
wherein a capacitance of the first storage battery is set on the basis of a generated power amount of the power generation element, an average value of power consumption of the load device to which power is supplied from the first storage battery, and a time in which the load device is continuously driven with power stored in the first storage battery, and wherein the capacitance of the second storage battery is set on the basis of the generated power amount of the power generation element, the average value of power consumption of the load device, and a time from stop of the operation of the load device due to a decrease in the charging voltage of the first storage battery to return of the operation of the load device through power generation in the power generation element.

12. The power storage system according to claim 9, wherein the voltage determinator determines the voltage of the power supply line, the first threshold voltage is set according to a lower limit voltage of the first storage battery, and the second threshold voltage is set to a voltage obtained by adding a hysteresis voltage to the first threshold voltage.

13. The power storage system according to claim 9, wherein the voltage determinator determines the voltage of the first storage battery, the first threshold voltage is set according to a lower limit voltage of the first storage battery, and the second threshold voltage is set to a voltage obtained by adding a hysteresis voltage corrected according to the capacitance of the first storage battery and the capacitance of the second storage battery to the first threshold voltage.

14. The power storage system according to claim 9, wherein the first storage battery is a type of capacitor having a leakage current lower than that of the second storage battery.

15. The power storage system according to claim 9, comprising:
a DC/DC converter that converts an output voltage of the power generation element into a predetermined voltage and supplies the voltage to the first storage battery and the second storage battery,
wherein the DC/DC converter controls the output voltage so that the charging voltage of the first storage battery does not exceed a predetermined upper limit voltage.

16. The power storage system according to claim 9, wherein the first storage battery is a lithium ion capacitor.

17. A power storage method in a power storage system comprising a power generation element that performs environmental power generation, a power supply line that supplies power to a load device, a first storage battery that is charged with power generated by the power generation element via the power supply line and supplies the power to the load device, a second storage battery that has a capacitance smaller than that of the first storage battery, a switcher that is selectively set to a parallel connection state in which the first storage battery and the second storage battery are connected in parallel between the power supply line and a ground and a series connection state in which the first storage battery and the second storage battery are connected in series between the power supply line and the ground, a voltage determinator that determines a voltage at which the first storage battery is over-discharged, and a switching unit that controls the switcher according to the determination voltage of the voltage determinator,
wherein the switching unit has a first threshold voltage that is compared with a voltage when the determination voltage of the voltage determinator decreases, and a second threshold voltage that is compared with the voltage when the determination voltage of the voltage determinator increases,
wherein the switching unit compares the determination voltage of the voltage determinator with the first threshold voltage when the switcher is set to the parallel connection state, and sets the switcher to the series connection state when the determination voltage of the voltage determinator becomes equal to or lower than the first threshold voltage, and
wherein the switching unit compares the determination voltage of the voltage determinator with the second threshold voltage when the switcher is set to the series connection state, and sets the switcher to the parallel connection state when the determination voltage of the voltage determinator becomes equal to or higher than the voltage with the second threshold.

\* \* \* \* \*